United States Patent
Elkotby et al.

(10) Patent No.: US 12,335,867 B2
(45) Date of Patent: Jun. 17, 2025

(54) METHODS, APPARATUS, AND SYSTEMS FOR OPERATIONAL PROCEDURES SUPPORTING A ZERO-ENERGY AIR-INTERFACE

(71) Applicant: IDAC Holdings, Inc., Wilmington, DE (US)

(72) Inventors: Hussain Elkotby, Conshohocken, PA (US); Ravikumar Pragada, Warrington, PA (US); Tanbir Haque, Jackson Heights, NY (US); Patrick Cabrol, Bayshore, NY (US)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 188 days.

(21) Appl. No.: 17/795,467

(22) PCT Filed: Jan. 29, 2021

(86) PCT No.: PCT/US2021/015790
§ 371 (c)(1),
(2) Date: Jul. 26, 2022

(87) PCT Pub. No.: WO2021/155209
PCT Pub. Date: Aug. 5, 2021

(65) Prior Publication Data
US 2023/0076409 A1  Mar. 9, 2023

Related U.S. Application Data

(60) Provisional application No. 63/051,696, filed on Jul. 14, 2020, provisional application No. 62/967,832, filed on Jan. 30, 2020.

(51) Int. Cl.
*H04W 52/02* (2009.01)

(52) U.S. Cl.
CPC .............................. *H04W 52/0225* (2013.01)

(58) Field of Classification Search
None
See application file for complete search history.

(56) References Cited

U.S. PATENT DOCUMENTS

2019/0286219 A1 *  9/2019  Anazawa ................ G06F 3/068

FOREIGN PATENT DOCUMENTS

EP          3448091 A1 *  2/2019  .......... H04W 28/065
WO    WO 2019/108940 A1    6/2019

OTHER PUBLICATIONS

3rd Generation Partnership Project; "Technical Specification Group Core Network and Terminals; Non-Access-Stratum (NAS) functions related to Mobile Station (MS) in idle mode (Release 16)", 3GPP TS 23.122 V16.5.0, Mar. 2020, 80 pages.
(Continued)

*Primary Examiner* — Gary Lafontant
(74) *Attorney, Agent, or Firm* — Flaster Greenberg P.C.

(57) ABSTRACT

Methods, apparatus, systems, architectures and interfaces for method for energy harvesting (EH) performed by a wireless transmit/receive unit (WTRU) are provided. A method may include any of receiving information indicating EH receiver configuration information (EHRCI) including information indicating an EH priority of the WTRU; and on condition that the EH priority of the WTRU indicates that the WTRU is permitted to perform EH, performing the EH on signaling received via the EH receiver according to the EHRCI.

20 Claims, 40 Drawing Sheets

(56) References Cited

OTHER PUBLICATIONS

3rd Generation Partnership Project; Technical Specification Group Services and System Aspects; System architecture for the 5G System (5GS); Stage 2 (Release 16), 3GPP TS 23.501 V16.4.0, Mar. 2020, 430 pages.
3rd Generation Partnership Project; "Technical Specification Group Services and System Aspects; Procedures for the 5G System (5GS); Stage 2 (Release 15)", 3GPP TS 23.502 V15.9.0, Mar. 2020, 362 pages.
3rd Generation Partnership Project; "Technical Specification Group Radio Access Network; Evolved Universal Terrestrial Radio Access (E-UTRA); User Equipment (UE) procedures in idle mode (Release 15)", 3GPP TS 36.304 V15.5.0, Dec. 2019, 55 pages.
3rd Generation Partnership Project; "Technical Specification Group Radio Access Network; NR; User Equipment (UE) procedures in Idle mode and RRC Inactive state (Release 15)", 3GPP TS 38.304 V15.6.0, Dec. 2019, 30 pages.
3rd Generation Partnership Project; "Technical Specification Group Radio Access Network; NR; Radio Resource Control (RRC) protocol specification (Release 15)", 3GPP TS 38.331 V15.8.0, Dec. 2019, 532 pages.
3rd Generation Partnership Project; "Technical Specification Group Radio Access Network; NG-RAN; NG Application Protocol (NGAP) (Release 15)", 3GPP TS 38.413 V15.6.0, Dec. 2019, 330 pages.
$3^{rd}$ Generation Partnership Project; "Introduction of EDT for eMTC and NB-IoT enhancements", Huawei, HiSilicon, Qualcomm Incorporated, R2-1809256, 3GPP TSG-RAN2 Meeting #102, Busan, Korea (Republic Of), May 21, 2018-May 25, 2018, 73 pages.
$3^{rd}$ Generation Partnership Project; "Introduction of Rel-15 eMTC enhancements (other than EDT)", Qualcomm Incorporated, R2-1809257, 3GPP TSG-RAN2 Meeting #102, Busan, Korea (Republic Of), May 21, 2018-May 25, 2018, 105 pages.
$3^{rd}$ Generation Partnership Project; "Introduction of further NB-IOT enhancements other than EDT in TS 36.331", Huawei, HiSilicon, R2-1809276, 3GPP TSG-RAN2 Meeting #102, Busan, Korea, May 21-May 25, 2018, 94 pages.
$3^{rd}$ Generation Partnership Project; "MPR for PC6 CAT-MI and CAT-M2", Ericsson, R4-1805603, 3GPP TSG-RAN4 Meeting #86bis, Melbourne, Australian, Apr. 16-Apr. 20, 2018, 3 pages.
$3^{rd}$ Generation Partnership Project; "CR of UE RF requirement on subPRB feature", Ericsson, Skyworks, R4-1808073, 3GPP TSG-RAN4 Meeting #87, Busan, Korea, May 21-May 25, 2018, 5 pages.
$3^{rd}$ Generation Partnership Project; "Introduction of measurement gaps for dense PRS", Ericsson, R4-1808461, 3GPP TSG-RN WG4 Meeting #87, Busan, Republic of Korea, May 21-25, 2018, 6 pages.
$3^{rd}$ Generation Partnership Project; "RSTD measurement requirements with new gaps", Ericsson, R4-1806193, 3GPP TSG-RN WG4 Meeting #87, Busan, Republic of Korea, May 21-25, 2018, 3 pages.
$3^{rd}$ Generation Partnership Project; "CR on CGI requirements for CEmodeB", Huawei, HiSilicon, Ericsson, R4-1807946, 3GPP TSG-RAN WG4 Meeting #87, Busan, Korea, May 21-25, 2018, 4 pages.
$3^{rd}$ Generation Partnership Project; "CR on new gap impact on intra-frequency RSTD requirements for cat M1", Huawei, HiSilicon, R4-1807978, 3GPP TSG-RAN WG4 Meeting #87, Busan, Korea, May 21-25, 2018, 2 pages.
$3^{rd}$ Generation Partnership Project; "CR on new gap impact on intra-frequency RSTD requirements for cat M2", Huawei, HiSilicon, R4-1807979, 3GPP TSG-RAN WG4 Meeting #87, Busan, Korea, May 21-25, 2018, 2 pages.
$3^{rd}$ Generation Partnership Project; "Introduction of CRS muting requirements for Rel-15 MTC", Ericsson, R4-1808470, 3GPP TSG-RN WG4 Meeting #87, Busan, Republic of Korea, May 21-25, 2018, 34 pages.
$3^{rd}$ Generation Partnership Project; "Introduction of High-velocity support for muting for Rel-15 MTC", Ericsson, R4-1807600, 3GPP TSG-RN WG4 Meeting #87, Busan, Republic of Korea, May 21-25, 2018, 23 pages.
$3^{rd}$ Generation Partnership Project; "RAN4 CRs to Even further enhanced MTC for Lte", RP-181083, 3GPP TSG-RAN Meeting #80, La Jolla, CA, United States, Jun. 11, 2018-Jun. 14, 2018, 2 pages.
$3^{rd}$ Generation Partnership Project; "Introduction of NB-IoT TDD support", Ericsson, R4- 1808547, 3GPP TSG- RAN WG4 Meeting 87, Busan, Korea, May 21-25, 2018, 30 pages.
$3^{rd}$ Generation Partnership Project; "Introduction of NB-IoT TDD support", Ericsson, R4- 1806734, 3GPP TSG- RAN WG4 Meeting 87, Busan, Korea, May 21-25, 2018, 7 pages.
$3^{rd}$ Generation Partnership Project; "CR for relaxed monitoring of cell reselection", Huawei, HiSilicon, R4-1805952, 3GPP TSG-RAN WG4 Meeting #86bis, Melbourne, Australia, Apr. 16-Apr. 20, 2018, 7 pages.
$3^{rd}$ Generation Partnership Project; "CR for TDD NB-IoT RRM requirement", Huawei, R4-1807326, 3GPP TSG-RAN WG4 Meeting #87, Busan, Korea, May 21-25, 2018, 3 pages.
$3^{rd}$ Generation Partnership Project; "CR for serving cell measurement relaxation for WUS-capable UE", Huawei, HiSilicon, R4-1808451, 3GPP TSG-RAN WG4 Meeting #87, Busan, Korea, May 21-25, 2018, 4 pages.
$3^{rd}$ Generation Partnership Project; "Side conditions for supporting TDD NB-IOT", Ericsson, R4-1807601, 3GPP TSG-RN WG4 Meeting #87, Busan, Republic of Korea, May 21-25, 2018, 7 pages.
$3^{rd}$ Generation Partnership Project; "Introduction of NB-IoT TDD support", Ericsson, R4- 1808165, 3GPP TSG- RAN WG4 Meeting 87, Busan, Korea, May 21-25, 2018, 15 pages.
$3^{rd}$ Generation Partnership Project; "RAN4 CRs to Further NB-IoT enhancements", RP-181084, 3GPP TSG-RAN Meeting #80, La Jolla, CA, United States, Jun. 11, 2018-Jun. 14, 2018, 2 pages.
$3^{rd}$ Generation Partnership Project; "Introduction Rel-15 Further NB-IoT enhancements", Ericsson, R1-1807939, 3GPP TSG-RAN1 Meeting #93, Busan, Korea, May 21-25, 2018, 32 pages.
$3^{rd}$ Generation Partnership Project; "Clarification on CRC attachment for DL-SCH and PCH transport channels in NB-IoT", Huawei, R1-1805327, 3GPP TSG RAN WG1 Meeting #92bis, Sanya, China, Apr. 16-20, 2018, 2 pages.
$3^{rd}$ Generation Partnership Project; "Introduction of further enhancements to NB-IoT in 36.212", Huawei, R1-1807917, 3GPP TSG RAN WG1 Meeting #93, Busan, Korea, May 21-25, 2018, 2 pages.
$3^{rd}$ Generation Partnership Project; "Introduction of Rel-15 Further NB-IoT enhancements in 36.213, s14", Motorola Mobility, R1-1807940, 3GPP TSG RAN WG1 Meeting #93, Busan, Korea, May 21-25, 2018, 28 pages.
$3^{rd}$ Generation Partnership Project; "Introduction Rel-15 Further NB-IoT enhancements", Ericsson, R1-1807941, 3GPP TSG-RAN1 Meeting #93, Busan, South Korea, May 21-25, 2018, 2 pages.
$3^{rd}$ Generation Partnership Project; "Introduction Rel-15 Further NB-IoT enhancements", RP-181166, 3GPP TSG-RAN Meeting #80, 1 page.
$3^{rd}$ Generation Partnership Project; "Introduction of Even Further Enhanced MTC for LTE", Ericsson, R1-1807935, 3GPP TSG-RAN1 Meeting #93, Busan, Korea, May 21-25, 2018, 26 pages.
$3^{rd}$ Generation Partnership Project; "Introduction of even further enhanced MTC for LTE in 36.212", Huawei, R1-1807916, 3GPP TSG RAN WG1 Meeting #93, Busan, Korea, May 21-25, 2018, 11 pages.
$3^{rd}$ Generation Partnership Project; "Introduction of even further enhanced MTC for LTE in 36.213, s00-s05", Motorola Mobility, R1-1807936, 3GPP TSG RAN WG1 Meeting #93, Busan, Korea, May 21-25, 2018, 50 pages.
$3^{rd}$ Generation Partnership Project; "Introduction of even further enhanced MTC for LTE in 36.213, s06-s07", Motorola Mobility, R1-1807937, 3GPP TSG RAN WG1 Meeting #93, Busan, Korea, May 21-25, 2018, 177 pages.
$3^{rd}$ Generation Partnership Project; "Introduction of even further enhanced MTC for LTE in 36.213, s08-s09", Motorola Mobility, R1-1807938, 3GPP TSG RAN WG1 Meeting #93, Busan, Korea, May 21-25, 2018, 86 pages.
$3^{rd}$ Generation Partnership Project; "Introduction of even further enhanced MTC for LTE", RP-181174, 3GPP TSG-RAN Meeting #80, La Jolla, CA, United States, Jun. 11, 2018-Jun. 14, 2018, 1 page.

(56) References Cited

OTHER PUBLICATIONS

3rd Generation Partnership Project; "Introduction of EDT for eMTC and NB-IoT enhancements in TS 36.300", Huawei, HiSilicon, R2-1809252, 3GPP TSG-RAN2 Meeting #102, Busan, Korea, May 21-25, 2018, 13 pages.

3rd Generation Partnership Project; "Introduction of enhancements for eMTC excluding EDT", Ericsson, R2-1809253, 3GPP TSG-RAN2 Meeting #102, Busan, Republic of Korea, May 21-25, 2018, 29 pages.

3rd Generation Partnership Project; "Introduction of Rel-15 eMTC enhancements in 36.302", Huawei, HiSilicon, R2-1809225, 3GPP TSG-RAN WG2 Meeting #102, Busan, Korea, May 21-25, 2018, 10 pages.

3rd Generation Partnership Project; "EARFCN provisioning for UE in enhanced coverage", Ericsson, R2-1808859, 3GPP TSG-RAN2 Meeting #102, Busan, South Korea, May 21-25, 2018, 2 pages.

3rd Generation Partnership Project; "Introduction of further eMTC enhancements in 36.304", Nokia, Nokia Shanghai Bell, R2-1809254, 3GPP TSG-RAN WG2 #102, Busan, Korea, May 21-25, 2018, 10 pages.

3rd Generation Partnership Project; "Introduction of even further eMTC enhancmenets for eMTC", Qualcomm Incorporated, R2-1809263, 3GPP TSG-RAN WG2 Meeting #102, Busan, South Korea, May 21-25, 2018, 5 pages.

3rd Generation Partnership Project; "Running Rel-15 36.321 CR for eMTC (excluding EDT)", Intel Corporation, R2-1809235, 3GPP TSG RAN WG2 Meeting #102, Busan, Republic of Korea, May 21-25, 2018, 7 pages.

3rd Generation Partnership Project; "Correction on delta-RxLevMinCE1", ZTE Corporation, R2-1808868, 3GPP TSG-RAN2 Meeting #102, Busan, Korea (Republic Of), May 21, 2018-May 25, 2018, 7 pages.

3rd Generation Partnership Project; "Correction on delta-RxLevMinCE1", ZTE Corporation, R2-1809091, 3GPP TSG-RAN2 Meeting #102, Busan, Korea (Republic Of), May 21, 2018-May 25, 2018, 7 pages.

3rd Generation Partnership Project; "RAN2 CRs to Even further enhanced MTC for Lte", RP-181224, 3GPP TSG-RAN Meeting #80, La Jolla, CA, United States, Jun. 11, 2018-Jun. 14, 2018, 2 pages.

3rd Generation Partnership Project; "Introduction of early data transmission", Huawei, China Telecom, CMCC, Qualcomm Incorporated, China Unicom, R3-183469, 3GPP TSG-RAN3 Meeting #100, Busan, Korea, May 21-25, 2018, 16 pages.

3rd Generation Partnership Project; "Support of NB-IoT measurement enhancement and TDD Config", Huawei, R3-183575, 3GPP TSG-RAN3 Meeting #100, Busan, Korea, May 21-25, 2018, 12 pages.

3rd Generation Partnership Project; "CRs for Further NB-IoT enhancements and Even further enhanced MTC for Lte", RP-181242, 3GPP TSG-RAN Meeting #80, La Jolla, CA, United States, Jun. 11, 2018-Jun. 14, 2018, 1 page.

3rd Generation Partnership Project; "Introduction of further NB-IoT enhancements other than EDT in TS 36.300", Huawei, HiSilicon, R2-1809248, 3GPP TSG-RAN2 Meeting #102, Busan, Korea, May 21-25, 2018, 20 pages.

3rd Generation Partnership Project; "Introduction of EDT for eMTC and NB-IoT enhancements in TS 36.300", Huawei, R2-1809197, 3GPP TSG-RAN2 Meeting #102, Busan, Korea, May 21-25, 2018, 4 pages.

3rd Generation Partnership Project; "Introduction of Rel-15 NB-IoT enhancementsin 36.302", Huawei, HiSilicon, R2-1809224, 3GPP TSG-RAN WG2 Meeting #102, Busan, Korea, May 21-25, 2018, 10 pages.

3rd Generation Partnership Project; "Introduction of further NB-IoT enhancements in 36.304", Nokia, Nokia Shanghai Bell, R2-1809250, 3GPP TSG-RAN WG2 Meeting #102, Busan, South Korea, May 21-25, 2018, 4 pages.

3rd Generation Partnership Project; "Introduction of further NB-IoT enhancements in 36.306", Ericsson, R2-1809222, 3GPP TSG-RAN2 Meeting #102, Busan, South Korea, May 21-25, 2018, 11 pages.

3rd Generation Partnership Project; "Introduction of EDT for eMTC and NB-IoT in Rel-15 TS 36.321", Intel Corporation, Ericsson, R2-1809236, 3GPP TSG RAN WG2 Meeting #102, Busan, Republic of Korea, May 21-25, 2018, 14 pages.

3rd Generation Partnership Project; "Introduction of further NB-IoT enhancements in TS 36.321", Ericsson, R2-1809232, 3GPP TSG-RAN2 Meeting #102, Busan, Republic of Korea, May 21-25, 2018, 23 pages.

3rd Generation Partnership Project; "Introduction of further NB-IoT enhancements in 36.322", Ericsson, R2-1808844, 3GPP TSG-RAN2 Meeting #102, Busan, South Korea, May 21-25, 2018, 3 pages.

3rd Generation Partnership Project; "Introduction of further NB-IoT enhancements in 36.323", Qualcomm Incorporated, LG Electronics Inc., R2-1809198, 3GPP Tsg-Ran WG2 Meeting #102, Busan, South Korea, May 21-25, 2018, 2 pages.

3rd Generation Partnership Project; "Addition of NB-IoT TDD support", Qualcomm Incorporated, R2-1809251, 3GPP TSG-RAN WG2 Meeting #102, Busan, Korea, May 21-25, 2018, 7 pages.

3rd Generation Partnership Project; "RAN2 CRs to Further NB-IoT enhancements", RP-181252, 3GPP TSG-RAN Meeting #80, La Jolla, CA, United States, Jun. 11, 2018-Jun. 14, 2018, 2 pages.

\* cited by examiner

UE's decision sequence to transition to RRC_IDLE over ZE air-interface for EH purposes UE's decision sequence to transition to RRC_INACTIVE over ZE air-interface for EH purposes UE's procedure to request transition from RRC_INACTIVE over ZE air-interface to RRC_INACTIVE over Uu air-interface using Mono-Static Backscattering

*UE's procedure to request transition from RRC_INACTIVE over ZE air-interface to RRC_INACTIVE over Uu air-interface using Mono-Static Backscattering*

*UE's procedure to request RRC connection establishment over ZE air-interface for best effort service without transitioning to Uu RRC_CONNECTED*

UE's procedure to request RRC connection establishment over ZE air-interface for certain minimal quality of service using ZE RRCSetup message

METHODS, APPARATUS, AND SYSTEMS FOR OPERATIONAL PROCEDURES SUPPORTING A ZERO-ENERGY AIR-INTERFACE

CROSS-REFERENCE TO RELATED APPLICATIONS

This application is the 371 National Stage of International Application No. PCT/US2021/015790, filed Jan. 29, 2021, which claims priority to U.S. Provisional Application No. 63/051,696, filed Jul. 14, 2020, and U.S. Provisional Application No. 62/967,832, filed Jan. 30, 2020, the disclosures of which are incorporated herein by reference in their entireties.

BACKGROUND

The present invention relates to the field of computing and communications and, more particularly, to methods, apparatus, systems, architectures and interfaces for computing and communications in an advanced or next generation wireless communication system, including communications carried out using a new radio and/or new radio (NR) access technology and communication systems. Such NR access and technology, which may also be referred to as 5G, and/or other similar wireless communication systems and technology may include passive receiver technology and radio resource control (RRC) aspects for wireless networks.

In conventional wireless technology, such as cellular networks and WLANs, radio frequency (RF) front-ends are a mix of passive and active components. Passive components, for example, including receive (Rx) antennas, transmit (Tx)/Rx path switches and filters, use little, if any, power in order to function. On the other hand, active components, for example, including an oscillator to tune to a carrier frequency, a low noise amplifier, and analog/digital (ND) converters in the Rx path, need (e.g., larger amounts of) power in order to function. Recent advances in RF component design provide RF circuitry that process (e.g., received) RF waveforms collected through an antenna (e.g., RF) front-end of a receiving device, in absence of an active power supply. For example, such a device, e.g., a WTRU, may harvest energy from the received RF waveform to run the (e.g., necessary, RF) circuitry to process signals.

WTRUs implementing any of 2G, 3G, 4G and/or 5G radio access technologies (RATs) perform any of PLMN selection, cell selection/re-selection and location registration procedures while in RRC_IDLE mode. Further, depending on capabilities, some devices support manual closed subscriber group (CSG) selection or multimedia broadcast multicast service (MBMS) frequency prioritization in RRC_IDLE mode, and 5G devices support RNA updates and operations in RRC_INACTIVE state. When a WTRU is switched on, a PLMN is selected by the WTRU. For the selected PLMN, associated RAT(s) may be set. With cell selection, the WTRU searches for a suitable cell of the selected PLMN, chooses that (e.g., suitable) cell to provide available services, and monitors its (e.g., the cells) control channel. The WTRU may register its presence by means of a network access stratum (NAS) registration procedure in the tracking area of the chosen cell.

BRIEF DESCRIPTION OF THE DRAWINGS

A more detailed understanding may be had from the following description, given by way of example in conjunction with the accompanying drawings, wherein like reference numerals in the figures indicate like elements, and wherein.

EXAMPLE NETWORKS FOR IMPLEMENTATION OF THE EMBODIMENTS

Figure 1A:
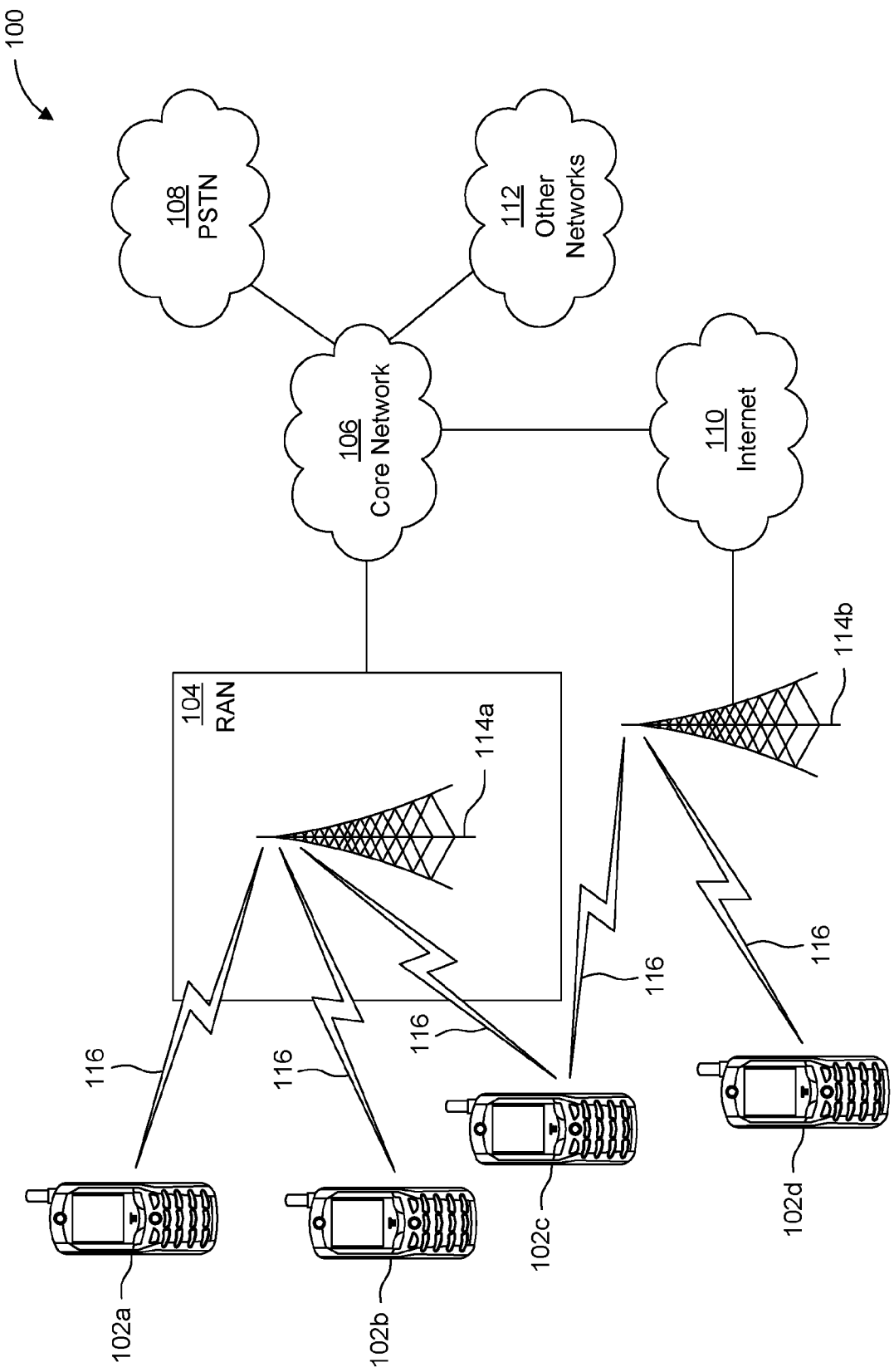
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
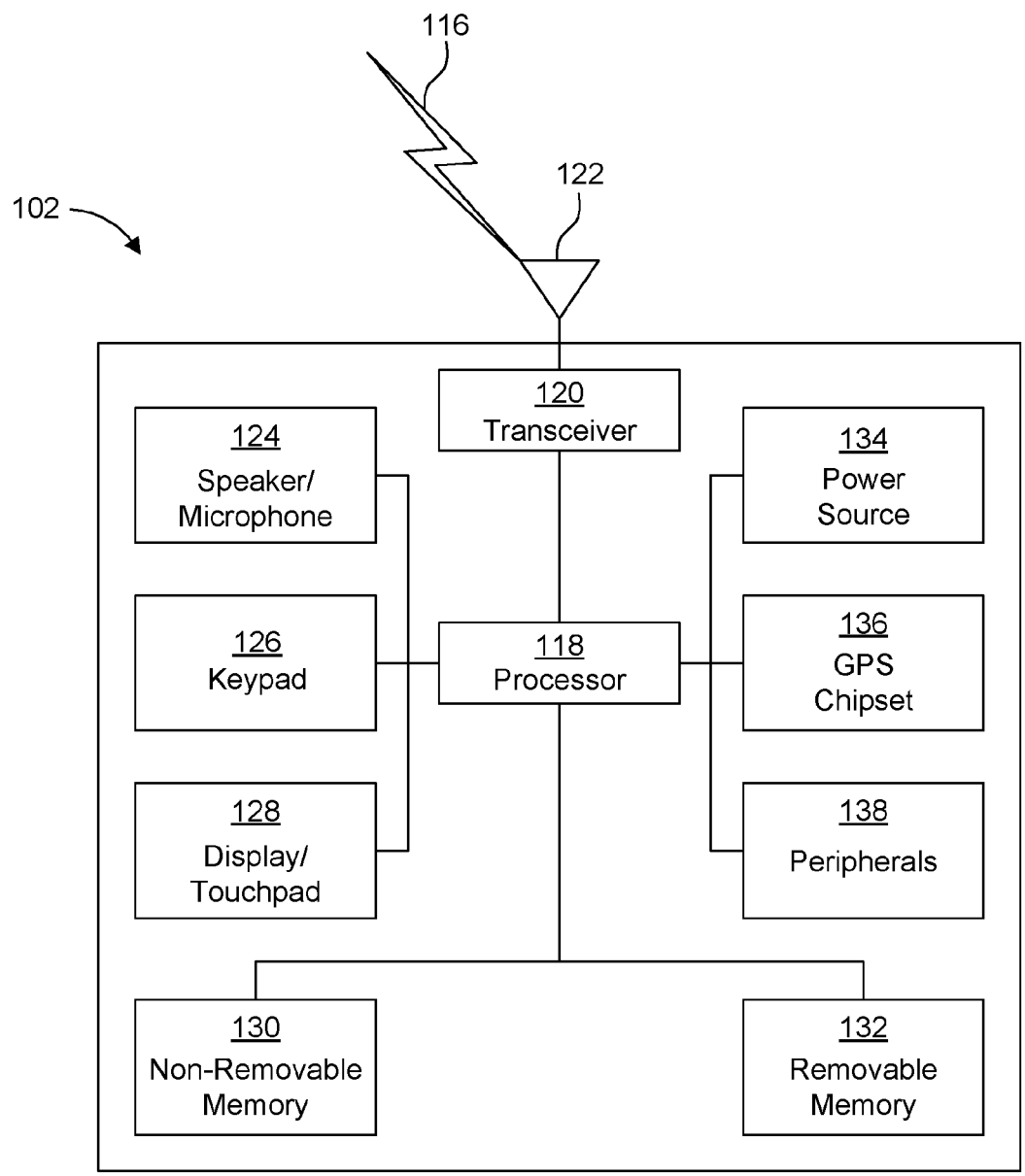
FIG. 1B is a system diagram illustrating an example wireless transmit/receive unit (WTRU) that may be used within the communications system illustrated in FIG. 1A according to an embodiment.
Figure 1C:
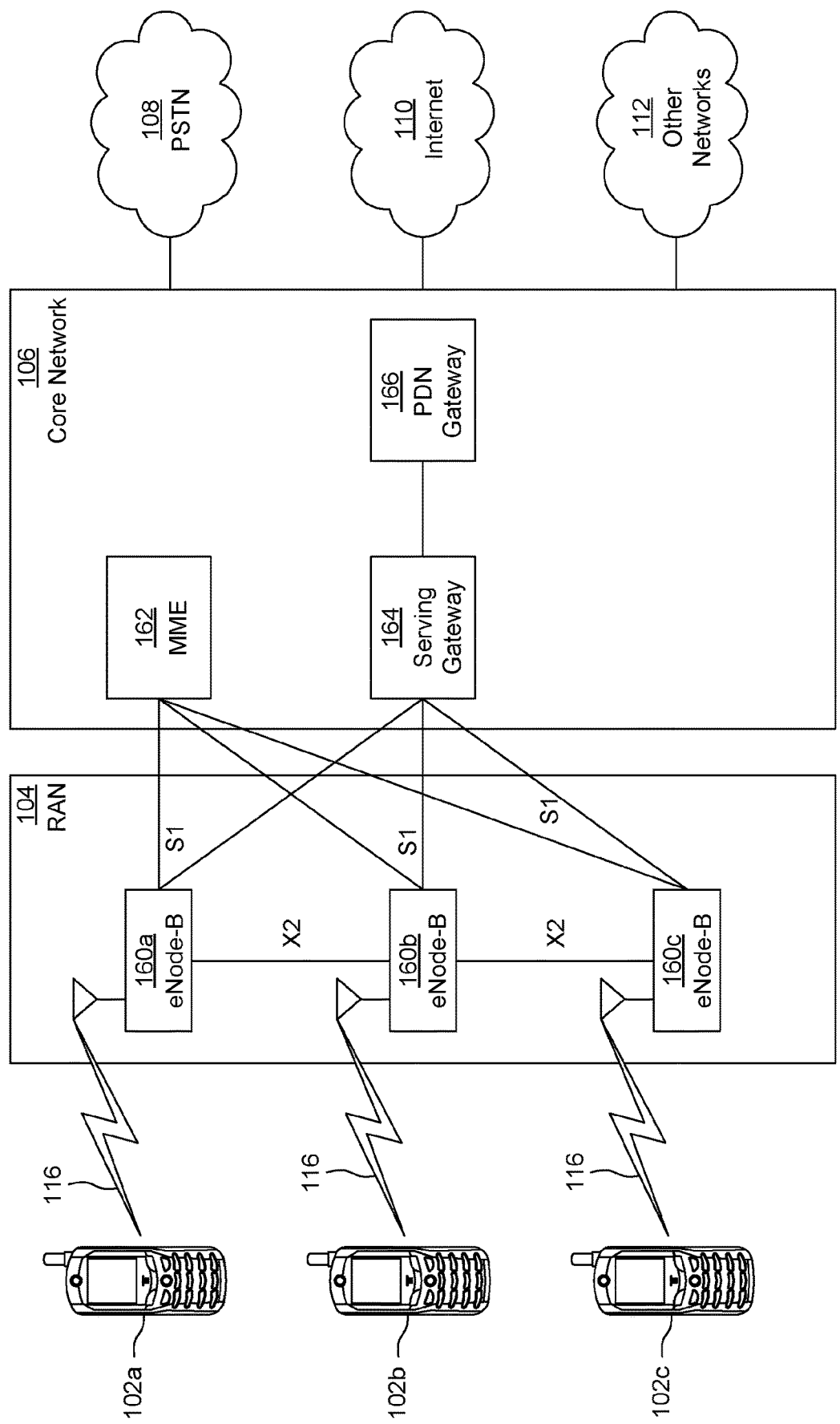
FIG. 1C is a system diagram illustrating an example radio access network (RAN) and an example core network (CN) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 10:
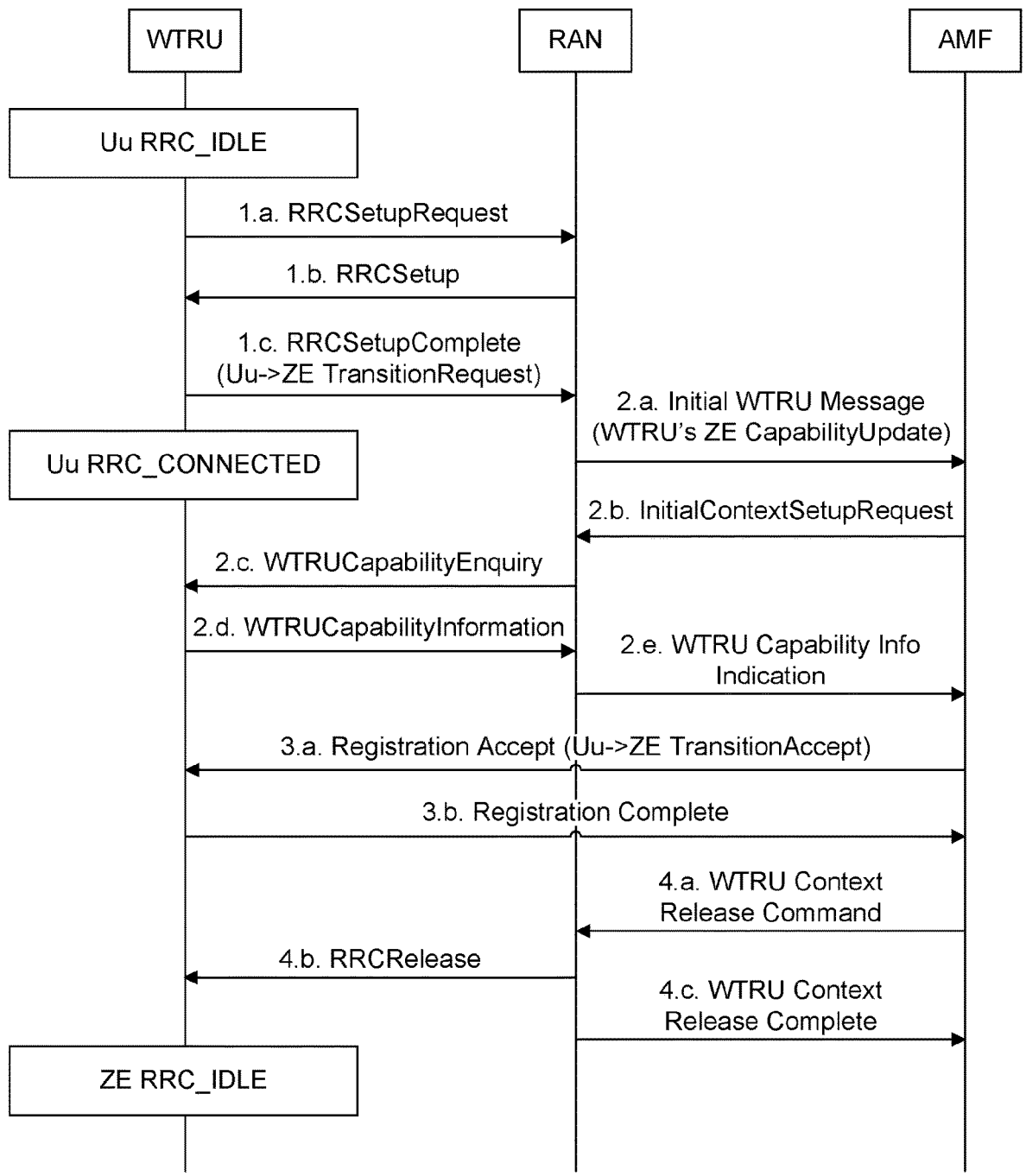
FIG. 10 is a diagram illustrating a procedure for a WTRU updating its ZE capability and requesting transition from RRC_IDLE over a Uu air-interface to RRC_IDLE over a ZE air-interface, according to embodiments.

FIG. 10 is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 10, the eNode-Bs 160a, 160b, 160c may communicate with one another over an X2 interface.

The CN 106 shown in FIG. 10 may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
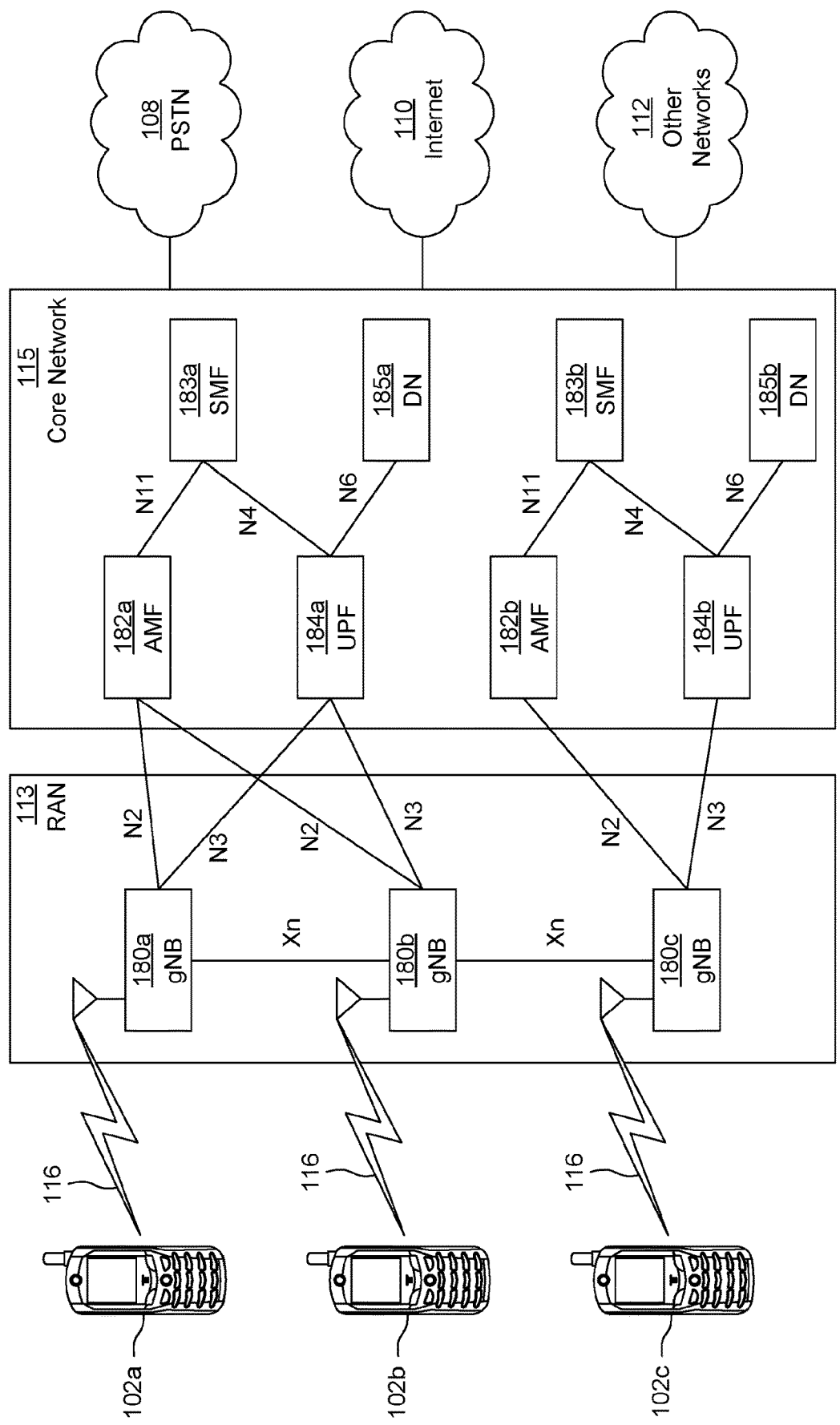
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182*a*, 182*b* and the like. As shown in FIG. 1D, the gNBs 180*a*, 180*b*, 180*c* may communicate with one another over an Xn interface.

The CN 115 shown in FIG. 1D may include at least one AMF 182*a*, 182*b*, at least one UPF 184*a*,184*b*, at least one Session Management Function (SMF) 183*a*, 183*b*, and possibly a Data Network (DN) 185*a*, 185*b*. While each of the foregoing elements are depicted as part of the CN 115, it will be appreciated that any of these elements may be owned and/or operated by an entity other than the CN operator.

The AMF 182*a*, 182*b* may be connected to one or more of the gNBs 180*a*, 180*b*, 180*c* in the RAN 113 via an N2 interface and may serve as a control node. For example, the AMF 182*a*, 182*b* may be responsible for authenticating users of the WTRUs 102*a*, 102*b*, 102*c*, support for network slicing (e.g., handling of different PDU sessions with different requirements), selecting a particular SMF 183*a*, 183*b*, management of the registration area, termination of NAS signaling, mobility management, and the like. Network slicing may be used by the AMF 182*a*, 182*b* in order to customize CN support for WTRUs 102*a*, 102*b*, 102*c* based on the types of services being utilized WTRUs 102*a*, 102*b*, 102*c*. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183*a*, 183*b* may be connected to an AMF 182*a*, 182*b* in the CN 115 via an N11 interface. The SMF 183*a*, 183*b* may also be connected to a UPF 184*a*, 184*b* in the CN 115 via an N4 interface. The SMF 183*a*, 183*b* may select and control the UPF 184*a*, 184*b* and configure the routing of traffic through the UPF 184*a*, 184*b*. The SMF 183*a*, 183*b* may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 113 via an N3 interface, which may provide the WTRUs 102*a*, 102*b*, 102*c* with access to packet-switched networks, such as the Internet 110, to facilitate communications between the WTRUs 102*a*, 102*b*, 102*c* and IP-enabled devices. The UPF 184, 184*b* may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102*a*, 102*b*, 102*c* with access to the other networks 112, which may include other wired and/or wireless networks that are owned and/or operated by other service providers. In one embodiment, the WTRUs 102*a*, 102*b*, 102*c* may be connected to a local Data Network (DN) 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to one or more of: WTRU 102*a-d*, Base Station 114*a-b*, eNode-B 160*a-c*, MME 162, SGW 164, PGW 166, gNB 180*a-c*, AMF 182*a-b*, UPF 184*a-b*, SMF 183*a-b*, DN 185*a-b*, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

DETAILED DESCRIPTION

Passive Receivers

Passive receivers, which may interchangeably be referred to as zero-energy (ZE) receivers and/or energy harvesting (EH) receivers, use (e.g., include) RF components such as cascading capacitors, zero-bias Schottky diodes, and MEMS to implement the functionality required for voltage multipliers or rectifiers, charge pumps and signal detectors. Further, passive receivers operate in the antenna far-field and support reasonable link budgets. Such passive receivers perform basic signal detection, such as correlation for a known signature waveform, and/or they can be put into energy harvesting mode, for example, by accumulating energy from the RF waveform entering the receiver front-end through the Rx antenna. In the case of passive receivers, link budgets characteristic of (e.g., associated with) small or medium area cellular base stations are supported. For example, passive receivers are used as wake-up radios to trigger device internal wake-up and signal interrupts following the detection of wake-up signaling, which then prompts the main modem receiver (e.g., using active RF components) to start up.

Passive receivers provide reductions in device power consumption. A conventional/typical cellular 3G, 4G or 5G modem transceiver can require up to a few hundred milliwatts (mW)s in order to demodulate and process received signals during active reception, such as in RRC_CONNECTED mode. Power consumption scales with any of the number of RF front-end chains active on a device (e.g., the modem, the modem transceiver, etc.), the channel bandwidth used for reception, and the received data rate. In a case where a device is in RRC_IDLE mode with no data being received or transmitted, cellular radio power saving protocols, such as (e)DRX, provide that a receiver (e.g., of the device) only needs to be powered on a few times per second. In such a case, the device (e.g., then) performs tasks, such as, for example, measuring the received signal strength of the serving and/or neighbor cells for the purpose of cell (re-)selection procedures and reception of paging channels. In addition, the device performs automatic frequency control (AFC) and channel estimation in support of coherent demodulation. Device power consumption when in RRC_IDLE is in the order of several mWs. In Release 15 (R15) enhanced Machine Type Communication (eMTC) and Narrowband Internet of Things (NB-IoT), sequence detection circuitry for processing of in-band wake-up signals in RRC_IDLE mode may be implemented via (e.g., in the form of) a dedicated wake-up receiver. This allows powering down of A/D converters and significant parts of the digital baseband processor. However, several active components in the RF front-end, such as low-noise amplifiers and oscillators are still used. In such a case, device power consumption in RRC_IDLE may be reduced to about 1 mW.

RRC States and Operations

While in RRC_IDLE, a WTRU performs received signal strength measurements on serving cells and/or neighbor cells. In a case where the WTRU finds a more suitable cell according to cell reselection criteria, the WTRU reselects onto that (e.g., more suitable) cell and camps on it. In a further case where such (e.g., more suitable) cell does not belong to at least one tracking area to which the WTRU is registered, a location registration is performed (e.g., by the WTRU and/or network). The WTRU may also search for higher priority PLMNs (e.g., than a selected PLMN) at regular time intervals and search for a suitable cell if another PLMN has been selected by the WTRU's NAS. In a case where a WTRU loses coverage of the registered PLMN, either a new PLMN is selected automatically or an indication of available PLMNs is given to a user (e.g., of the WTRU) so that a manual selection is performed. There are various control operations and features allowing the network to prioritize cell selection onto certain RATs, to control a rate at which low, medium or high mobility WTRUs perform cell re-selection, and to bar selected tracking areas from re-selection (e.g., being re-selected) by WTRUs.

In a case where a WTRU camping on a cell is in RRC_IDLE state or in RRC_INACTIVE state, the WTRU: may receive system information from the PLMN, may establish an RRC connection or resume a suspended RRC connection, and may receive Earthquake and Tsunami Warning System (ETWS) or Commercial Mobile Alert System (CMAS) notifications. Moreover, in a case where a network needs to send a control message or deliver data to a registered WTRU, the network knows (e.g., in most cases) a set of tracking areas in which the WTRU is camped. In such a case, a paging message is sent for (e.g., to) the WTRU on the control channels of all the cells in the set of tracking areas in which the WTRU is camped, and the WTRU receives the paging message and can respond. In a case of a WTRU in RRC_CONNECTED state, and the WTRU is involved in the transfer of unicast data, such WTRU may support features such as Carrier Aggregation (CA) or Dual Connectivity (DC) for an increased bandwidth. The WTRU can also monitor control channels associated with shared data channel to determine if data is scheduled for the WTRU. The WTRU can optimize data transfer quality by providing channel quality and feedback information. In RRC_CONNECTED state, a WTRU's mobility is controlled by the network, such that the WTRU performs neighboring cell measurements and provides measurement reports to assist the network (e.g., in mobility/handover decisions).

Passive Receiver Waveforms

A WTRU implementing a passive receiver (e.g., in contrast to a conventional receiver or conventional WTRUs not having passive receiver capabilities) benefits from near zero power consumption when not actively performing transmission or high data rate reception, for example, for the purpose of either exchanging data or a large amount of control signaling with a network. For example, in a case of a passive receiver (e.g., a ZE receiver, an EH receiver, etc.), a WTRU having such may perform operations such as data transmission/reception and/or control signalling transmission/reception in a manner such that no (e.g., near-zero) power is consumed, or in other words, such that available power is maintained, because, for example, energy is harvested from the signaling (e.g., received signals) occurring during performance of such operations.

In order for a WTRU to have near zero power consumption associated with a ZE receiver, a WTRU can (e.g., should be able to) use the ZE receiver to perform at least the following functions when/while any of: (a) in RRC_IDLE state and; (b) harvesting energy: (1) cell selection and reselection measurements and criteria evaluation; (2) paging, system information change, and public warning notification messages reception; and (3) tracking area update. A WTRU (e.g., also) uses the ZE receiver to perform RAN Paging notification reception and RAN Notification Area (RNA) update, for example, in addition to RRC_IDLE state functions, when the WTRU is in RRC_INACTIVE state. For example, to maximize benefits of near zero power consumption, a WTRU may use the ZE receiver for the purpose of very low data rate DL reception, for example, without UL transmissions support (e.g., not even for acknowledgment signaling). A WTRU can support conditional UL transmission, for example, using backscattering techniques, for example, depending on any of channel conditions or proximity to an interrogating node. WTRUs that implement a passive receiver may (e.g., be expected to) shut down all or significant parts of a modem (e.g., the main cellular modem) receiver, for example, while operating in Idle Mode, such as exemplified by RRC_IDLE and/or RRC_INACTIVE modes.

In a case of any of paging or wake-up signaling being transmitted by the network to a passive receiver (e.g., in a device, a WTRU, etc.), a WTRU may be required/necessitated to start up the WTRU's main modem transceiver (e.g., execute a cold start), which may incur a significant time delay, and which is costly in terms of battery power consumption. Most of a cold start delay results from determining a cell to camp on during initial cell selection, and such may involve (e.g., imply, necessitate, etc.) measuring a great many different frequencies and operating bands during prolonged periods of time, even if a PLMN is already preselected. WTRUs implementing a passive receiver may (e.g., should) support cell (re-)selection, for example, to (e.g., dramatically) reduce start up times and power consumption, for example, when the WTRU (e.g., is required to) starts their main modem transceiver. WTRUs implementing a passive receiver may (e.g., should, also) support tracking area update procedure(s), for example, to reduce paging load in the network and use radio resources more efficiently.

In the context of Idle Mode operation, for example the use of a paging procedure and wake-up command signaling for UEs equipped with passive receiver technology is described in [1]. Additionally, considering the main cellular modem, there may be supplementary use of transmitted wake-up signals delivered in-band prior to the imminent arrival of existing DCI using P-RNTI on PDCCH and PDSCH carrying paging message(s) for LTE eMTC and NB-IoT. Passive receiver DL waveforms (e.g., usually) allow for a configurable and controllable trade-off between energy-harvesting and/or information bearing signal characteristics. A peak to average power ratio (PAPR) of the waveform may be set deliberately high, for example, for the purpose of allowing passive receivers to accumulate energy. In contrast, for conventional LTE and/or NR systems, DL signals are (e.g., usually) transmitted with equal resource element (RE) average power and near constant-envelope properties.

According to embodiments, for example, in view of the different waveform requirements for operation of a WTRU over a legacy Uu air interface and a (e.g., additional, new, supplementary, separate, etc.) ZE air interface, new operation states for a ZE air interface need to (e.g., must) be defined and signaling, features, operations, and procedures that support (e.g., information on, identifying of, operations/ features related to, etc.) state synchronization between a WTRU and a network should (e.g., must) be identified. The lack of such procedures may (e.g., can only) lead to network resource utilization inefficiency, as well as an increase in latency.

Multi-Mode WTRUs and Zero Energy Signalling

According to embodiments, a WTRU may be a multi-mode device. For example, according to embodiments, WTRUs equipped with (e.g., having, including, etc.) passive receivers may be multi-mode RAT devices supporting any of: 2G GSM/EGPRS, 3G WCDMA/HSPA, 4G LTE/eMTC/ NB-IoT, and 5G NR. According to embodiments, these devices may also include Wi-Fi, Bluetooth or GPS functionality.

According to embodiments, any of in-band and dedicated band communications may be used.

According to embodiments, a passive receiver (e.g., in a device, in a WTRU, etc.) may operate in-band and/or on a dedicated band. According to embodiments, in-band operation may refer to ZE signaling (e.g., for passive receivers) carried inside/on or in/on a portion of an operating band (herein, any of band, frequency, and channel may be used interchangeably), for example, the operating channel in/on which the main modem receiver also operates. According to embodiments, both of ZE signalling and a channel in which the main modem receiver operates may be transmitted in a 20 MHz channel in LTE/NR Band 1. As referred to herein, dedicated band operation may refer to ZE signaling carried in a frequency channel distinct from the main modem cellular DL/UL. According to embodiments, for example, ZE signaling may be transmitted in a 1 MHz wide portion of the 700 MHz band, and the main modem receiver may operate in a 20 MHz wide channel of LTE/NR Band 1.

Figure 2:
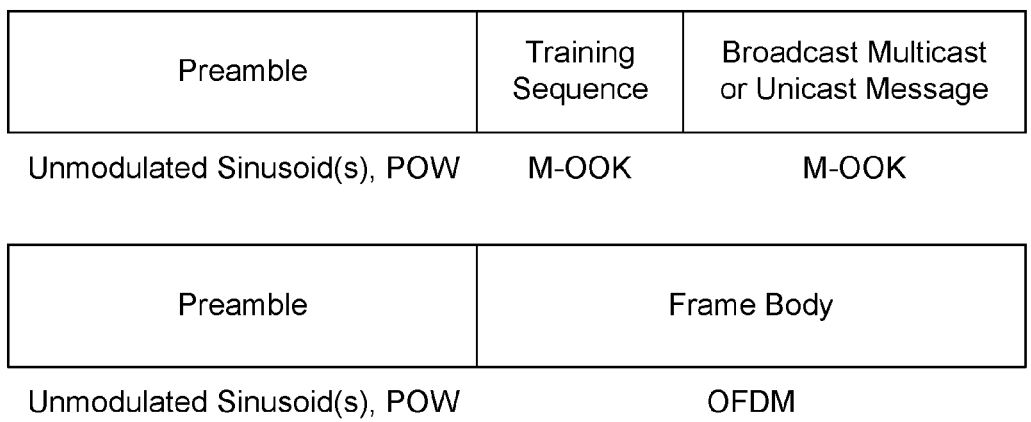
FIG. 2 is a diagram illustrating zero energy signal construction, according to embodiments.
Figure 3:
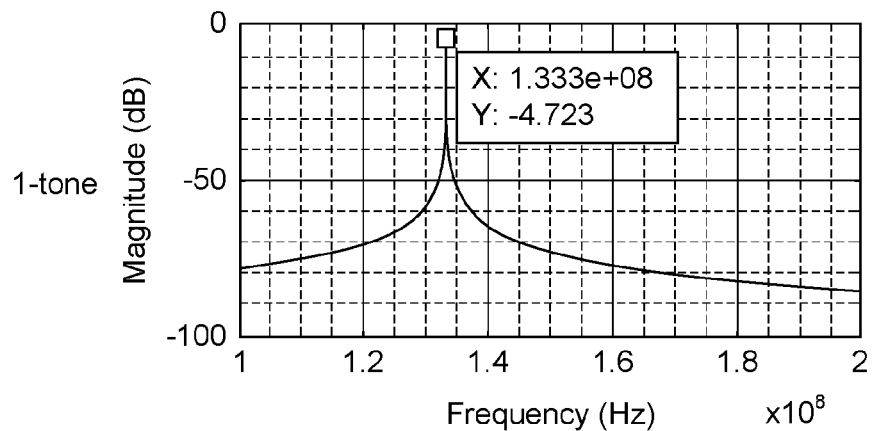
FIG. 3 is a diagram illustrating multi-tone transmission for power-optimized waveforms, according to embodiments.
Figure 3:
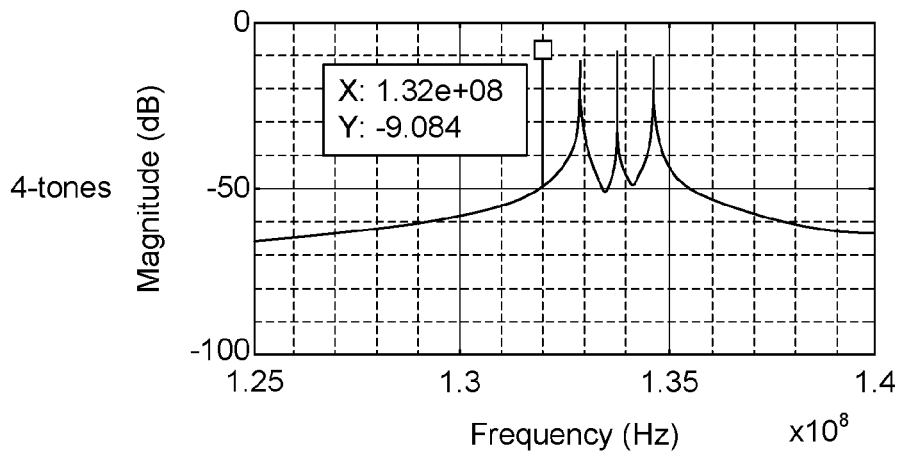
Figure 3:
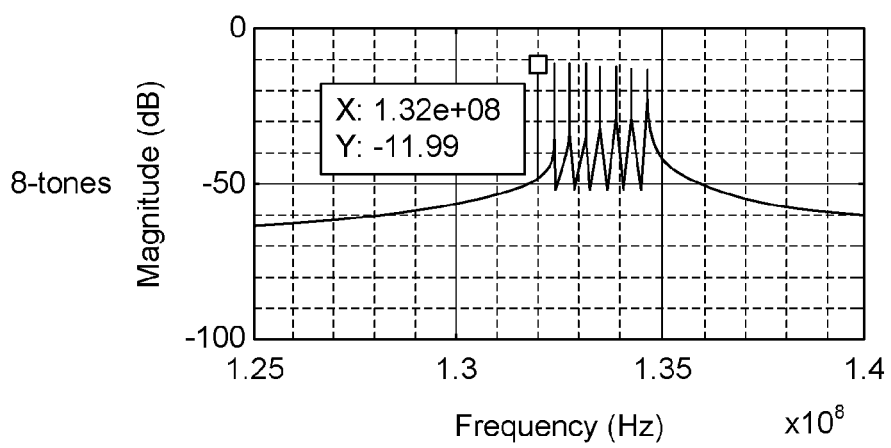

FIG. 2 is a diagram illustrating zero energy signal construction, according to embodiments, and FIG. 3 is a diagram illustrating multi-tone transmission for power-optimized waveforms, according to embodiments.

According to embodiments, a passive receiver in a WTRU may process a ZE waveform (e.g., transmitted to, received by, etc., the WTRU) comprised of any number of power-optimized waveform part(s) and signaling part(s). For example, according to embodiments, transmission of a power-optimized waveform part may be done via (e.g., using, by means of) a preamble part, wherein any of selected sinusoid(s) or multi-tone transmissions are sent over a portion of a frequency spectrum. According to embodiments, a frame (e.g., a wireless frame, a transmission/ reception frame, a frame body, etc.) may be transmitted using any of a modulation scheme or a multiplexing scheme. For example, any of OOK, FSK, BPSK, or QPSK, and any of TDMA, FDMA, CDMA, or OFDM, may be used to transmit information. According to embodiments, a frame body may be used by a passive receiver, for example, to determine and/or process any of the control signalling and data signaling, for example, as shown in FIGS. 1 and 2. According to embodiments, ZE waveforms may be used to determine any of channel state and reception conditions.

Figure 4:
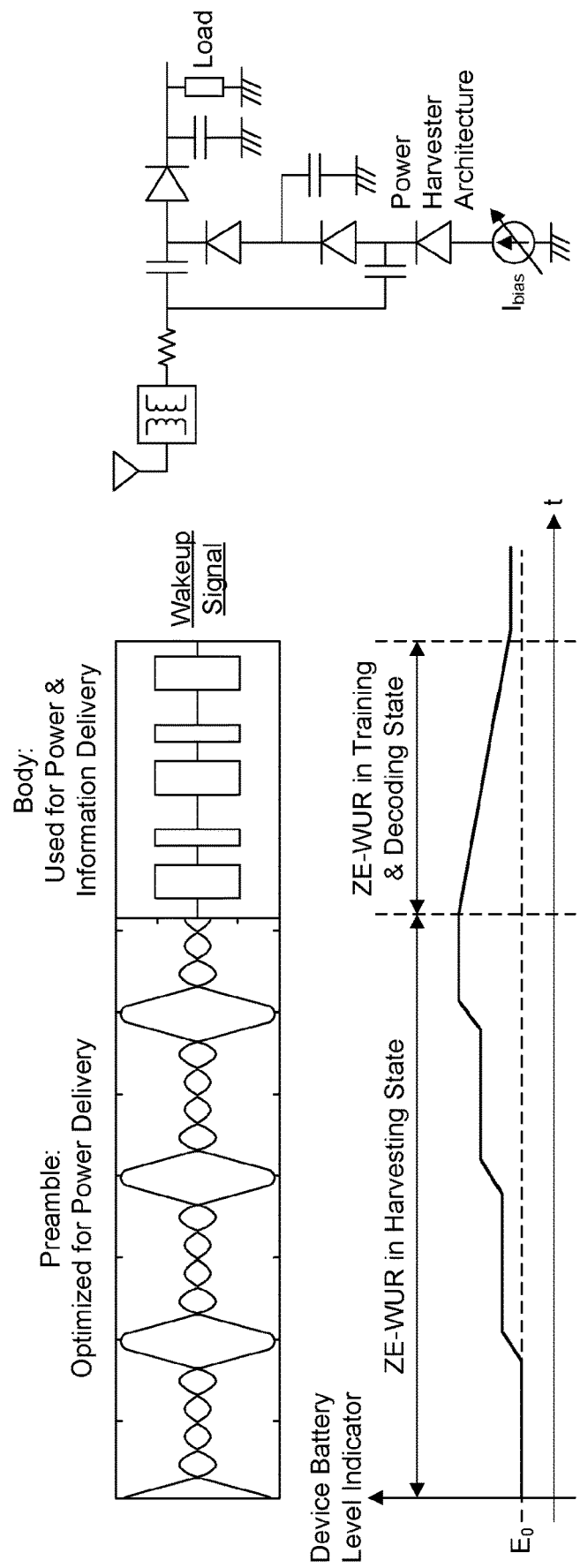
FIG. 4 is a diagram illustrating ZE signal structure and energy-harvesting profile, according to embodiments.
Figure 5:
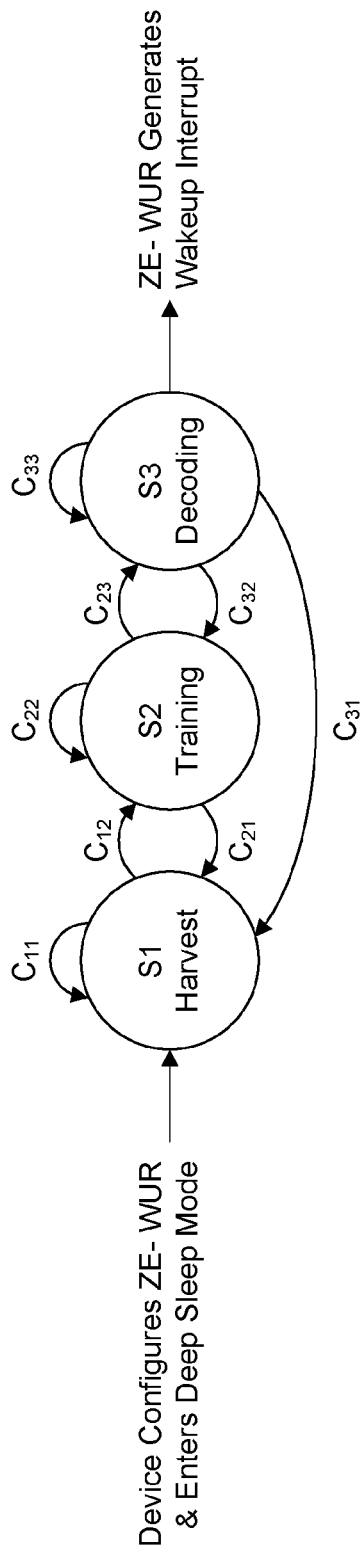
FIG. 5 is a diagram illustrating a ZE receiver state machine, according to embodiments.
Figure 6:
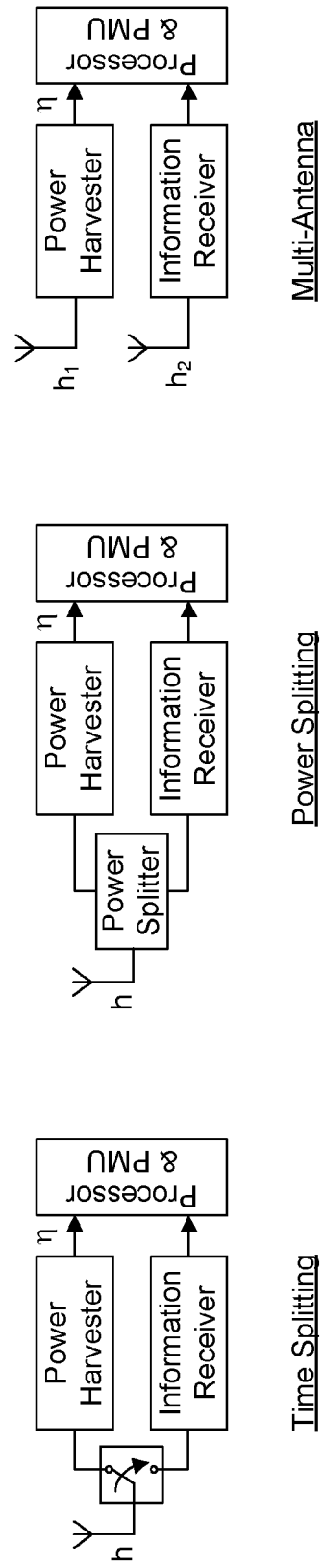
FIG. 6 is a diagram illustrating power and information multiplexing schemes, according to embodiments.

FIG. 4 is a diagram illustrating ZE signal structure and energy-harvesting profile, according to embodiments; FIG. 5 is a diagram illustrating a ZE receiver state machine, according to embodiments; and FIG. 6 is a diagram illustrating power and information multiplexing schemes, according to embodiments.

According to embodiments, a passive receiver may harvest (e.g., accumulate) energy from a received power-optimized waveform (POW) and/or signaling parts, for example, as shown in FIG. 4. According to embodiments, any of a POW and signaling parts may be associated with a measured (e.g., observed, known, detected, etc.) energy signature and/or sequence (e.g., a detected/measured) energy signature sequence. According to embodiments, processing of received ZE signaling, for example, by the passive receiver, may occur according to any of well-defined processing states and transition conditions between these states, for example, as shown in FIG. 5. According to embodiments, an energy-harvesting state and a decoding state may represent passive receiver processing while accumulating energy, for example, prior to processing an information-bearing signal(s). According to embodiments, transmissions of power-optimized waveform and/or signaling parts may occur according to any of TDM, FDM, SDM and/or power-domain multiplexing principles, for example, wherein ZE signaling parts are not (e.g., do not need to be) contiguous, for example, as shown in FIG. 6.

ZE Operation States and Functionalities

Figure 7:
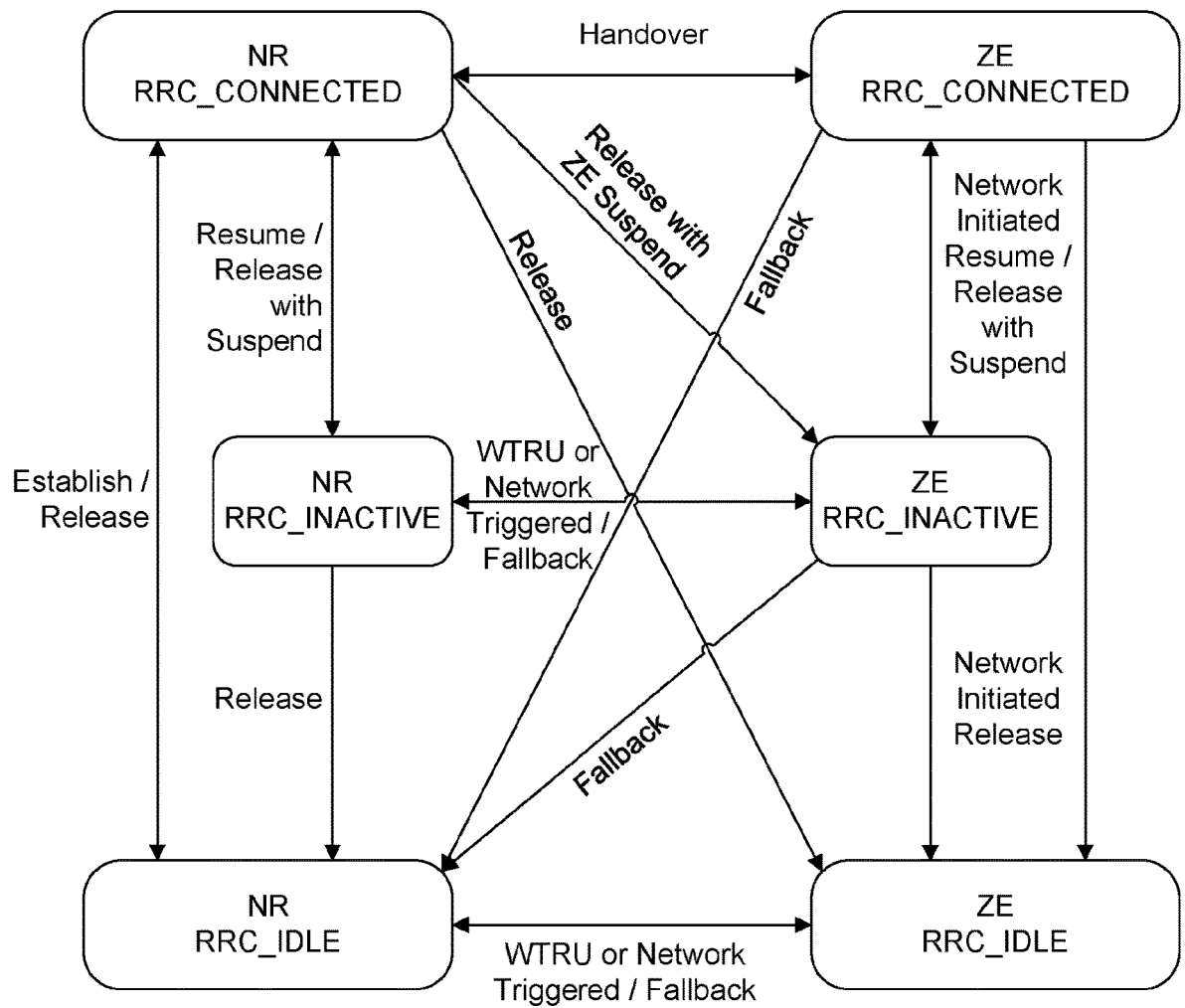
FIG. 7 is a diagram illustrating state transitions between NR and ZE air interfaces' states, according to embodiments.

FIG. 7 is a diagram illustrating state transitions between NR and ZE air interfaces' states, according to embodiments.

According to embodiments, for example, as discussed above, in the case of a passive receiver, new RRC states may (e.g., must) be defined. According to embodiments, a (e.g., new, supplementary, separate, additional, etc.) ZE air interface (e.g., associated with, corresponding to, etc., a passive receiver) may (e.g., be capable of) perform and/or have certain (e.g., similar and/or limited) capabilities and/or functionalities (e.g., operations, features, elements, functions, etc.), for example, as compared to a main Uu air interface transceiver.

According to embodiments, a passive receiver operating over a (e.g., supplementary) ZE air interface may support, in addition to energy harvesting, at least a ZE RRC_IDLE state, which may have similar functionalities as a Uu (e.g., E-UTRAN or NR) RRC_IDLE state. Further, according to embodiments, a ZE air interface may (e.g., also) support any of ZE RRC_INACTIVE and ZE RRC_CONNECTED states. Support of the ZE RRC_CONNECTED state may be limited in capability according to embodiments, for example, as compared to a (e.g., device's, WTRU's, etc.) corresponding Uu state. For example, such limited capability support may be due to a (e.g., expected) low data rate supported by the passive receiver as well as the absence or restrictive support of uplink transmissions (e.g. use of only backscattering-based UL transmissions). According to embodiments, the exemplary state transition diagram shown in FIG. 7 introduces all three ZE RRC states and describes (e.g., potential) transitions to/from NR RRC states.

Figure 8:
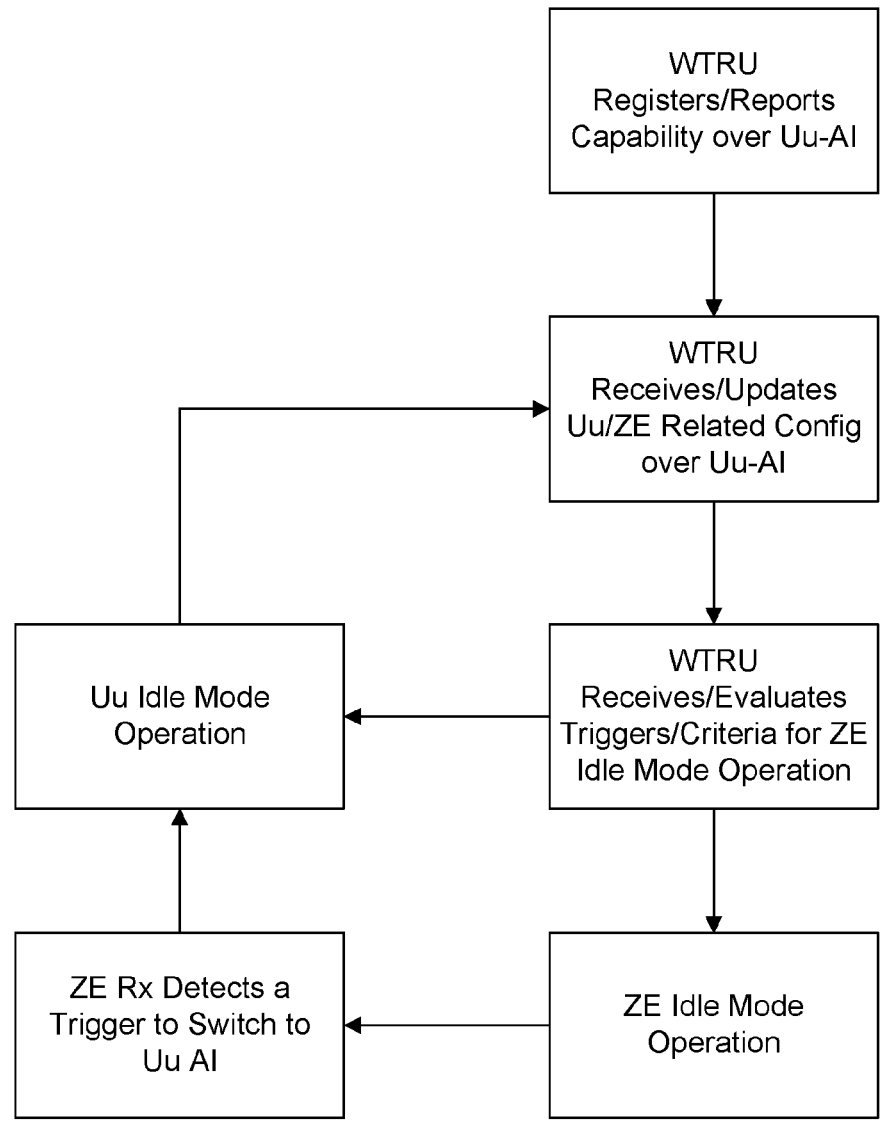
FIG. 8 is a diagram illustrating a (e.g., general) flow for WTRU idle mode operation with Uu/ZE air interfaces support, according to embodiments.

FIG. 8 is a diagram illustrating a (e.g., general) flow for WTRU idle mode operation with Uu/ZE air interfaces support, according to embodiments.

According to embodiments, a WTRU equipped with a (e.g., capable) passive receiver may (e.g., choose to) use the passive receiver for any of RRC state operations and procedures (e.g., a cell (re-)selection procedure in RRC_IDLE state) over a ZE air interface, for example, instead of the main cellular transceiver (e.g., over a Uu air interface) so as to conserve battery power. For example, according to embodiments a WTRU may operate using (e.g., over) the ZE air-interface in a ZE state, and may coordinate with the network to increase (e.g., the probability of achieving) energy equilibrium (e.g., between energy consumption and energy harvesting) or to achieve (e.g., approach) a certain value (e.g., threshold) for a ratio or margin between energy consumption and energy harvesting, for example, while operating in that state for a defined period of time. According to embodiments, a WTRU and the network may coordinate (e.g., perform signaling) to achieve energy equilibrium, for example, while operating over the ZE air-interface in any state, for example, on average over an amount of time of operating over the ZE air-interface. Referring to FIG. 8, a (e.g., generic) interaction between a ZE air interface (e.g., of a passive receiver) and a Uu air interface (e.g., of a main transceiver) is shown for WTRU operations in idle state.

According to embodiments, referring to FIG. 8, (e.g., as a first operation) a WTRU may complete network registration and may report its ZE capability to the network using a main transceiver over a Uu air interface. According to embodiments, (e.g., as a second operation) a WTRU may receive network configuration parameters for any of (e.g., both) the passive receiver and the main transceiver over the Uu air interface. According to embodiments, (e.g., as a third operation) a WTRU may monitor for (e.g., determine, check for, detect, etc.) triggers to enter idle mode, for example, using the passive receiver via (e.g., over) the ZE air interface, and/or a WTRU may evaluate network configurations for ZE idle mode operation criteria. According to embodiments, (e.g., as a fourth operation), a WTRU may start idle mode operation over any of the ZE air interface or the Uu air interface. According to embodiments, (e.g., as a fifth operation), a WTRU may keep checking for triggers to switch to idle mode operation over the Uu air interface, for example, in a case where the WTRU is (e.g., currently) operating over the ZE air interface and vice versa.

According to embodiments, a WTRU equipped with a (e.g., capable) passive receiver may (e.g., choose to) initiate a transition procedure from a Uu air interface to a ZE air interface according to any of the following triggers/criteria: (1) reception of a direct request, from a network, to operate in ZE idle mode; (2) detection of a battery level being exceeding (e.g., being below) a threshold (e.g., preconfigured at the WTRU, dynamically signaled and/or configured by the network, etc.); and (3) detection of (e.g., measuring) a cell signal strength associated with (e.g., a over, via, for, etc.,) any of a Uu air interface and a ZE air interface exceeding (e.g., being greater than) a threshold, for example, for a time value (e.g., a period of time). According to embodiments, any of threshold and timer values may be any of preconfigured at the WTRU or dynamically signaled and/or configured by a network.

According to embodiments, a WTRU equipped with a (e.g., capable) passive receiver may (e.g., choose to) initiate a (e.g., procedure for) transition from (e.g., using) a ZE air interface to a Uu air interface according to any of the following (e.g., among others) triggers/criteria: (1) reception of a direct request, from a network over (e.g., via) a Uu air interface, to operate in idle mode; (2) detection of a battery level exceeding (e.g., being above) a threshold (e.g., preconfigured at the WTRU, dynamically signaled/configured by a network, etc.); (3) detection (e.g., measurement) of a cell signal strength over the ZE air interface exceeding (e.g., being less than) a threshold for a period of time (e.g., a certain timer value), wherein the threshold and timer values may be preconfigured at the WTRU and/or dynamically signaled and/or configured by the network; (4) detection of a cell identifier that is not part of a cell identifier list (e.g., a list of cell identifiers belonging to any of a specific group of cells or a specific tracking area supporting the WTRU's idle/inactive mode operation) over the ZE air interface; (5) detection of a tracking area/notification area identifier, that is different than any of a preconfigured identifier or a list of identifiers supporting a WTRU's (e.g., current) operation in idle/inactive mode, over the ZE air interface; (6) expiration of a validity timer $T_{ZE,valid}$ that limits a WTRU's idle/inactive mode operation using the passive receiver (e.g., the ZE air interface); (7) failure of the ZE receiver to detect a ZE signal with a specific transmission format (e.g., any of a paging message or a ZE measurement reference signal total period of time defined by a timer $T_{ZE-RS,period}$, for example, (pre)configured at the WTRU or dynamically signaled and/or configured by the network; (8) failure to receive a scheduled ZE reference signal for $N_{ZE-RS,inst}$ consecutive time instances; (9) failure (e.g., of the ZE receiver) to detect a cell satisfying the ZE cell (re-)selection criteria (e.g. cell is barred, reserved, restricted for ZE air interface access, etc.); and (10) failure (e.g., of the ZE receiver) to receive enough charge/energy to sustain the WTRU's idle/inactive mode of operation over the ZE air interface (e.g., the passive receiver has access to a limited battery/capacitor that requires RF energy to charge and does not have access to the main transceiver battery).

According to embodiments, a WTRU may need (e.g., require) any number of network configuration parameters that may be any of (pre)configured at the WTRU or dynamically signaled by the network, to determine which transition procedure, if any, may be performed (e.g., considered) by the WTRU. According to embodiments, such configuration parameters may include, but are not limited to, any of: (1) a current cell, a tracking area, and/or a notification area supporting WTRU RRC state operation over a ZE air interface; (2) a current cell, a tracking area, and/or a notification area supporting WTRU autonomous air interface switching; (3) a hysteresis/offset timer $T_{off,t}$ that controls a WTRU's monitoring period of the cell/tracking area/notification area that triggered an air interface switch; (4) a timer $T_{meas}$ that determines a measurement duration associated with (e.g., corresponding to, considered for) received signal strength measurement over the ZE air-interface using ZE reference signal(s); (5) a threshold $T_{sig}$ that controls triggering criterion for transitioning to a ZE air-interface according to a ZE received signal strength; (6) a threshold $T_b$ that controls triggering criterion for transitioning to a ZE air-interface using a (e.g., current) level of WTRU's battery; (7)

a threshold $T_{sig,min}$ that controls triggering criterion for transitioning to a Uu air-interface according to a ZE received signal strength; and (8) a threshold $T_{b,charged}$ that controls triggering criterion for transitioning to a Uu air-interface using a (e.g., current) level of a WTRU's battery.

Procedures for a WTRU's State Transitions Involving ZE RRC IDLE

According to embodiments, any of procedures, features, and/or operations, for example, as discussed herein above and below, may support a WTRU's transition to/from the ZE RRC_IDLE state, for example, in the case of any of: (1) a WTRU's transition from RRC_IDLE state over the Uu air-interface to RRC_IDLE state over the ZE air-interface; (2) a WTRU's transition from RRC_CONNECTED state over the Uu air-interface to RRC_IDLE state over the ZE air-interface; and (3) a WTRU's transition from RRC_IDLE state over the ZE air-interface to RRC_IDLE state over the Uu air-interface.

According to embodiments, a WTRU may transition from a Uu RRC_IDLE state/mode to a ZE RRC_IDLE state/mode. According to embodiments, a WTRU equipped with a (e.g., capable) passive receiver may complete a transition from Uu air interface idle mode operation to ZE air interface idle mode operation, for example, using any of the procedures, operations, and features discussed below, which may be categorized into one of the following: (1) a WTRU-initiated state transition with WTRU/network state synchronization signaling; (2) a WTRU-initiated autonomous state transition; and (3) a network-initiated state transition.

According to embodiments, (e.g., as a first step) a WTRU may report its ZE capability to a network, for example, while connected over the Uu air interface. According to embodiments, (e.g., as a second step) a WTRU may be configured with a ZE feature transition priority, for example, using (e.g., via, through, etc.) any of an RRC release message or as a (e.g., received) system information parameter received over the Uu air interface. Such a WTRU, that is (e.g., currently) operating in RRC_IDLE state over the Uu air interface, may (e.g., then) keep track of the received signal strength over the ZE air interface, for example, using any of a cell/beam specific ZE reference signal and counting a number of threshold-triggering events within a specified transmission/measurement window $T_{meas}$. That is, according to embodiments, a ZE feature transition priority may indicate (e.g., imply) a network's support of the ZE air-interface, and in such a case, the network may provide (e.g., the necessary) ZE reference signals. According to embodiments, (e.g., as a fourth step), a WTRU may detect a trigger to transition from RRC_IDLE state operation over the Uu air interface to RRC_IDLE state over the ZE air interface (e.g., a trigger corresponding to a ZE received signal strength being above a preconfigured/signaled threshold $T_{sig}$ and a battery level being below another preconfigured/signaled threshold $T_b$). According to embodiments, (e.g., as a fifth step), a WTRU may determine a configured low ZE feature transition priority and may begin a WTRU-initiated state transition procedure. According to embodiments, a low ZE feature transition priority may indicate (e.g., imply) a network's support of the ZE air-interface, and may be provided in response to (e.g., may require a prior/received) indication from a WTRU to enable associated functionalities and/or states.

Figure 9:
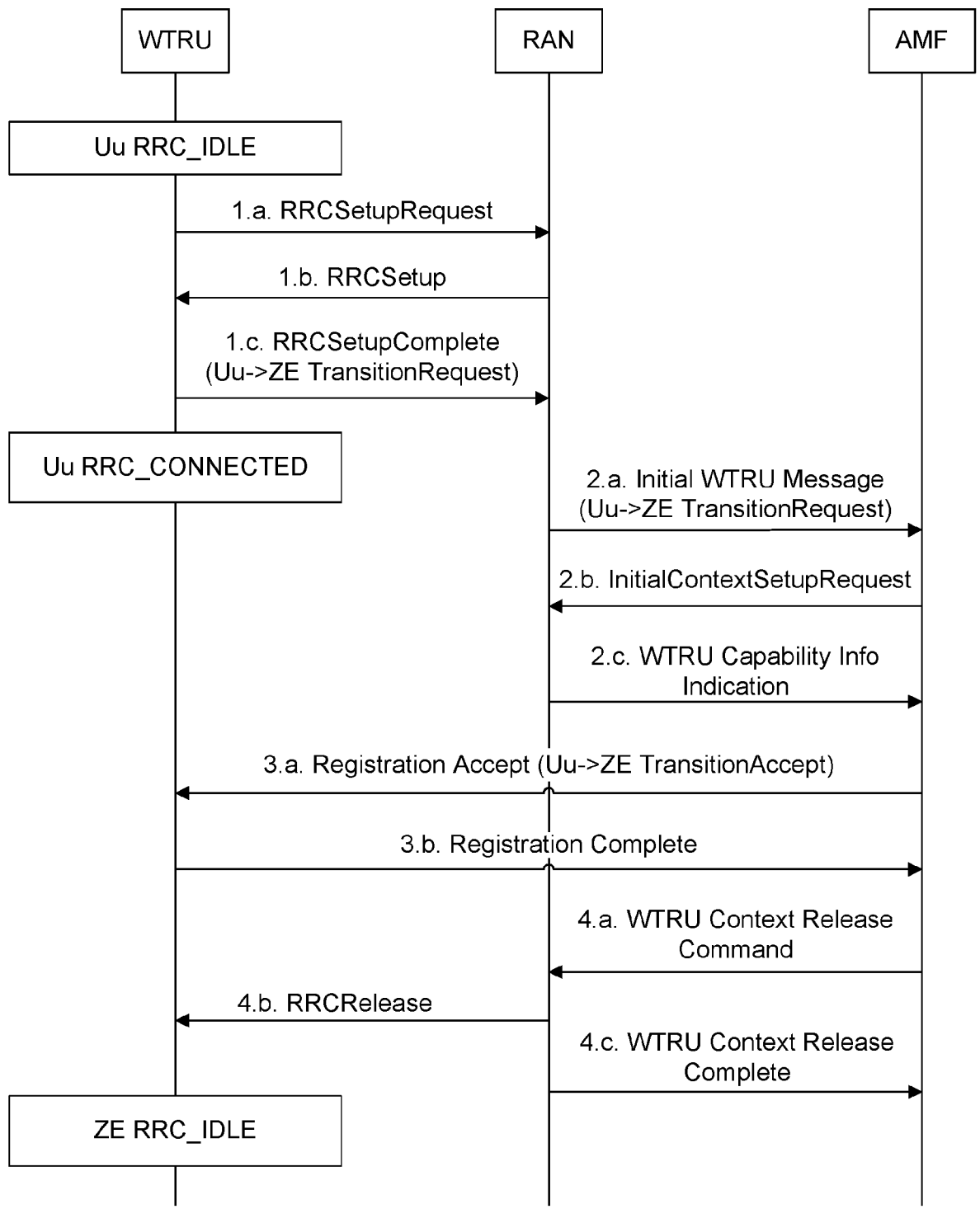
FIG. 9 is a diagram illustrating a (e.g., WTRU's) procedure for requesting transition from RRC_IDLE over a Uu air-interface to RRC_IDLE over a ZE air-interface, according to embodiments.

FIG. 9 is a diagram illustrating a (e.g., WTRU's) procedure for requesting transition from RRC_IDLE over a Uu air-interface to RRC_IDLE over a ZE air-interface, according to embodiments.

According to embodiments, a WTRU-initiated state transition procedure is depicted in the form of message and signaling exchange sequence in FIG. 9. According to embodiments, such a procedure may begin according to (e.g., upon) a WTRU initiating an RRC connection establishment procedure over a Uu air interface, for example, in a first step. According to embodiments, in such a first step, a WTRU may sets any of: (1) an establishmentCause IE in the RRCSetupRequest message to indicate a request to transition from RRC operation over the Uu to ZE air interface; and (2) the content of the initial WTRU message in the RRCSetupComplete message to indicate a request to transition from RRC operation over the Uu to ZE air interface, for example, which may correspond to a Registration Request initial WTRU message with registration type set to Mobility Registration Update.

According to embodiments, (e.g., as a second step), a network (e.g., a RAN) may update the Paging Assistance Info stored in the serving AMF, for example, by: (a) forwarding the Initial UE Message to the serving AMF, (b) retrieving the WTRU CONTEXT from the InitialContextSetupRequest message received from the AMF, and (c) sending a WTRU Capability Info Indication with an updated Paging Assistance Info to the AMF. According to embodiments, (e.g., as a third step), the network (e.g., the AMF) and the WTRU agree on ZE-related network parameters, such as, for example, support of on-demand versus duty cycled paging, as well as duty cycle period, over the ZE air-interface. In such a step, a WTRU may (e.g., first) receive a Registration Accept message from AMF indicating network acceptance of the WTRU's transition from RRC_IDLE over the Uu air interface to being over the ZE air interface, along with the ZE-related network parameters. The WTRU may (e.g., then) use the ZE-related network parameters, for example, to configure the WTRU's ZE receiver and send a Registration Complete message to the AMF to acknowledge the ZE-related configuration.

According to embodiments, (e.g., as a fourth step) a fourth step, the AMF may initiate a connection release and a RAN may provide ZE-related RAN parameters. In such a step, the AMF may initiate the connection release by sending a WTRU Context Release Command message to a RAN node, which in turn transmits an RRCRelease message to the WTRU that might include the ZE-related RAN parameters. According to embodiments, the RAN node may send a WTRU Context Release Complete message to the AMF, and such message may include Information on recommended cells and RAN nodes for paging.

According to embodiments, a WTRU's reported ZE capability may include (e.g., be associated with, indicate, etc.) any of the following parameters: (1) supported frequency bands of operation; (2) number of sub-bands supported within each identified band of operation; (3) bandwidth of and spacing between the ZE supported sub-bands; and (4) number of simultaneously supported reception chains.

According to embodiments, a WTRU may report only its non-ZE capability to the network while connected over the Uu air interface and, for example, then initiate RRC_IDLE state operations. According to embodiments, a WTRU currently operating in RRC_IDLE state over the Uu air interface, may (e.g., then) keep track of the received signal strength over the ZE air interface by using (e.g., measuring) a cell/beam specific ZE reference signal and by counting the number of threshold-triggering events within a specified transmission/measurement window $T_{meas}$. According to embodiments, ZE reference signal configuration and related parameters may be provided to a WTRU as part of periodically transmitted System Information. According to embodiments, a WTRU may (e.g., then, as a next step, etc.) detects a trigger to transition from RRC_IDLE state operation over the Uu air interface to RRC_IDLE state over the ZE air interface. For example, such a trigger may be any of a ZE received signal strength being above a preconfigured/signaled threshold $T_{sig}$ and a battery level being below another preconfigured/signaled threshold $T_b$. According to embodiments, for example, upon detecting such a trigger, the WTRU may begins a WTRU-initiated state transition procedure.

FIG. 10 is a diagram illustrating a procedure for a WTRU updating its ZE capability and requesting transition from RRC_IDLE over a Uu air-interface to RRC_IDLE over a ZE air-interface, according to embodiments.

According to embodiments, a WTRU-initiated state transition procedure may use a message and signaling exchange sequence, for example, as shown in FIG. 10. According to embodiments, (e.g., as a first step) a WTRU may initiate an RRC connection establishment procedure over the Uu air interface, and the WTRU may set any of: (1) an establishmentCause IE in the RRCSetupRequest message to indicate a request to transition from RRC operation over the Uu to ZE air interface; and (2) content of an initial WTRU Message in the RRCSetupComplete message to indicate a request to update WTRU's capability related to ZE air-interface (e.g., corresponding to a Registration Request initial WTRU message with registration type set to Mobility Registration Update).

According to embodiments, (e.g., as a second step) a network (e.g., an AMF) may initiate a WTRU's ZE-related capability update, for example, after receiving the Initial WTRU Message requesting the update, by: (e.g., first) sending an InitialContextSetupRequest message to the serving RAN node, (e.g., second) the RAN node determining that ZE-related capability is missing, (e.g., third, subsequently, etc.) transmitting a UECapabilityEnquiry and receiving a UECapabilityInformation message from the WTRU, and (e.g., fourth) the AMF receiving the WTRU's updated capability as well as Paging Assistance Info in a WTRU Capability Info Indication message from the serving RAN node.

According to embodiments, (e.g., as a third step) a network (e.g., the AMF) and the WTRU may agree on ZE-related network parameters, such as, for example, support of on-demand versus duty cycled paging, as well as duty cycle period, over the ZE air-interface. According to embodiments, (e.g., in such a step) a WTRU may (e.g., first) receive a Registration Accept message from the AMF indicating network acceptance of the WTRU's transition from RRC_IDLE over a Uu air interface to a ZE air interface along with the ZE-related network parameters. A WTRU may (e.g., then) use the ZE-related network parameters to configure its ZE receiver and to send a Registration Complete message to the AMF to acknowledge the ZE-related configuration.

According to embodiments, (e.g., as a fourth step) an AMF may initiate a connection release and a RAN may provide ZE-related RAN parameters, for example, with/to a WTRU. According to embodiments, (e.g., in such a step) the AMF may initiate a connection release by sending a WTRU Context Release Command message to a RAN node, which in turn may transmit an RRCRelease message to the WTRU, and the message may include the ZE-related RAN parameters (e.g. a ZE feature transition priority with an associated validity timer value, and information indicating whether the validity timer is a newly defined timer or a T320 timer.

According to embodiments, a RAN node may (e.g., then) send a WTRU Context Release Complete message to the AMF, and such message may include Information indicating any of recommended cells and RAN nodes for paging.

Figure 11:
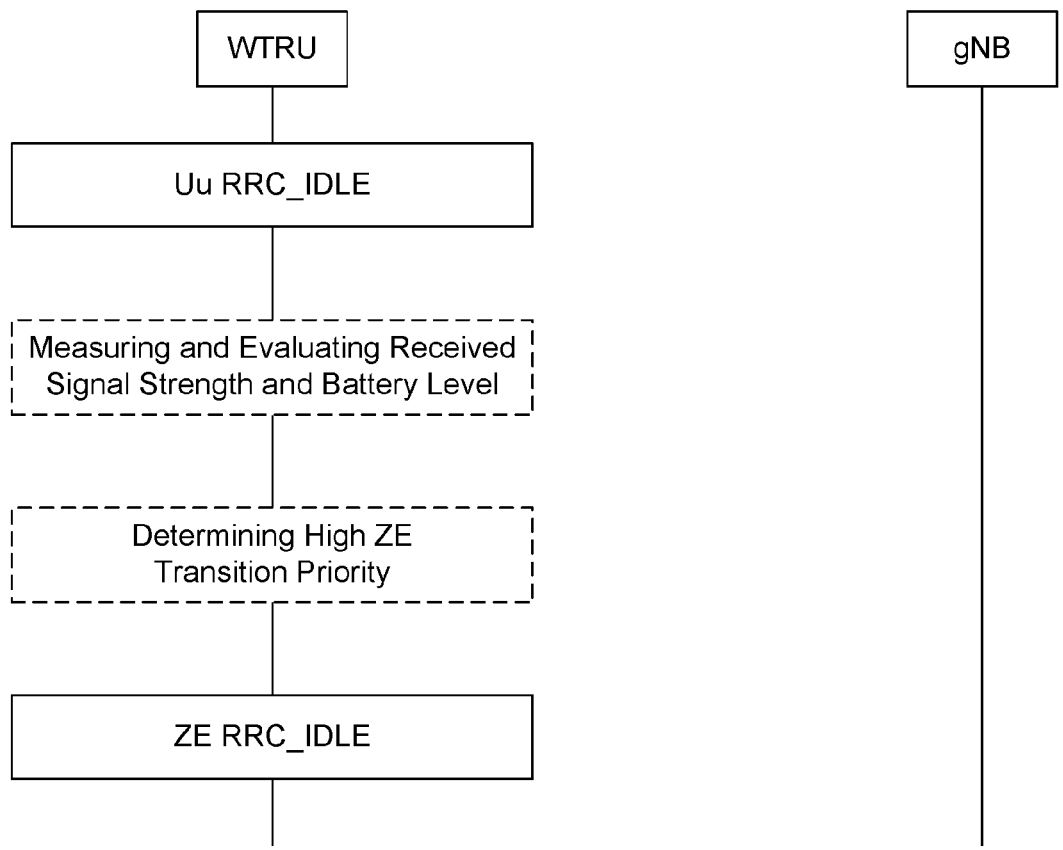
FIG. 11 is a diagram illustrating a procedure for a WTRU autonomously transitioning from RRC_IDLE over Uu air-interface to RRC_IDLE over ZE air-interface, according to embodiments.

FIG. 11 is a diagram illustrating a a procedure for a WTRU autonomously transitioning from RRC_IDLE over Uu air-interface to RRC_IDLE over ZE air-interface, according to embodiments.

Referring to FIG. 11, according to embodiments, (e.g., as a first step) a WTRU may report its ZE capability to the network while connected over the Uu air interface. According to embodiments, (e.g., as a second step) a WTRU may be configured with a ZE feature transition priority, for example, using any of an RRC release message or as a (e.g., one of received) system information parameters received over the Uu air interface. According to embodiments, (e.g., as a third step) a WTRU, that is currently operating in RRC_IDLE state over the Uu air interface, may (e.g., then) keep track of the received signal strength over the ZE air interface, for example, by using a cell/beam specific ZE reference signal and counting a (e.g., certain) number of threshold-triggering events within a specified transmission/measurement window $T_{meas}$.

According to embodiments, (e.g., as a fourth step) a WTRU may detect a trigger to transition from RRC_IDLE state operation over the Uu air interface to RRC_IDLE state over the ZE air interface (e.g. a ZE received signal strength is above a preconfigured/signaled threshold $T_{sig}$ and a battery level is below another preconfigured/signaled threshold $T_b$). According to embodiments, (e.g., as a fifth step) a WTRU may determine a configured high ZE feature transition priority and may autonomously switch to RRC_IDLE state operations over the ZE air-interface. According to embodiments, the above discussed WTRU autonomous state transition procedure is shown in FIG. 11, wherein interaction between the WTRU and current or past serving RAN nodes is not required for the transition to happen.

Figure 12:
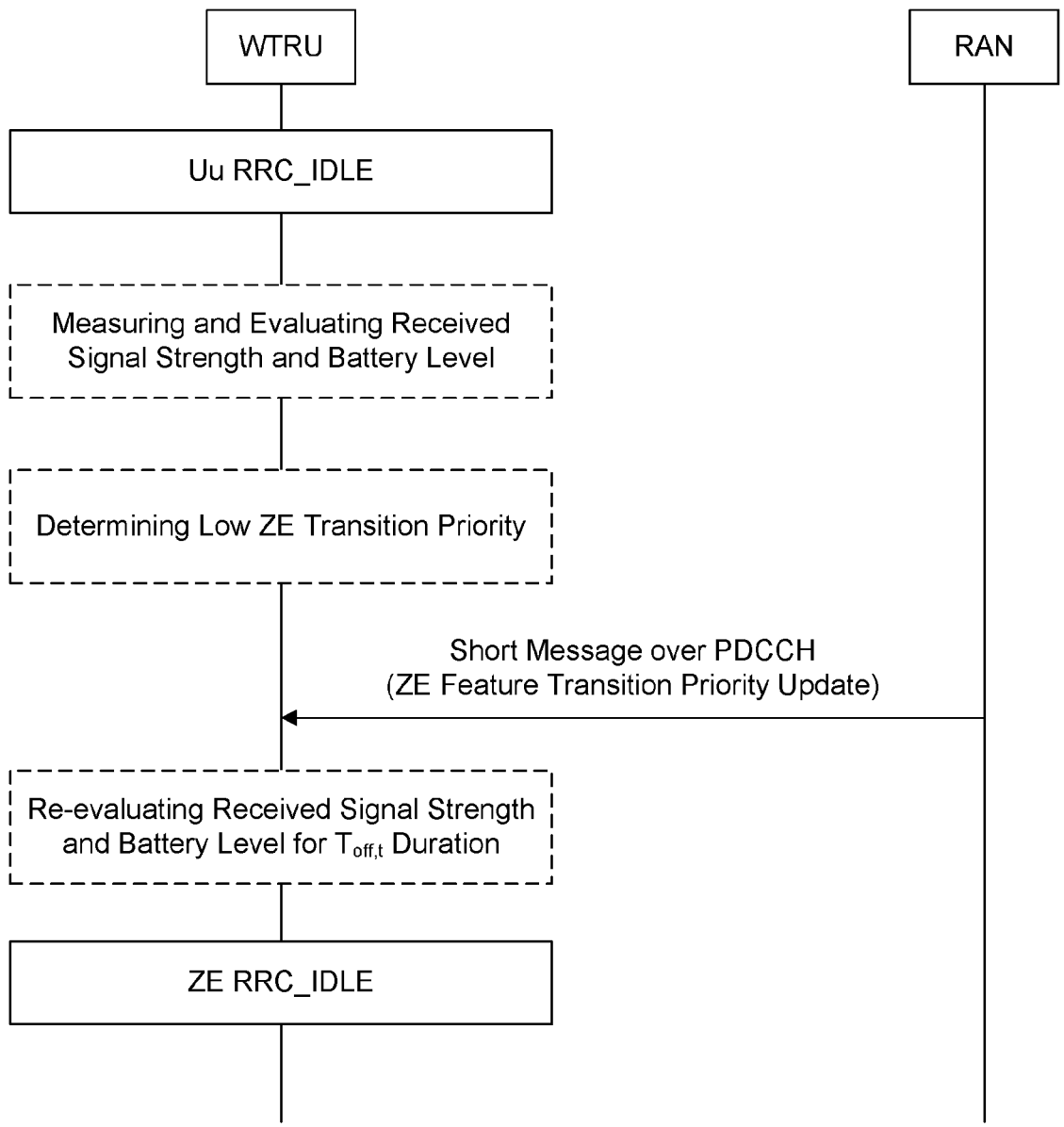
FIG. 12 is a diagram illustrating a network-initiated transition of ZE-capable WTRU from RRC_IDLE over Uu air-interface to RRC_IDLE over ZE air-interface, according to embodiments.

FIG. 12 is a diagram illustrating a network-initiated transition of ZE-capable WTRU from RRC_IDLE over Uu air-interface to RRC_IDLE over ZE air-interface, according to embodiments.

Referring to FIG. 12, according to embodiments, (e.g., as a first step) a WTRU may reports its ZE capability to the network while connected over the Uu air interface. According to embodiments, (e.g., as a second step) the WTRU, may be configured with a ZE feature transition priority using any of an RRC release message or as one of the received system information parameters received over the Uu air interface. According to embodiments, (e.g., as a third step) the WTRU, currently operating in RRC_IDLE state over the Uu air interface, may keep track of the received signal strength over the ZE air interface using any of a cell/beam specific ZE reference signal and counting a number of threshold-triggering events within a specified transmission/measurement window $T_{meas}$ According to embodiments, (e.g., as a fourth step) a WTRU, may detect a trigger to transition from RRC_IDLE state operation over the Uu air interface to RRC_IDLE state over the ZE air interface (e.g. a ZE received signal strength above a preconfigured/signaled threshold $T_{sig}$ and a battery level below another preconfigured/signaled threshold $T_b$).

According to embodiments, (e.g., as a fifth step) the WTRU may determine a configured low ZE feature transition priority and may decide to wait for a network-initiated state transition. According to embodiments, (e.g., as a sixth step) the WTRU may receive an indication about a ZE feature transition priority modification using a Short Message transmitted with P-RNTI over DCI, and the indication may signify a change from any of high to low priority, low to high priority, or both. According to embodiments, such indication (e.g., about a ZE feature transition priority modification) may be associated with (e.g., may involve) a decision performed by a network (e.g., at the RAN) to support ZE signaling, for example, for a specific number of WTRUs/devices, or a certain class of devices, for example, based on resource availability for supporting a certain (e.g., required) feature. According to embodiments, (e.g., as an alternative) a WTRU may receive a CN Paging message indicating a WTRU-specific ZE feature transition priority change. According to embodiments, (e.g., as a seventh step) upon detection of a change of the ZE feature transition priority from low to high, the WTRU may keep track of the triggering cell or tracking area for a timer $T_{off,t}$ duration, for example, to ensure that the transition triggering condition still holds, and the WTRU may autonomously switch to RRC_IDLE state operation over the ZE air-interface. The Network-initiated state transition procedure, for example, as described above, may be as depicted in FIG. 12, such that only a minimal signaling exchange is used (e.g., required) between the RAN node and the WTRU.

According to embodiments, ZE feature transition priority levels may (e.g., might as well) be discretized into more than the two {'low', 'high'} levels discussed above. For example, according to embodiments, there may be a three level {'network', 'low', 'high'} ZE transition priority, such that the levels' titles do not necessarily have to be as shown herein, and different titles may be considered. According to embodiments, in the case of three levels, at least the two levels {'low', 'high'}, such may indicate network's support of WTRU-initiated and autonomous state transition, while a third level {'network'} signifies network support of network-initiated state transition only.

Figure 13:
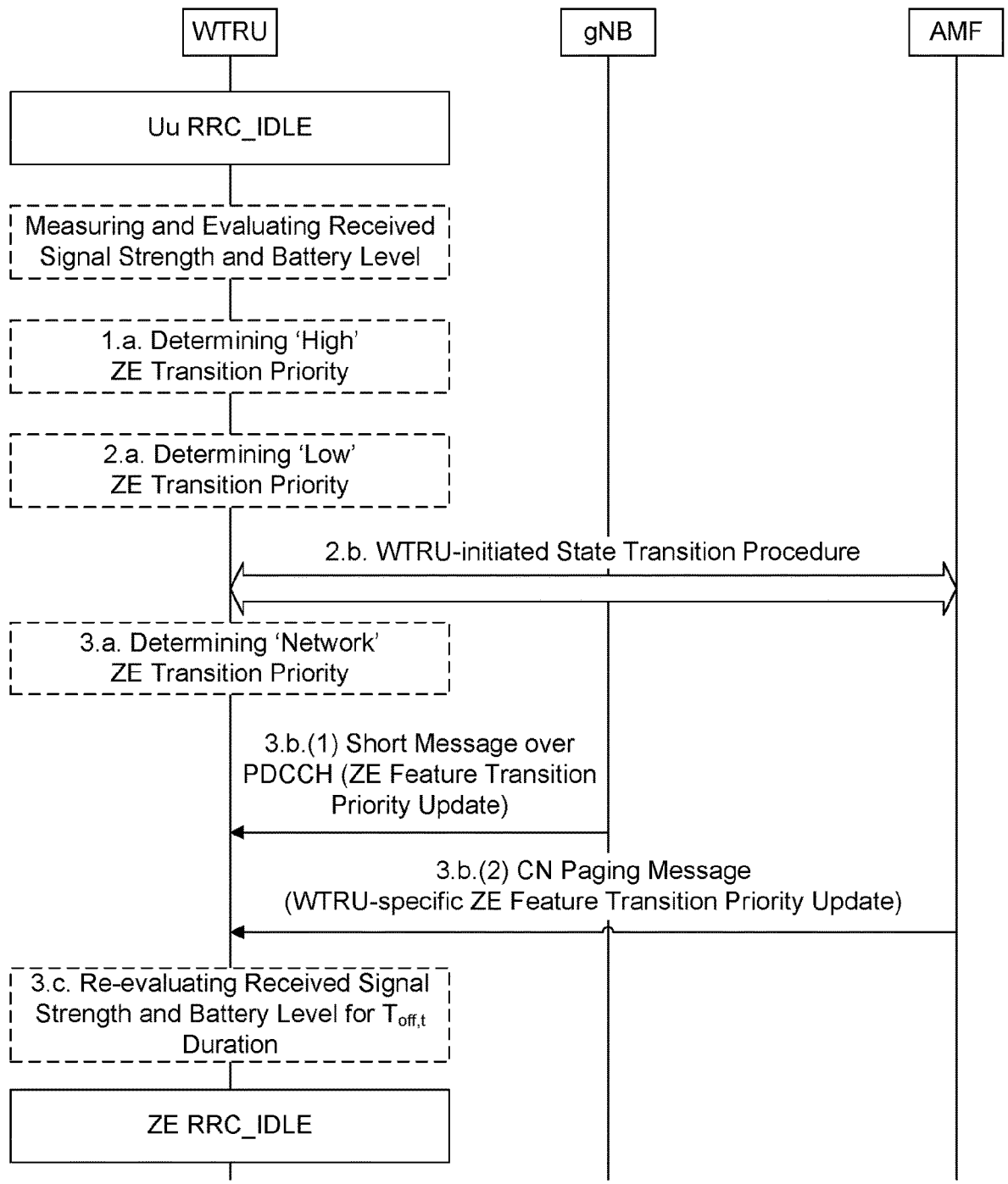
FIG. 13 is a diagram illustrating a (e.g., decision) sequence for a WTRU transitioning from RRC_IDLE over Uu air-interface to RRC_IDLE over ZE air-interface, according to embodiments.

FIG. 13 is a diagram illustrating a (e.g., decision) sequence for a WTRU transitioning from RRC_IDLE over Uu air-interface to RRC_IDLE over ZE air-interface, according to embodiments.

According to embodiments, (e.g., as a first step) a WTRU may report its ZE capability to a network while the WTRU is connected to the network over the Uu air interface. According to embodiments, (e.g., as a second step) a WTRU may be configured with a ZE feature transition priority via any of an RRC release message or one of the received system information parameters (e.g., received over the Uu air interface). According to embodiments, (e.g., as a third step) a WTRU, for example, that is currently operating in RRC_IDLE state over the Uu air interface, may keep track of the received signal strength over the ZE air interface via (e.g., by using) a cell/beam specific ZE reference signal and by counting a number of threshold-triggering events within a specified transmission/measurement window $T_{meas}$. According to embodiments, (e.g., as a fourth step) a WTRU may detects a trigger for transitioning from RRC_IDLE state operation over the Uu air interface to RRC_IDLE state over the ZE air interface (e.g., the trigger may be based on a ZE received signal strength being above a preconfigured/signaled threshold $T_{sig}$ and a battery level being below another preconfigured/signaled threshold $T_b$.

According to embodiments, (e.g., as a fifth step) a WTRU may determine a configured high ZE feature transition priority and may autonomously switch to RRC_IDLE state operations over the ZE air-interface. According to embodiments, (e.g., as an alternative/other fifth step) the WTRU may determine a configured low ZE feature transition priority and may begin a WTRU-initiated state transition procedure, for example, as described earlier. According to embodiments, (e.g., as another alternative/other fifth step) the WTRU may determine a configured network ZE feature transition priority and may decides to wait for a network-initiated state transition using either a Short Message or a CN Paging message. According to embodiments, (e.g., as a sixth step) upon detection of a change of the ZE feature transition priority from network to high, the WTRU may keep track of the triggering cell or tracking area for a timer $T_{off,t}$ duration, for example, to ensure that the transition triggering condition still holds, and the WTRU may autonomously switch to RRC_IDLE state operation over the ZE air-interface. The signaling exchange and decision sequences described above, for example, for all three fifth step scenarios, is shown in FIG. 13.

Figure 14:
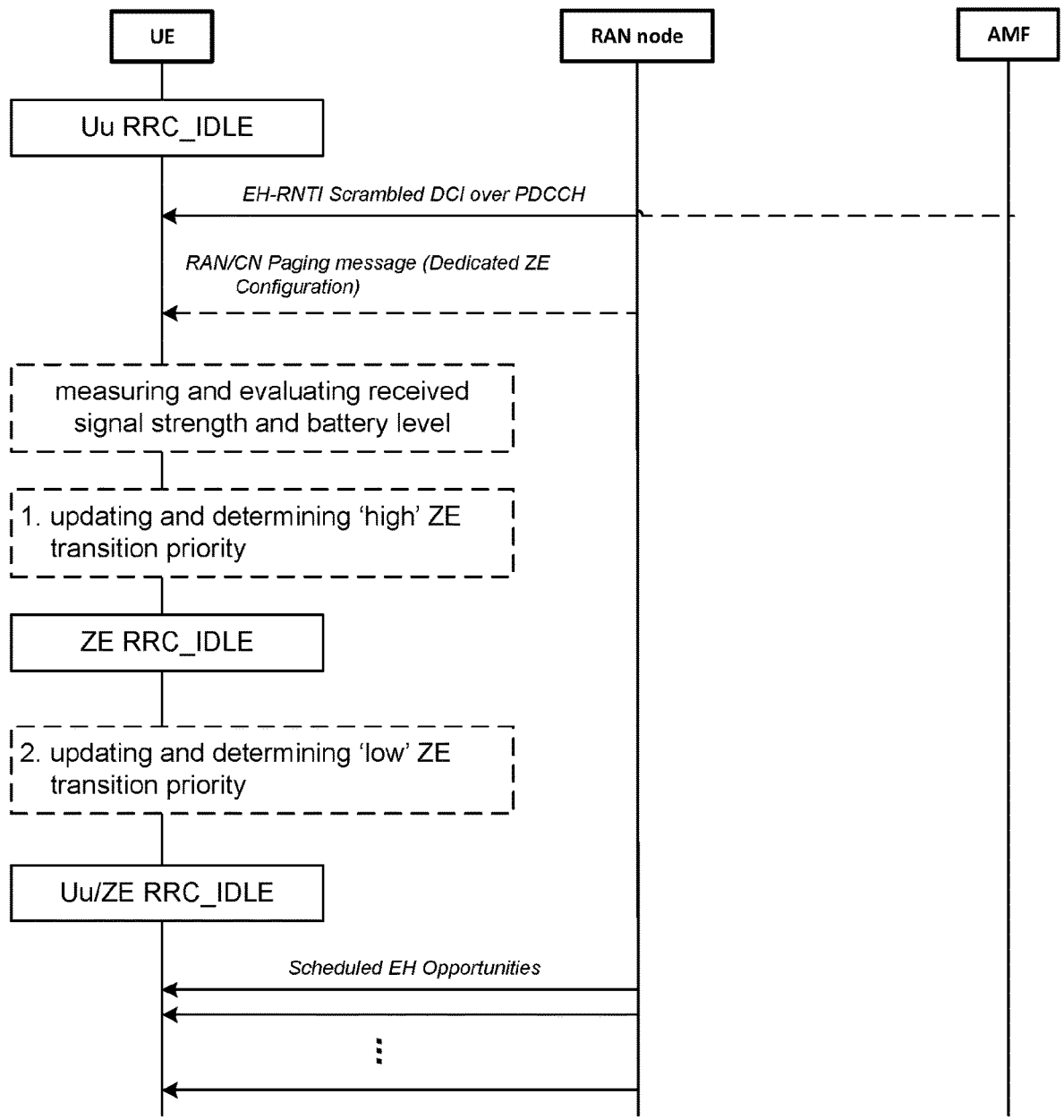
FIG. 14 is a diagram illustrating a WTRU's decision sequence to transition to RRC_IDLE over a ZE air-interface for EH support, according to embodiments.

FIG. 14 is a diagram illustrating a WTRU's decision sequence to transition to RRC_IDLE over a ZE air-interface for EH support, according to embodiments.

According to embodiments, for example, referring to FIG. 14 as a first step, a WTRU may report a ZE capability, such as it's own ZE capability, to a network, for example, while connected to the network via a Uu air interface. According to embodiments, for example, as a second step referring to FIG. 14, the WTRU may be configured with a ZE feature transition priority, for example, through (e.g., using, via, etc.) any of an RRC release message or the received system information parameters received over the Uu air interface. According to embodiments, a WTRU may (e.g., also) be assigned a ZE-RNTI or EH-RNTI. For example, according to embodiments, any of a ZE-RNTI or an EH-RNTI may be assigned to a WTRU as part of a RRC release message used to address a group of WTRUs within a tracking area (TA), for example, so that signalling for any of configuration of a ZE air-interface configuration or dedicated energy harvesting (EH) is provided while the WTRU is in RRC_IDLE state. According to embodiments, any of a ZE-RNTI or a EH-RNTI may be assigned by a RAN, for example, according to any of a WTRU's ZE class, subscription plan, and/or ZE capability; and the assigned values (e.g., ZE-RNTI, EH-RNTI) may be coordinated across multiple RANs within a TA and/or across multiple TAs.

According to embodiments, for example, as a third step referring to FIG. 14, a WTRU may be (e.g., currently) operating in RRC_IDLE state over the Uu air interface, and such a WTRU may detect a DCI over a PDCCH with a CRC that is scrambled by its configured ZE-RNTI/EH-RNTI. According to embodiments, a DCI message may contain any of a field representing a (e.g., only) short message, a field representing (e.g., associated with, including, indicating, etc.) (e.g., only) scheduling information for a ZE-related Paging message, and a combination of both fields. According to embodiments, for example, on condition that (e.g., in a case where) DCI contains scheduling information, a WTRU may use (e.g., utilize) the scheduling information to decode a PDSCH and receive additional ZE-related configuration information (e.g., information indicating any of a change of ZE feature transition priority, a dedicated EH signaling configuration, etc.). According to embodiments, (e.g., use of, etc.) any of a ZE-RNTI and a EH-RNTI scrambled DCI may be initiated by any of (e.g., transmission/reception of) a RAN or a CN paging message, for example, that is intended for a class of ZE-capable WTRUs according to any of (respective, group, etc.) capabilities and subscription plans. According to embodiments, in such a case, a RAN may (e.g., still) initiate the paging message even though the WTRU is in IDLE state. According to embodiments, in such a case, a paging message may be transmitted to a WTRU because the provided service (e.g., EH) may be a class/subscription-based best effort service that does not require: (1) WTRU-specific addressing; and (2) the WTRU to be in RRC_CONNECTED state.

According to embodiments, for example, as a fourth step referring to FIG. 14, a WTRU may measure and determine a received signal strength over a ZE air interface, for example, by using (e.g., utilizing) a cell and/or beam specific ZE reference signal and counting number of threshold-triggering events within a specified measurement window $T_{meas}$. According to embodiments, for example, as a fifth step referring to FIG. 14, a WTRU may detect (e.g., determine occurrence of, etc.) a trigger. For example, such a trigger may be any of a trigger to transition from RRC_IDLE state operation over the Uu air interface to RRC_IDLE state over the ZE air interface, and a trigger to monitor EH opportunities over the ZE air interface. According to embodiments, for example, in a case of detecting such a trigger, a WTRU may determine a configured high ZE feature transition priority. According to embodiments, for example, as a sixth step referring to FIG. 14, a WTRU may autonomously switch to RRC_IDLE state operations over the ZE air-interface and may perform energy harvesting, for example, according to configured opportunities.

Figure 15:
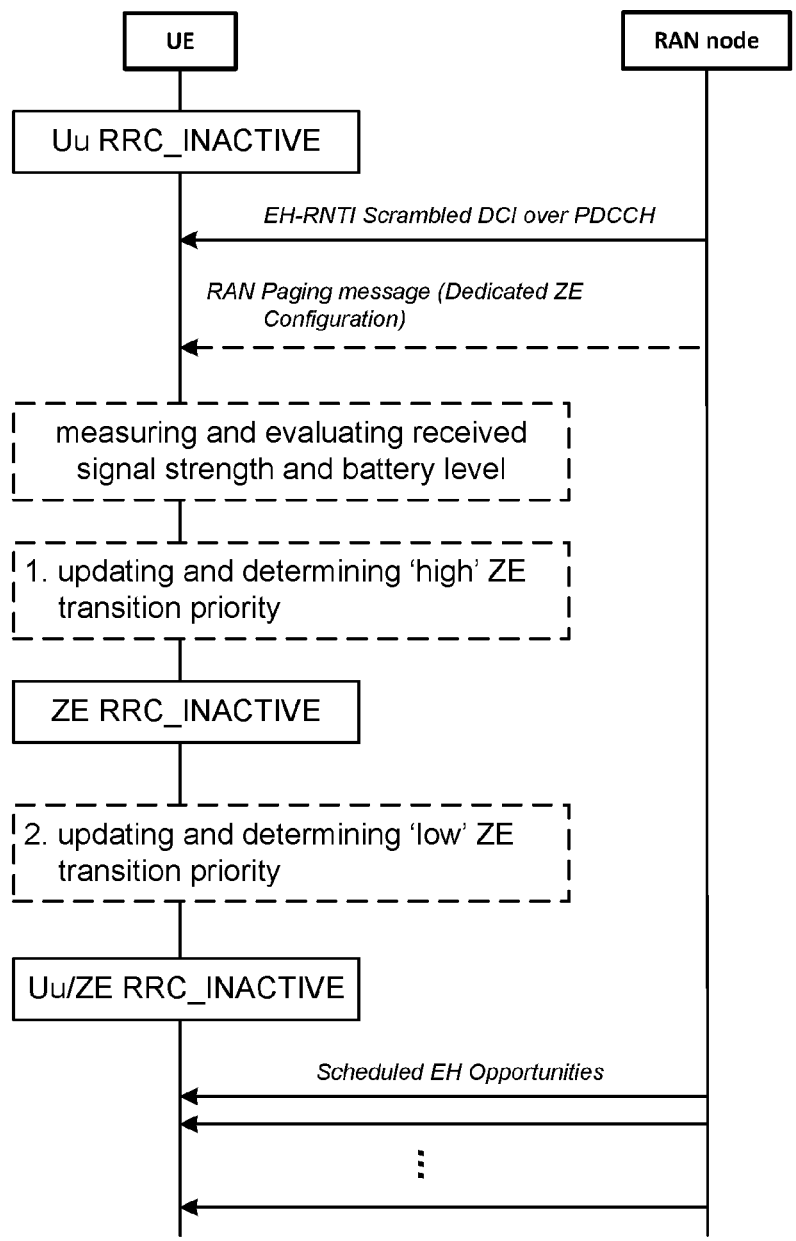
FIG. 15 is a diagram illustrating a WTRU's decision sequence to transition to RRC_IDLE over a ZE air-interface for EH support, according to embodiments.

FIG. 15 is a diagram illustrating a WTRU's decision sequence to transition to RRC_IDLE over a ZE air-interface for EH support, according to embodiments.

According to embodiments, for example, as another, an additional, and/or alternative fifth step referring to FIG. 15, a WTRU may perform any of: (1) detect a trigger for (e.g., associated with, indicating, etc.) transitioning from a RRC_IDLE state operation over the Uu air interface to a RRC_IDLE state over the ZE air interface; (2) detect a trigger to monitor EH opportunities over the ZE air interface; and (3) determine a configured low ZE feature transition priority. According to embodiments, in such a case, referring to FIG. 15, for example, as a sixth step, a WTRU may remain in RRC_IDLE state operation over the Uu air interface, and may concurrently use (e.g., utilize) the ZE air-interface to perform energy harvesting according to configured opportunities. According to embodiments, for example, as another, an additional, and/or alternative fifth step referring to FIG. 15, a WTRU may detect (e.g., only) a trigger to monitor EH opportunities over the ZE air interface and may determine a configured ZE feature transition priority to be any of low or high. According to embodiments, in such a case, as a sixth step, a WTR may remain in the RRC_IDLE state operation over the Uu air interface, and may (e.g., concurrently) use the ZE air-interface to perform energy harvesting according to configured opportunities.

According to embodiments, a signaling exchange and decision sequences described for the support of WTRU's energy harvesting over the ZE air-interface while operating in an RRC_IDLE state is shown in FIG. 15 and discussed herein above and below.

According to embodiments, a WTRU may report ZE capability and may receive ZE-related network configuration information, such as any of a ZE Class, a ZE feature transition priority, a dynamic UE-class-based ZE-RNTI and/or EH-RNTI, a ZE reference signal config, paging sub-band(s), and a default EH signal configuration information over a Uu air interface. According to embodiments, a WTRU may operate in Uu RRC_IDLE state and may detect a DCI transmitted over a PDCCH with a CRC scrambled by the configured ZE-RNTI or EH-RNTI. According to embodiments, in a case where a DCI includes a scheduling information field, a WTRU may use (e.g., utilize) the DCI to decode a PDSCH and receive ZE-related configuration information, such as, for example, a change of ZE feature transition priority and/or dedicated EH signaling configuration information. According to embodiments, a WTRU may measure and/or determine a ZE received signal strength $RSSI_{ZE}$, for example, by using (e.g., utilizing) a ZE reference signal(s) within a specified measurement window $T_{meas}$. According to embodiments, a WTRU may detect a trigger for transitioning to ZE RRC_IDLE state (e.g. a trigger associated with any of $RSSI_{ZE} > T_{sig}$ and battery level $B_L < T_{b,min}$) or a trigger to (e.g., only) monitor EH opportunities (e.g., a trigger associated with $T_{b,min} < B_L < T_{b,max}$).

According to embodiments, in a case where a trigger associated with any of $RSSI_{ZE} > T_{sig}$ and battery level $B_L < T_{b,min}$ is detected (e.g., such a condition is satisfied) within validity timer, a WTRU may autonomously perform legacy RRC_IDLE state operations over a ZE air interface and energy harvesting according to default or dedicated configured EH opportunities. According to embodiments, in a case where a trigger associated with $T_{b,min} < B_L < T_{b,max}$ (e.g., such a condition is satisfied), a WTRU may continue legacy RRC_IDLE state operations over the Uu air interface and may perform energy harvesting according to default or dedicated configured EH opportunities over the ZE air interface. According to embodiments, a WTRU may (e.g., otherwise) continue or autonomously fall back to RRC_IDLE state operations over the Uu air interface at the end of the validity timer. According to embodiments, a validity timer may be initialized when a WTRU is first configured with high ZE feature transition priority and the validity timer may be determined explicitly or implicitly based on a configured ZE Class.

According to embodiments, a WTRU may, over a Uu air interface, report ZE capability information and/or may receive ZE-related network configuration information, such as any of a ZE Class, a ZE feature transition priority (e.g., low, high, etc.), a dynamic WTRU-class-based ZE-RNTI and/or EH-RNTI, a ZE reference signal configuration information, paging sub-band(s), and a default EH signal configuration information. According to embodiments, a WTRU may operate in a Uu RRC_IDLE state and may detect a DCI transmitted over a PDCCH with a CRC scrambled by the configured ZE-RNTI and/or EH-RNTI. According to embodiments, a WTRU may determine a change of a ZE feature transition priority to high and may initialize a validity timer based on any of the received DCI and configured ZE class. According to embodiments, a WTRU may measure and/or determine a ZE received signal strength $RSSI_{ZE}$, for example, using (e.g., utilizing, according to, based on, etc.) ZE reference signal(s) within a specified measurement window $T_{meas}$. According to embodiments, a WTRU may, for example, on condition that (e.g., according to, based on, etc.) a trigger to transition to ZE RRC_IDLE is detected within the validity timer, e.g. $RSSI_{ZE} > T_{sig}$ and battery level $B_L < T_{b,min}$, autonomously perform legacy RRC_IDLE state operations over a ZE air interface and may perform energy harvesting according to (e.g., at, based on, during, etc.) default configured EH opportunities. According to embodiments, a WTRU may (e.g., otherwise) continue or autonomously fall back to RRC_IDLE state operations over the Uu air interface at the end of (e.g., an expiry of, a limit of, a maximum of) a validity timer.

According to embodiments, a WTRU may report a ZE capability (e.g., information indicating a ZE capability) and/or receive ZE-related network configuration information, such as any of a ZE Class, a ZE feature transition priority (e.g., low/high/etc.), a dynamic UE-class-based ZE-RNTI and/or EH-RNTI, ZE reference signal configuration information, paging sub-band(s), and default EH signal configuration over Uu air interface. According to embodiments, a WTRU may operate in a Uu RRC_IDLE state and/or may detect a DCI transmitted over a PDCCH with a CRC scrambled by a (e.g., configured, WTRU-specific, etc.) ZE-RNTI or EH-RNTI. According to embodiments, a WTRU may determine any of: (1) activation of (e.g., default) EH opportunities; and/or (2) (e.g., corresponding) configuration information (e.g., resources associated with, timing of, etc.) EH opportunities, for example, based on any of a received DCI a and configured ZE class. According to embodiments, a WTRU may measure and/or determine a ZE received signal strength $RSSI_{ZE}$, for example, using (e.g., utilizing, according to, based on, etc.) ZE reference signal(s) within a specified measurement window $T_{meas}$. According to embodiments, a WTRU may, for example, upon detecting (e.g., on condition that, in a case where, based on, according to, etc.) a trigger to only monitor EH opportunities (e.g., a trigger for $T_{b,min}<B_L<T_{b,max}$), continue legacy RRC_IDLE state operations over a Uu air interface and may perform energy harvesting, for example, according to (e.g., a default, configured, etc.) EH opportunities over a ZE air interface. Otherwise, for example, in a case of not detecting such a trigger, a WTRU may continue RRC_IDLE state operations over the Uu air interface.

According to embodiments, a WTRU may report (e.g., information associated with and/or indicating) a ZE capability and may receive ZE-related network configuration information, such as any of a ZE Class, a ZE feature transition priority (e.g, high/low/etc.), a (e.g., dynamic) WTRU-class-based ZE-RNTI and/or EH-RNTI, (e.g., information associated with and/or indicating) ZE reference signal configuration, paging sub-band(s), and (e.g., default) EH signal configuration information over a Uu air interface. According to embodiments, a WTRU may operate in a Uu RRC_IDLE state and may detect (e.g., while in a Uu RRC_IDLE state) a DCI transmitted over a PDCCH with a CRC scrambled by a (e.g., certain, configured, signaled, determined, etc.) ZE-RNTI and/or EH-RNTI. According to embodiments, a WTRU may determine any of: (1) activation of (e.g., default, certain, configured, signaled, etc.) EH opportunities; and (2) configuration of (e.g., information indicating) (e.g., corresponding) EH opportunities, for example, based on any of a (e.g., received) DCI and a (e.g., configured) ZE class.

According to embodiments, a WTRU may measure and/or determine a ZE received signal strength $RSSI_{ZE}$, for example, using ZE reference signal(s) associated with a (e.g., specified, certain, configured, determined, etc.) measurement window $T_{meas}$, which may be an amount of time, frames, time period, etc. According to embodiments, a WTRU may detect a trigger to transition to a ZE RRC_IDLE (which may be herein interchangeably referred to as ZE RRC_IDLE state) within a validity timer, and such a trigger may be for, or the WTRU may detect, insufficient energy transfer levels, such as any of $RSSI_{ZE}<T_{sig}$, battery level $B_L<T_{b,min}$, and expected energy transfer levels $<T_{EH,min}$. According to embodiments, a WTRU may transition to RRC_CONNECTED state over a Uu air-interface, and may: (1) request WTRU-specific (e.g., dedicated, configured, etc.) EH opportunities, and/or (2) use (e.g., utilize) a main transceiver (and/or backscattering-based UL transmission opportunities) to request WTRU-class-specific dedicated EH opportunities. According to embodiments, a WTRU may (e.g., autonomously) switch to a ZE RRC_IDLE state and may perform legacy operations over a ZE air interface and perform (e.g., while performing) energy harvesting according to (e.g., default, configured) EH opportunities. According to embodiments, a WTRU may receive WTRU-specific and/or class-specific dedicated EH opportunities configuration information over a ZE air interface, and such a WTRU may harvest energy accordingly. According to embodiments, a validity timer may be: (1) initialized when WTRU is (e.g., first) configured with a high ZE feature transition priority, and (2) determined explicitly or implicitly based on a configured ZE Class.

Figure 16:
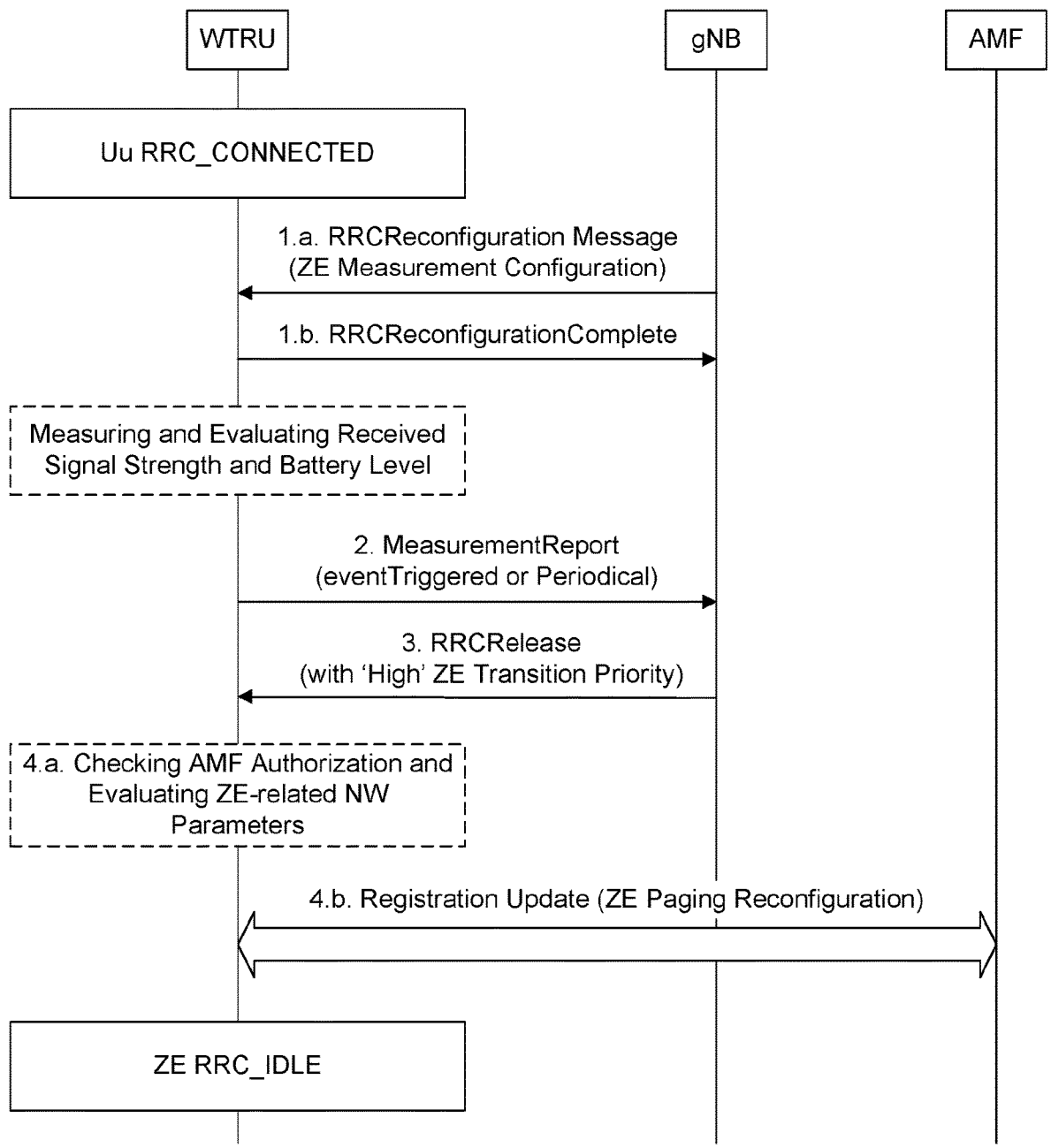
FIG. 16 is a diagram illustrating procedure for a WTRU completing transitioning from RRC_CONNECTED over Uu air-interface to RRC_IDLE over ZE air-interface, according to embodiments.

FIG. 16 is a diagram illustrating procedure for a WTRU completing transitioning from RRC_CONNECTED over Uu air-interface to RRC_IDLE over ZE air-interface, according to embodiments.

According to embodiments, a WTRU may transition from a Uu RRC_CONNECTED mode/state to a ZE RRC_IDLE mode/state. According to embodiments, a WTRU equipped with a (e.g., capable) passive receiver may transition (e.g., directly) from Uu air interface connected state operation to ZE air interface idle state operation, for example, as shown in FIG. 16.

According to embodiments, there may be a case where a WTRU has (e.g., already) reported its ZE capability to the network and is currently operating in RRC_CONNECTED state over the Uu air interface. According to embodiments, in such a case, (e.g., as a first step) the WTRU may receive any of a ZE-related reference signal configuration and a measurement reports configuration, for example, via (e.g., using) any of measConfig and reportConfig IEs received as part of any of an RRCResume message (e.g., in a case where the WTRU was in an RRC_INACTIVE state before transitioning to RRC_CONNECTED state) or an RRCReconfiguration message. According to embodiments, in such a case, a network may (e.g., needs to, is required to) provide measurement configuration for the ZE air-interface, for example, if the network is aware of a WTRU's ZE capability.

According to embodiments, in such a case, (e.g., as a second step) a WTRU may measure the received signal strength over the ZE air interface utilizing a cell/beam specific ZE reference signal and may count the number of threshold-triggering events occurring within a specified transmission/measurement window $T_{meas}$. According to embodiments, in such a case, (e.g., as a third step) the WTRU may transmit a ZE measurement report to a serving RAN node, for example, either periodically or according to measurement triggering events (e.g. a ZE received signal strength being above a preconfigured/signaled threshold $T_{sig}$ and a battery level being below another preconfigured/signaled threshold $T_b$). According to embodiments, in such a case, (e.g., as a fourth step) the WTRU may receives an RRCRelease message, such message: (1) having a ZE feature transition priority configured as a high value, and (2) (e.g., potentially) associated with a validity timer value, which may be any of a newly defined timer or a T320 timer. According to embodiments, in such a case, (e.g., as a fifth step) the WTRU may transition to the RRC_IDLE state over the ZE air-interface. According to embodiments, in such a case, a network may configure the high ZE feature transition priority in a case of receiving the measurement report.

According to embodiments, in such a case, (e.g., as an alternative) on condition that the WTRU decides that there is a need to change any of the ZE-related network paging parameters agreed upon during registration, the WTRU may initiate a registration update, for example, for the purpose of ZE Paging reconfiguration, as described earlier, before beginning RRC_IDLE state operation over the ZE air-interface. According to embodiments, a WTRU may transition from a ZE RRC_IDLE mode/state to a Uu RRC_IDLE mode/state. According to embodiments, a WTRU's transition from an RRC_IDLE over the ZE air-interface to an RRC_IDLE over the Uu air-interface may be according (e.g., due) to any of the following (e.g., reasons): (1) a WTRU determining a ZE air-interface link failure or detecting a criterion that triggers its transition to Uu air interface (e.g. a ZE received signal strength falling below a certain threshold and/or a battery level being above another threshold (e.g., see above discussed list of triggering criteria); and (2) a WTRU receiving a network-initiated transition request.

According to embodiments, a WTRU's procedures corresponding to the detection of a ZE air-interface link failure may be fall-back procedures, such as conventional fall-back procedures. According to embodiments, upon detection of ZE air-interface link failure or a transition triggering criterion, a WTRU may perform (e.g., follow, execute, etc.) any of an autonomous air-interface transition or a WTRU-initiated ZE-to-Uu air-interface transition procedures, for example, as discussed below.

Figure 17:
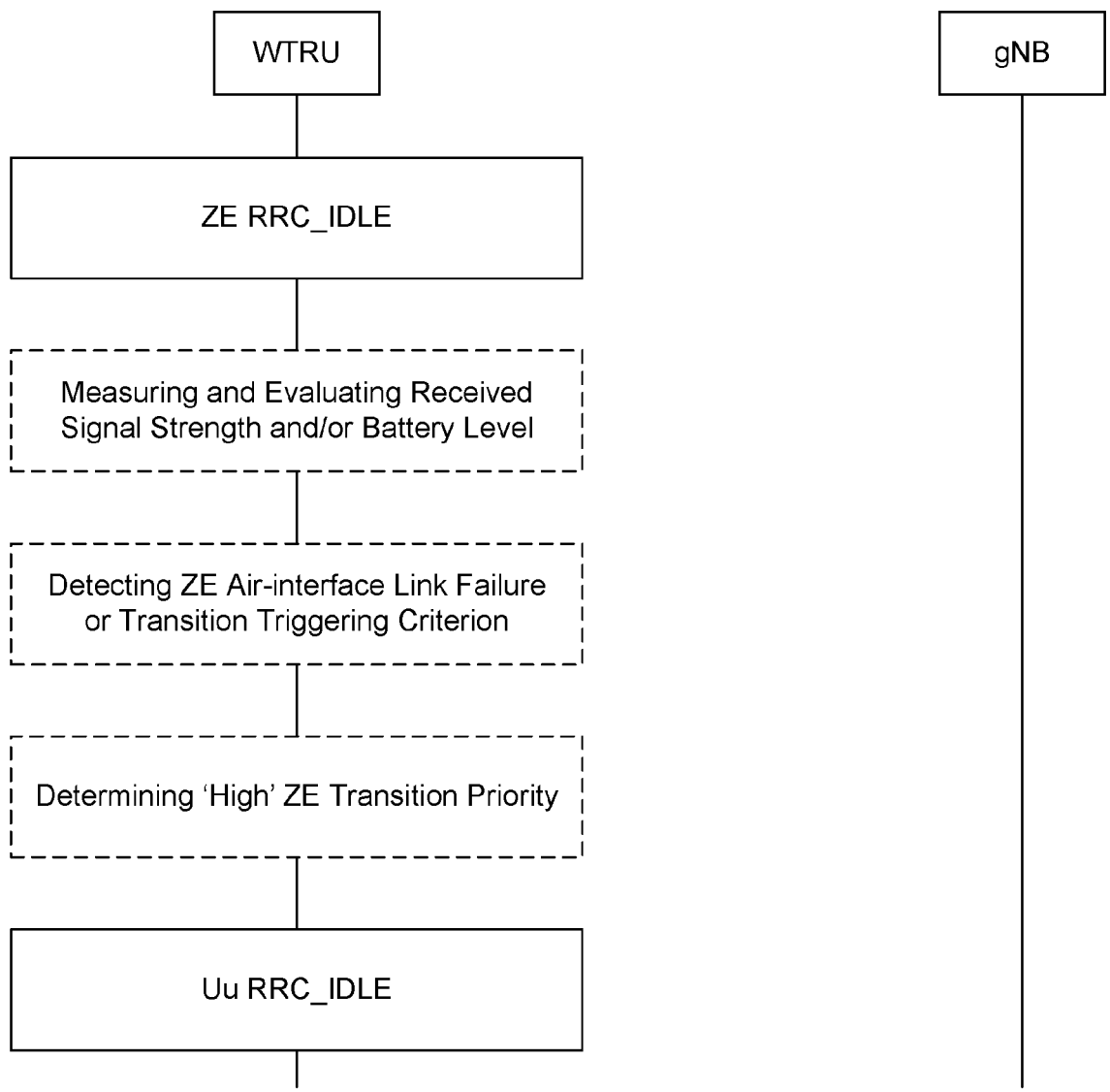
FIG. 17 is a diagram illustrating a procedure for a WTRU's autonomously transitioning from RRC_IDLE over ZE air-interface to RRC_IDLE over Uu air-interface, according to embodiments.

FIG. 17 is a diagram illustrating a procedure for a WTRU's autonomously transitioning from RRC_IDLE over ZE air-interface to RRC_IDLE over Uu air-interface, according to embodiments.

According to embodiments, a WTRU operating in RRC_IDLE state over the ZE air-interface may keep track of a received signal strength over the ZE air interface by using a cell/beam specific ZE reference signal and by counting the number of threshold-triggering events (e.g., occurring) within a (e.g., specified) transmission/measurement window $T_{meas}$. According to embodiments, the WTRU, (e.g., in a next step) may detect a trigger to transition from RRC_IDLE state operation over the ZE air interface to RRC_IDLE state over the Uu air interface (e.g. a ZE received signal strength is below a preconfigured/signaled threshold $T_{sig,min}$ and/or a battery level is above another preconfigured/signaled threshold T b,charged) According to embodiments, (e.g., in a next step) a WTRU may determines a configured high ZE feature transition priority and autonomously switches to RRC_IDLE state operations over the Uu air-interface. The UE autonomous state transition procedure is depicted in FIG. 17 where we note that interaction between the UE and current or past serving RAN nodes is not required for the transition to happen.

According to embodiments, a WTRU operating in RRC_IDLE state over the ZE air-interface may keep track of the received signal strength over the ZE air interface, for example, by using a cell/beam specific ZE reference signal and by counting a number of threshold-triggering events within a specified transmission/measurement window $T_{meas}$. According to embodiments, a WTRU, (e.g., in a next step) may detect a trigger to transition from RRC_IDLE state operation over the ZE air interface to RRC_IDLE state over the Uu air interface (e.g. a ZE received signal strength being below a preconfigured/signaled threshold $T_{sig,min}$ and/or a battery level being above another preconfigured/signaled threshold $T_{b,charged}$. According to embodiments, a WTRU (e.g., in a next step) may determine a configured low ZE feature transition priority and may begin a WTRU-initiated ZE-to-Uu state transition procedure.

Figure 18:
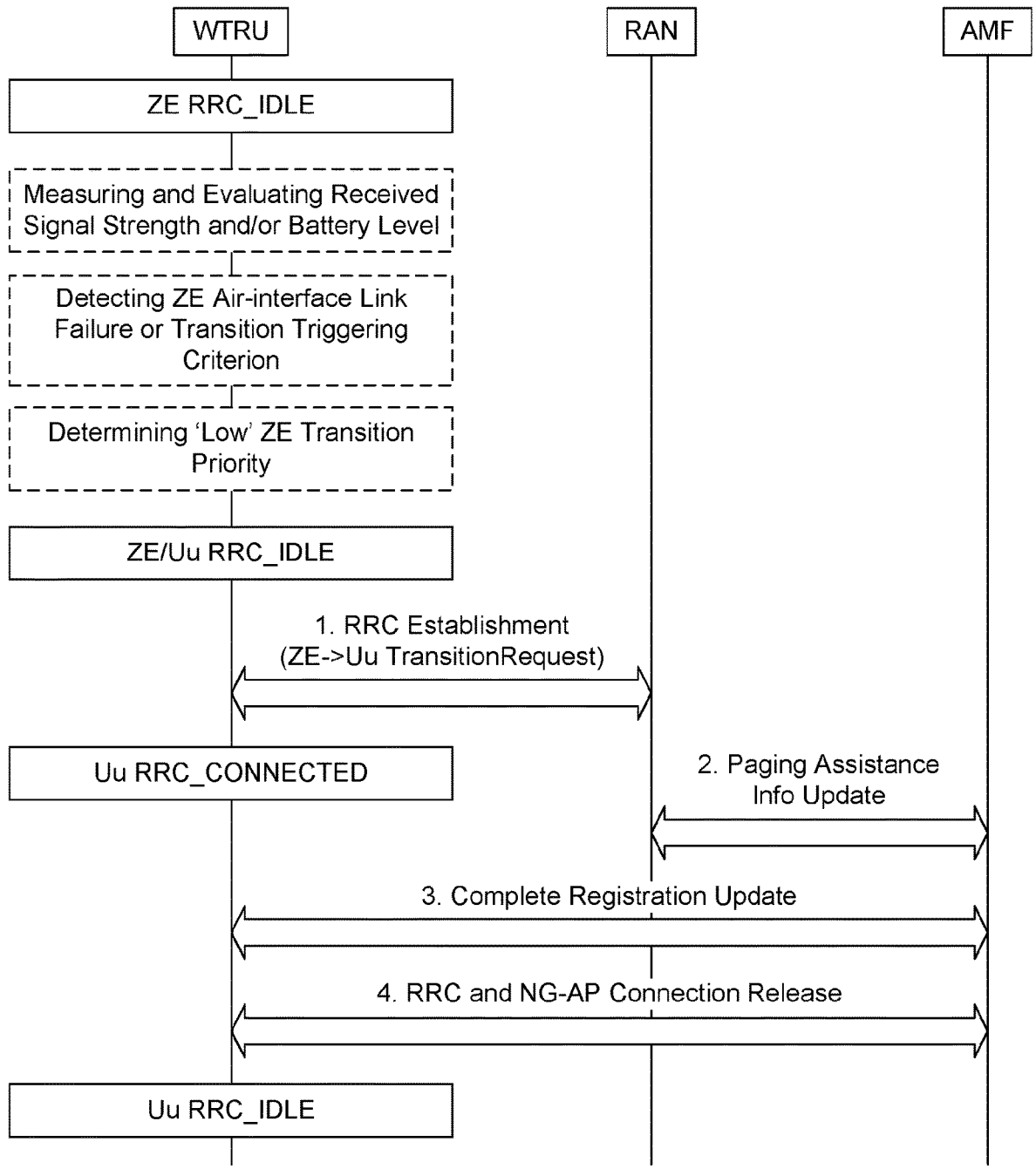
FIG. 18 is a diagram illustrating a procedure for a WTRU requesting transition from RRC_IDLE over ZE air-interface to RRC_IDLE over Uu air-interface, according to embodiments.

FIG. 18 is a diagram illustrating a procedure for a WTRU requesting transition from RRC_IDLE over ZE air-interface to RRC_IDLE over Uu air-interface, according to embodiments.

According to embodiments, a WTRU-initiated state transition procedure message and signaling exchange sequence may be as shown in FIG. 18. According to embodiments, a procedure, for example, referring to FIG. 18, may begin according to a WTRU switching operations to RRC_IDLE over the Uu air-interface, for example, in a case where a trigger (e.g., triggering criterion) is related to a ZE air-interface link failure, or switching operation to RRC_IDLE over both ZE and Uu air-interfaces simultaneously. According to embodiments, a WTRU may (e.g., then) use the Uu air-interface, and may initiates an RRC connection establishment procedure with the establishment cause set to ZE-to-Uu air interface transition request. According to embodiments, (e.g., as a next step) a RAN may update paging assistance information, for example, stored in the serving AMF, by (e.g., first) forwarding the initial WTRU message to the serving AMF, (e.g., second) retrieving the WTRU CONTEXT from the InitialContextSetupRequest message received from the AMF, and (e.g., third, finally) sending a WTRU capability information indication with updated paging assistance information to the AMF. According to embodiments, (e.g., as a next step) a network (e.g., the AMF) and the WTRU complete a registration update procedure, for example, by agreeing on paging-related network parameters, if needed (e.g., necessary). According to embodiments, (e.g., as a next/final step) the AMF may initiate a connection release, and a RAN node may release the RRC connection with the WTRU, for example, by transmitting an RRCRelease message, and the WTRU may transition to RRC_IDLE state operations over the Uu air-interface.

Figure 19:
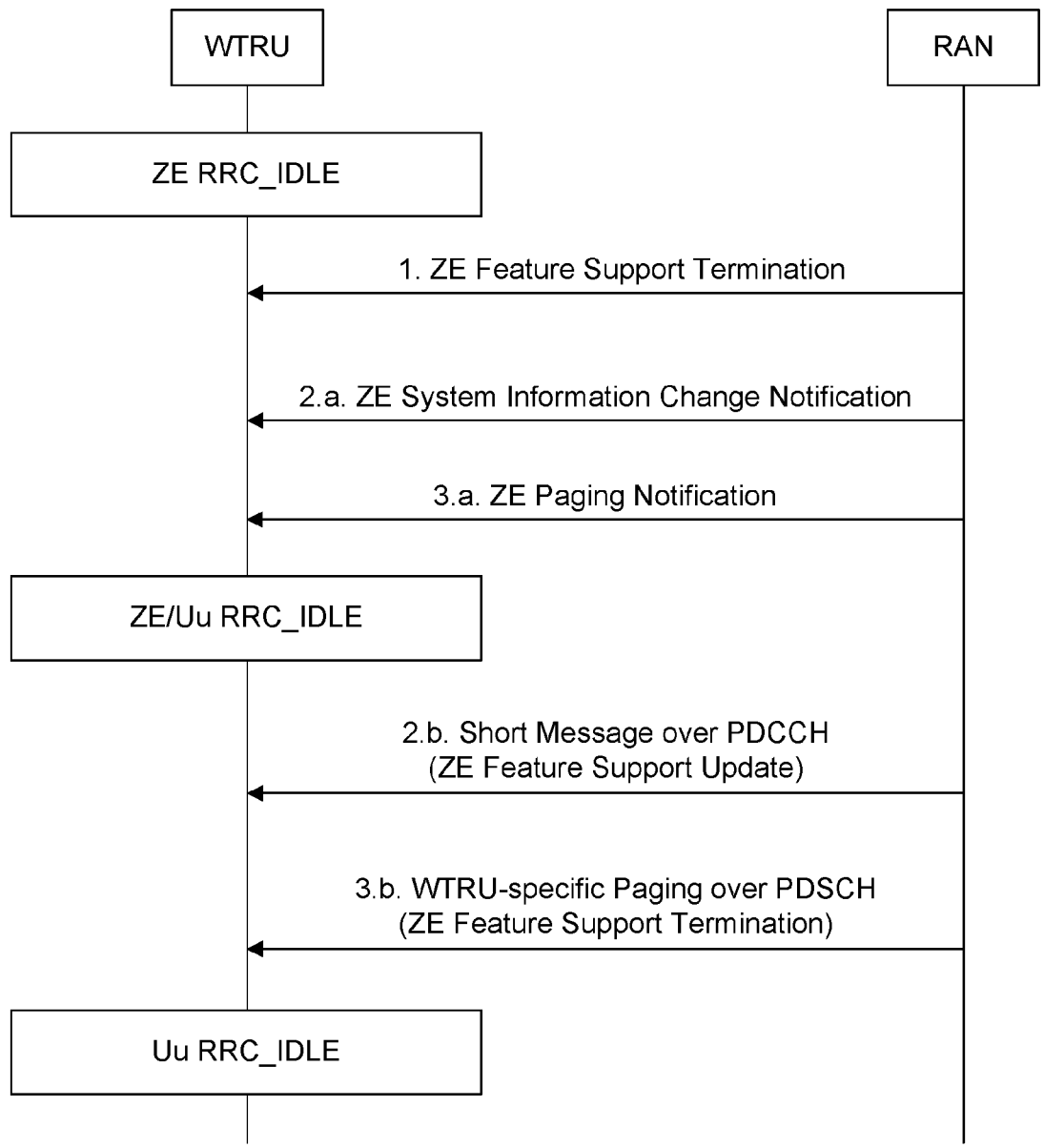
FIG. 19 is a diagram illustrating a network-initiated procedure for a ZE-capable WTRU's transition from RRC_IDLE over ZE air-interface to RRC_IDLE over Uu air-interface, according to embodiments.

FIG. 19 is a diagram illustrating a a network-initiated procedure for a ZE-capable WTRU's transition from RRC_IDLE over ZE air-interface to RRC_IDLE over Uu air-interface, according to embodiments.

According to embodiments, a WTRU's procedure corresponding to the reception of a network-initiated ZE-to-Uu air-interface transition may be implemented as three different technical realizations, for example, as shown in FIG. 19. According to embodiments, a WTRU operating in RRC_IDLE state over the ZE air-interface may receive may of a ZE common or dedicated control message that indicates any of a current serving cell or a network termination of its support for the ZE signaling feature. That is, a network may perform (e.g., make) a decision according to a current load at a specific cell or group of cells, and/or availability of resources. According to embodiments (e.g., subsequently), the WTRU may (e.g., then) transition to RRC_IDLE operations over the Uu air-interface. According to embodiments, a WTRU may (e.g., as a first step) receive a ZE System Information Change Notification message. The WTRU may (e.g., then, in a second step) switch to RRC_IDLE operation over the Uu air-interface, for example, in order to receive an indication of a current serving cell or a network termination of its support for the ZE signaling feature using any of a short message transmitted with P-RNTI over DCI or as part of system information parameters. According to embodiments, (e.g., as a third step) the WTRU may continue RRC_IDLE state operations over the Uu air-interface.

According to embodiments, a WTRU may (e.g., in a first step), receive a UE-specific or UE-groupcast ZE-Paging Notification message as described in [8]. According to embodiments, the UE may (e.g., in a second step, then) switch to RRC_IDLE operation over the Uu air-interface, for example, in order to receive a WTRU-specific or WTRU-groupcast indication of current serving cell or network termination of its support for the ZE signaling feature, for example, using a paging message transmitted over a PDSCH channel. According to embodiments, (e.g., in a third step) the WTRU may continue RRC_IDLE state operations over the Uu air-interface.

Procedures Supporting a WTRU's Transition Involving ZE RRC INACTIVE

According to embodiments, discussed below are procedures supporting a WTRU's transition to/from a ZE RRC_INACTIVE state. That is, a WTRU's transition from RRC_INACTIVE state over the Uu air-interface to RRC_INACTIVE state over the ZE air-interface is discussed below. Also discussed below is a WTRU's transition from RRC_CONNECTED state over the Uu air-interface to RRC_INACTIVE state over the ZE air-interface. Further discussion below considers a WTRU's transition from RRC_INACTIVE state over the ZE air-interface to RRC_INACTIVE/IDLE state over the Uu air-interface.

WTRU Transition from Uu RRC_INACTIVE to ZE RRC_INACTIVE

According to embodiments, a WTRU equipped with a (e.g., capable) passive receiver may complete a transition from Uu air interface inactive mode operation to ZE air interface inactive mode operation using any of the procedures described hereinbelow. Similar to as discussed above, the described procedures may be categorized into one of the following: (1) a WTRU-initiated state transition with WTRU/network state synchronization signaling; (2) a WTRU-initiated autonomous state transition; and (3) a network-initiated state transition.

According to embodiments, a WTRU may reports its ZE capability to the network while connected over the Uu air interface. According to embodiments, the WTRU may be (e.g., then) configured with a ZE feature transition priority, for example, via any of an RRC release with suspend configuration message or as one of the received system information parameters received over the Uu air interface. According to embodiments, a WTRU, that is currently operating in RRC_INACTIVEE state over the Uu air interface, may (e.g., then) keep track of the received signal strength over the ZE air interface by using a cell/beam specific ZE reference signal and by counting the number of threshold-triggering events (e.g., occurring) within a specified transmission/measurement window $T_{meas}$. According to embodiments, the WTRU may (e.g., then) detect a trigger to transition from RRC_INACTIVE state operation over the Uu air interface to RRC_INACTIVE state over the ZE air interface (e.g. a ZE received signal strength is above a preconfigured/signaled threshold $T_{sig}$ and a battery level is below another preconfigured/signaled threshold $T_b$). According to embodiments, the WTRU may (e.g., then) determine a configured low ZE feature transition priority and may begin a WTRU-initiated state transition procedure.

Figure 20:
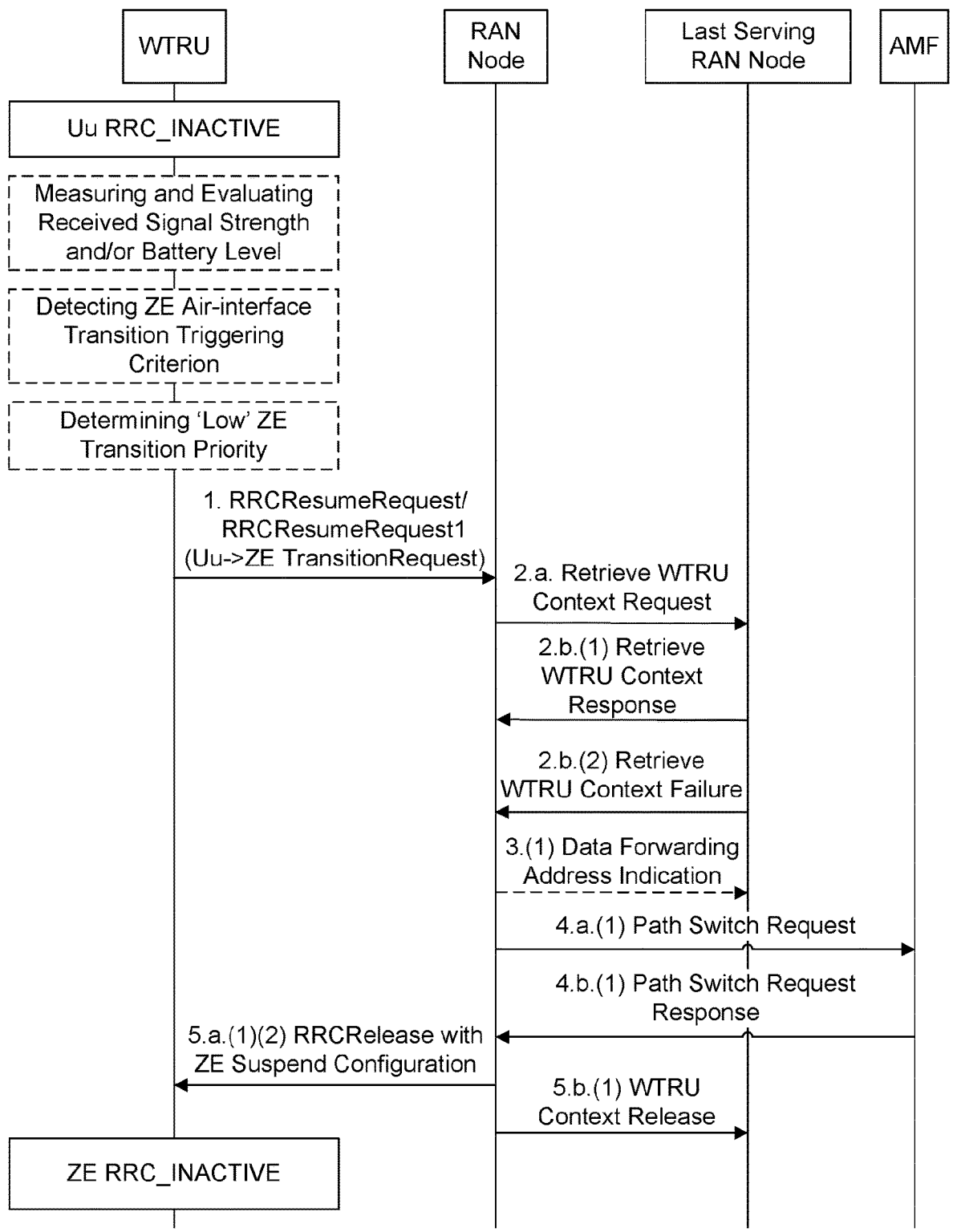
FIG. 20 is a diagram illustrating a procedure for a WTRU's to request transition from RRC_INACTIVE over Uu air-interface to RRC_INACTIVE over ZE air-interface, according to embodiments.

FIG. 20 is a diagram illustrating a procedure for a WTRU's to request transition from RRC_INACTIVE over Uu air-interface to RRC_INACTIVE over ZE air-interface, according to embodiments.

According to embodiments, a WTRU-initiated state transition procedure may be according to a message and signaling exchange sequence shown in FIG. 20. According to embodiments, the procedure of FIG. 20 may begin with, for example, as a first step, a WTRU notifying a serving RAN node regarding the WTRU's desire to transition to RRC_INACTIVE state operation over the ZE air-interface. According to embodiments, such a WTRU may notify the RAN using any of the following options: (1) transmitting an RRCResumeRequest/RRCResumeRequest1 message that includes a new parameter (e.g. ZETranitionRequest which takes a single binary value indicating a WTRU's intention/desire to transition to ZE air-interface; and (2) transmitting a new message that has the specific purpose of requesting RRC state operation transition to the supplementary ZE air-interface. According to embodiments, on condition that a current RAN node is the same as the last serving one, the below discussed steps 2-4 and the second part of step 5 may be skipped, and otherwise, the below discussed steps may be performed.

According to embodiments, for example, as a second step, the RAN node may retrieve the WTRU CONTEXT from the last serving RAN node, for example, by sending a Retrieve UE Context Request message over the Xn interface and by receiving a Retrieve WTRU Context Response. The RAN node may (e.g., then) update any of the paging assistance information or the RRC inactive assistance information associated with the WTRU CONTEXT. According to embodiments, for example, as an alternative a second step, the retrieve WTRU context request message may include the purpose of the RRC resume request provided by the WTRU (e.g., the transition to RRC_INACTIVE state operation over the ZE air-interface), and the last serving RAN node may decide not to relocate the WTRU context. Subsequently, according to embodiments, the last serving RAN node may respond with the retrieve WTRU context failure message, for example, including an encapsulated RRCRelease message with a ZE suspend configuration.

According to embodiments, for example, as a third step, the RAN node may provide forwarding addresses to the last serving RAN node, for example, in order to prevent loss of DL user data buffered in the last serving RAN node. According to embodiments, for example, as a fourth step, the RAN node may perform a path switch by sending a Path Switch Request message to the serving AMF and receiving a Path Switch Request Response message. According to embodiments, for example, as a fifth step, the WTRU may receive an RRCRelease message with ZE Suspend Configuration from the current RAN node. The RAN node may (e.g., then) trigger the release of the WTRU resources at the last serving RAN node, for example, by sending a WTRU Context Release message to the last serving RAN node. According to embodiments, there may be a case where a WTRU may simply receive an RRCRelease message with a ZE Suspend Configuration as a forwarded message from the last serving RAN node. According to embodiments, in such a case, a network may complete a procedure that begins with an RRC resume message using an RRC Release message with a ZE configuration, for example, in a case wherein the reason for a WTRU's resume request is the transition to ZE air-interface.

According to embodiments, a WTRU may report only its non-ZE capability to the network while connected over the Uu air interface and may then transition to RRC_INACTIVE state operations. According to embodiments, the WTRU, that is currently operating in RRC_INACTIVE state over the Uu air interface, may (e.g., then) keep track of the received signal strength over the ZE air interface by: (1) using a cell/beam specific ZE reference signal, and (2) counting a number of threshold-triggering events (e.g., occurring) within a specified transmission/measurement window $T_{meas}$.

According to embodiments, any of ZE reference signal configuration and related parameters may be provided to the WTRU as part of periodically transmitted System Information. The WTRU, may (e.g., then) detect a trigger to transition from RRC_INACTIVE state operation over the Uu air interface to RRC_INACTIVE state over the ZE air interface (e.g. a ZE received signal strength is above a preconfigured/signaled threshold $T_{sig}$ and a battery level is below another preconfigured/signaled threshold $T_b$). According to embodiments, (e.g., next) the WTRU may begin a WTRU-initiated state transition procedure.

Figure 21:
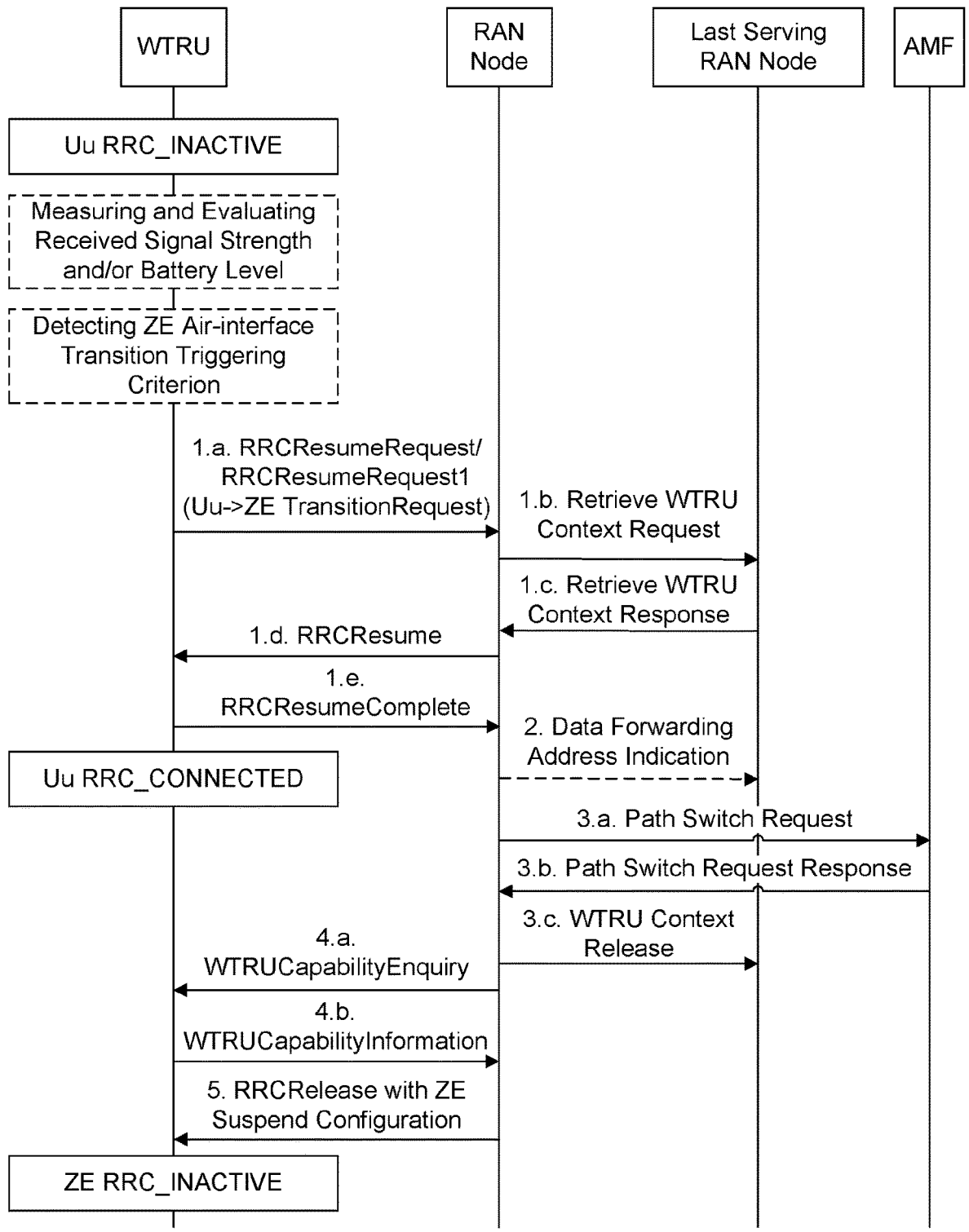
FIG. 21 is a diagram illustrating a procedure for a WTRU updating its ZE capability and request transition from RRC_INACTIVE over Uu air-interface to RRC_INACTIVE over ZE air-interface, according to embodiments.

FIG. 21 is a diagram illustrating a procedure for a WTRU updating its ZE capability and request transition from RRC_INACTIVE over Uu air-interface to RRC_INACTIVE over ZE air-interface, according to embodiments.

According to embodiments, a WTRU-initiated state transition procedure is depicted in the form of message and signaling exchange sequence in FIG. 21.

Referring to FIG. 21, as a first step, a WTRU may notify the serving RAN node with its desire to transition to RRC_INACTIVE state operation over the ZE air-interface, for example, using any of the following options: (1) transmitting an RRCResumeRequest/RRCResumeRequest1 message that includes a new parameter (e.g. a ZETransitionRequest that is a single binary value), for example, to indicate a WTRU's intention/desire to transition to a ZE air-interface; and (2) transmitting a new message (e.g., specifically) for requesting RRC state operation transition to the supplementary ZE air-interface. According to embodiments a RAN node, for example, after retrieving a WTRU CONTEXT from the last serving RAN node and on condition that such is different than a current WTRU CONTEXT, may determine that the WTRU has not provided its ZE capability to the network. In such a case, the RAN node may (e.g., therefore) complete a RRC connection resume (e.g., resumption), for example, by sending an RRCResume message to the WTRU and by receiving an RRCResumeComplete message. According to embodiments, on condition that the current RAN node is the same as the last serving one, steps 2-3 and the second and third parts (b, c) of step 1 may be skipped. Otherwise, the following steps are performed.

According to embodiments in a second step, the RAN node may provide forwarding addresses to the last serving RAN node, for example, in order to prevent loss of DL user data buffered in the last serving RAN node. According to embodiments in a third step, the RAN node may complete the RRC_INACTIVE state mobility handover procedure by performing a path switch, for example, including sending a Path Switch Request message to the serving AMF and receiving a Path Switch Request Response message, and triggering the release of the WTRU resources at the last serving RAN node by sending a WTRU Context Release message to the last serving RAN node.

According to embodiments in a fourth step, a WTRU may provides its ZE-related capability to the current RAN node in a WTRUCapabilityInformation message, for example, after receiving a WTRUCapabilityEnquiry message from the RAN node. The RAN node may (e.g., subsequently) update the paging assistance information and/or RRC inactive assistance information associated with the WTRU CONTEXT, for example, according to the updated WTRU capability. According to embodiments, in a fifth step, the WTRU may receive an RRCRelease message with a ZE suspend configuration from the current RAN node and the WTRU may transition to RRC_INACTIVE state operation over the ZE air-interface.

Figure 22:
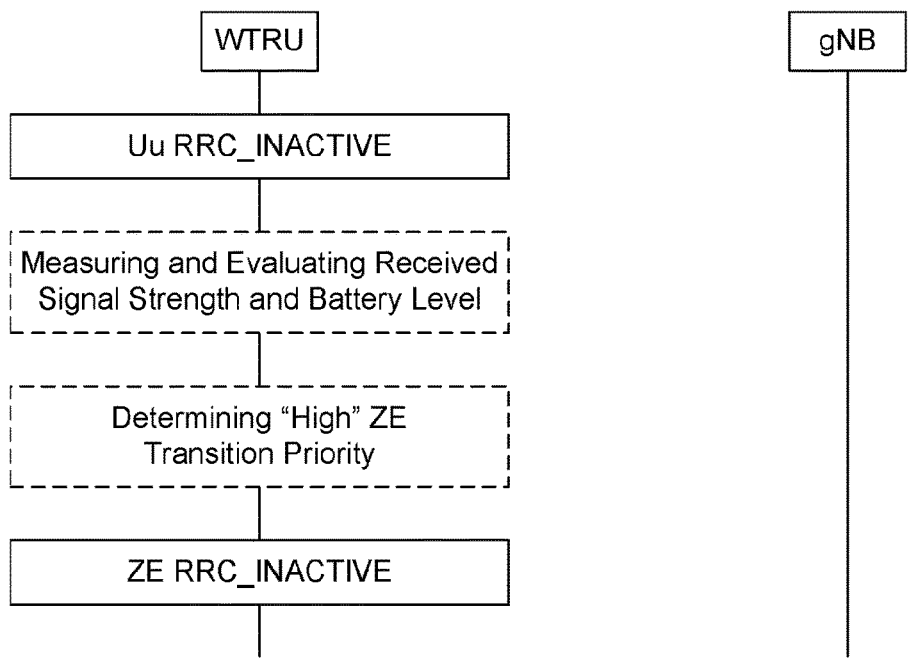
FIG. 22 is a diagram illustrating a procedure for a WTRU autonomously transitioning from RRC_INACTIVE over Uu air-interface to RRC_INACTIVE over ZE air-interface, according to embodiments.

FIG. 22 is a diagram illustrating a procedure for a WTRU autonomously transitioning from RRC_INACTIVE over Uu air-interface to RRC_INACTIVE over ZE air-interface, according to embodiments.

According to embodiments, as a first step, a WTRU may report its ZE capability to the network while connected over the Uu air interface. According to embodiments as a second step, the WTRU may be configured with a ZE feature transition priority, for example, via any of an RRC release with suspend configuration message or one of the received system information parameters received over the Uu air interface. According to embodiments, as a third step, the WTRU, that is currently operating in RRC_INACTIVE state over the Uu air interface, may keep track of the received signal strength over the ZE air interface by using a cell/beam specific ZE reference signal and by counting the number of threshold-triggering events occurring within a specified transmission/measurement window $T_{meas}$.

According to embodiments, as a fourth step, the WTRU may detect a trigger to transition from RRC_INACTIVE state operation over the Uu air interface to RRC_INACTIVE state over the ZE air interface (e.g. a ZE received signal strength is above a preconfigured/signaled threshold $T_{sig}$ and a battery level is below another preconfigured/signaled threshold $T_b$). According to embodiments, as a fifth step, the WTRU may determine a configured high ZE feature transition priority and may autonomously switch to RRC_INACTIVE state operations over the ZE air-interface. According to embodiments, the WTRU autonomous state transition procedure may be performed as shown in FIG. 22, wherein, interaction between the WTRU and current or past serving RAN nodes is not required for the transition to happen.

Figure 23:
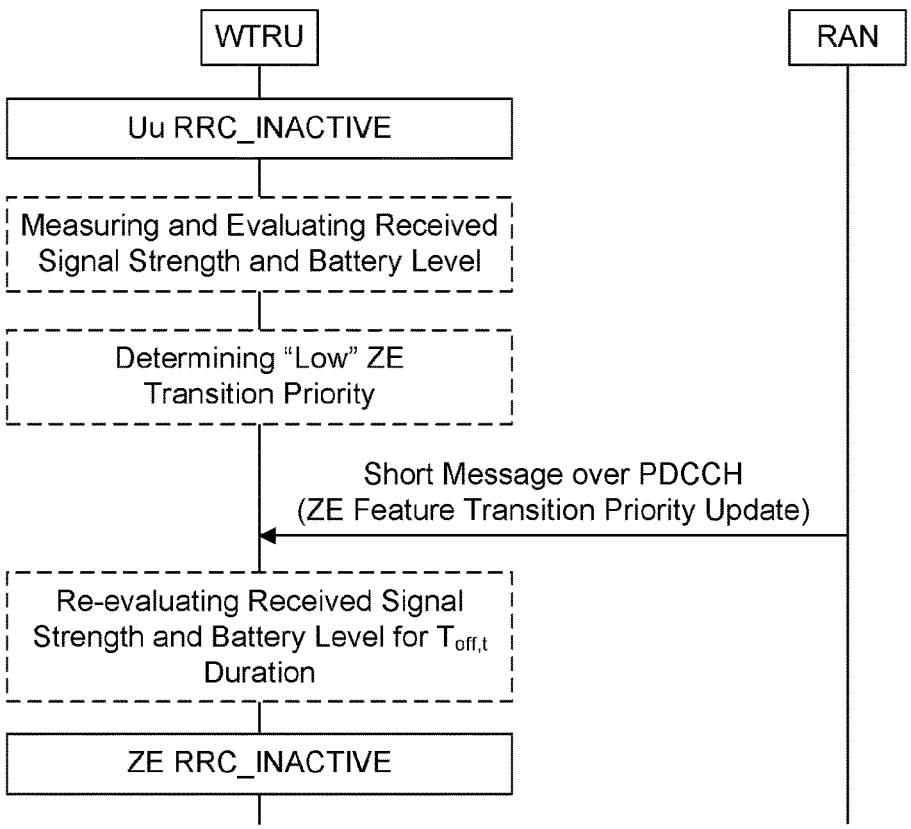
FIG. 23 is a diagram illustrating a network-initiated procedure for a ZE-capable WTRU's transition from RRC_INACTIVE over Uu air-interface to RRC_INACTIVE over a ZE air-interface, according to embodiments.

FIG. 23 is a diagram illustrating a network-initiated procedure for a ZE-capable WTRU's transition from RRC_INACTIVE over Uu air-interface to RRC_INACTIVE over a ZE air-interface, according to embodiments.

According to embodiments, as a first step, a WTRU may report its ZE capability to the network while connected over the Uu air interface. According to embodiments, as a second step, the WTRU may be configured with a ZE feature transition priority, for example, either through an RRC release with suspend configuration message or as one of the received system information parameters received over the Uu air interface. According to embodiments, as a third step, the WTRU, currently operating in RRC_INACTIVE state over the Uu air interface, may keep track of (e.g., monitor, measure, etc.) the received signal strength over the ZE air interface by using a cell/beam specific ZE reference signal and by counting a number of threshold-triggering events within a specified transmission/measurement window $T_{meas}$.

According to embodiments, as a fourth step, the WTRU may detect a trigger to transition from RRC_INACTIVE state operation over the Uu air interface to RRC_INACTIVE state over the ZE air interface (e.g. a ZE received signal strength is above a preconfigured/signaled threshold $T_{sig}$, and a battery level is below another preconfigured/signaled threshold $T_b$. According to embodiments, as a fifth step, the WTRU may determine a configured low ZE feature transition priority and may decide to wait for a network-initiated state transition. According to embodiments, as a sixth step, the WTRU may receive an indication about a ZE feature transition priority modification using a short message transmitted with a P-RNTI over DCI. According to embodiments, the indication may signify a change from high to low, low to high, or both. Alternatively, the WTRU may receive a CN or RAN paging message indicating WTRU-specific ZE feature transition priority change. According to embodiments, as a seventh step, and upon detection of a change of the ZE feature transition priority from low to high, the WTRU may keep track of any of the triggering cell, the RNA, or a tracking area for a timer $T_{off,t}$ duration, for example, to ensure that the transition triggering condition still holds. In such a case, the WTRU may autonomously switch to RRC_INACTIVE state operation over the ZE air-interface. According to embodiments, a network-initiated state transition procedure may be performed as shown in FIG. 23, wherein only a minimal signaling exchange is used (e.g., required) between the RAN node and the WTRU.

Figure 24:
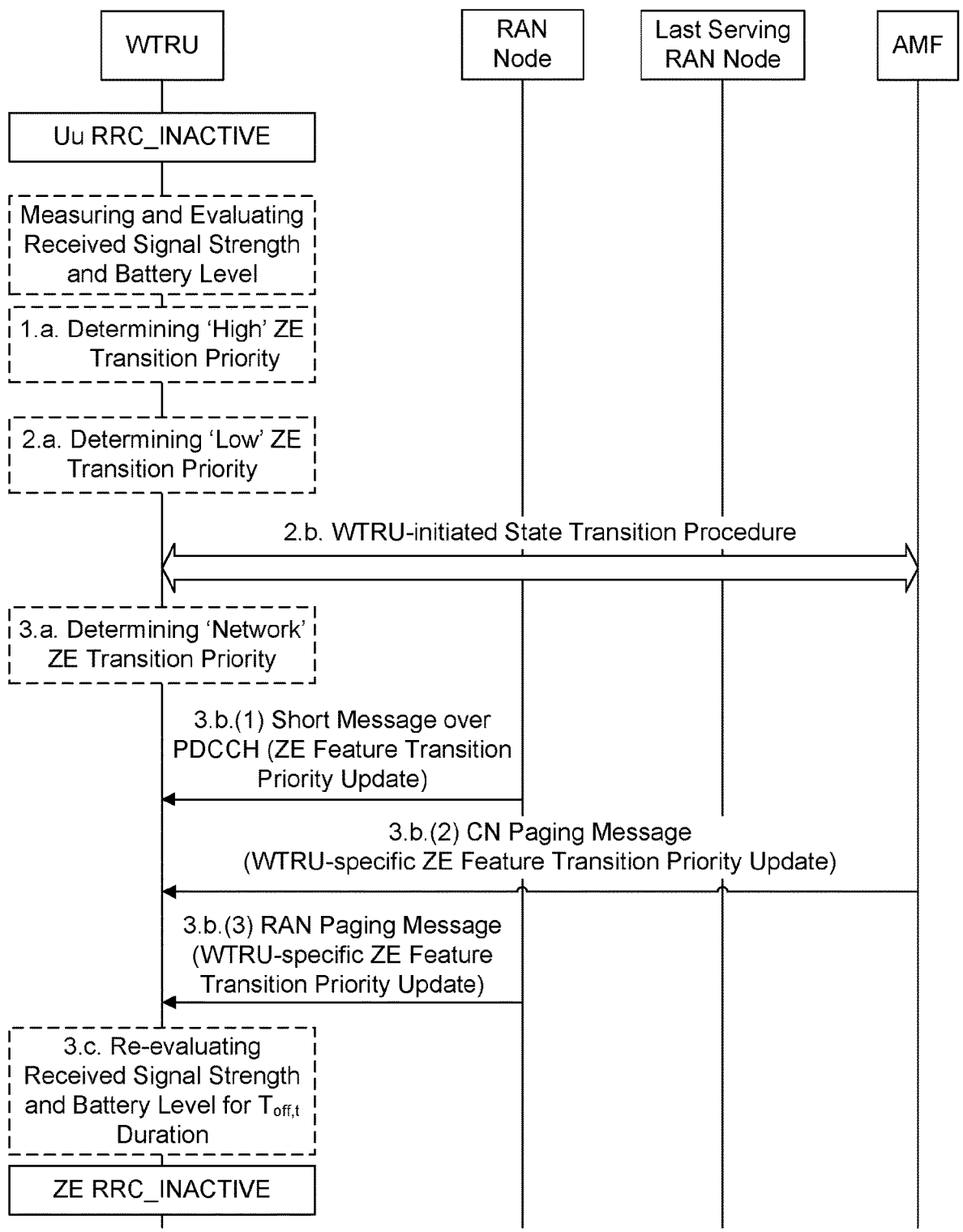
FIG. 24 is a diagram illustrating a WTRU's decision sequence for transitioning from RRC_INACTIVE over Uu air-interface to RRC_INACTIVE over a ZE air-interface, according to embodiments.

FIG. 24 is a diagram illustrating a WTRU's decision sequence for transitioning from RRC_INACTIVE over Uu air-interface to RRC_INACTIVE over a ZE air-interface, according to embodiments.

According to embodiments, ZE feature transition priority levels may be discretized into more than the two {'low', 'high'} levels. For example, a three level {'network', 'low', 'high'} ZE transition priority may be defined, where the levels' titles do not necessarily have to be as defined and different titles may be considered. According to embodiments, in the case of three levels, the two levels {'low', 'high'} may indicate a network's support of WTRU-initiated and an autonomous state transition, while the third level {'network'} may signify network support of only network-initiated state transition.

According to embodiments, as a first step, a WTRU may report its ZE capability to a network while connected over the Uu air interface. According to embodiments, as a second step, the WTRU may be configured with a ZE feature transition priority, for example, through any of an RRC release with a suspend configuration message or (e.g., one of) system information parameters received over the Uu air interface. According to embodiments, as a third step, a WTRU currently operating in RRC_INACTIVE state over the Uu air interface may (e.g., then) keep track of the received signal strength over the ZE air interface by using a cell/beam specific ZE reference signal and counting a number of threshold-triggering events (e.g., occurring) within a specified transmission/measurement window $T_{meas}$. According to embodiments, as a fourth step, the WTRU may detect a trigger indicating the WTRU should transition from RRC_INACTIVE state operation over the Uu air interface to RRC_INACTIVE state over the ZE air interface (e.g., a trigger such as a ZE received signal strength is above a preconfigured/signaled threshold $T_{sig}$ and a battery level is below another preconfigured/signaled threshold $T_b$).

According to embodiments, as a fifth step, the WTRU may determine a configured high ZE feature transition priority and, as a sixth step, the WTRU may autonomously switch to RRC_INACTIVE state operations over the ZE air-interface. According to embodiments, as an alternative, as step five, the WTRU may determine a configured low ZE feature transition priority and, as a sixth step, may begin a WTRU-initiated state transition procedure as described earlier. According to embodiments, as yet another alternative, as step five, the WTRU may determine a configured network ZE feature transition priority and, as a sixth step, may decide to wait for a network-initiated state transition using any of a short message or a CN/RAN paging message. According to embodiments, as a seventh step and upon detection of a change of the ZE feature transition priority from network to high, the WTRU may keep track of the triggering cell or RNA or tracking area for a timer $T_{off,t}$ duration, for example, to ensure that the transition triggering condition still holds. And, further, as part of step seven, the WTRU may autonomously switch to RRC_INACTIVE state operation over the ZE air-interface. According to embodiments, the signaling exchange and decision sequences may be as shown in FIG. 24, for example, for all three scenarios described above.

According to embodiments, as a first step, a WTRU may report its ZE capability to the network, for example, while connected over the Uu air interface, and the WTRU may receive RRC and/or NAS messages with (e.g., having) ZE-related network configuration (e.g., information), such as any of, for example (but not limited) any of a ZE class, a ZE feature transition priority, paging sub-band(s), POW configuration, and EH signaling configuration. According to embodiments, as a second step, the WTRU, which is currently operating in RRC_INACTIVE state over the Uu air interface, may (e.g., then) monitor Uu-to-ZE air interface transition triggers, by, for example, using cell/beam specific ZE reference signal(s) within a specified transmission/measurement window $T_{meas}$, and by determining a ZE received signal strength to be above a preconfigured/signaled threshold $T_{sig}$ and a battery level to be below another preconfigured/signaled threshold $T_b$.

According to embodiments, as a third step, the WTRU may determines a configured network ZE feature transition priority and may decide to wait for a network-initiated state transition. According to embodiments, as a fourth step, the WTRU may receive a RAN paging message, and/or alternatively, any of a short message or a CN Paging message, for example, indicating a change of the ZE feature transition priority from network to "high/autonomous" for a WTRU/ZE class or a group of WTRUs/classes. According to embodiments, as a fifth step, the WTRU may determine a validity timer value as any of an explicitly signaled parameter within the RAN Paging Message, a parameter that is associated with a ZE class, or a function of the parameter values for multiple ZE classes. According to embodiments, as a sixth step, the WTRU may detect a transition trigger within $T_{off,t}$ duration from the end of the validity timer, and the WTRU may initiate an autonomous transition from Uu RRC_INACTIVE state to ZE RRC_INACTIVE state. According to embodiments, as a seventh step, the WTRU may autonomously fall back to RRC_INACTIVE state operations over the Uu air interface at the end of the validity timer.

Figure 25:
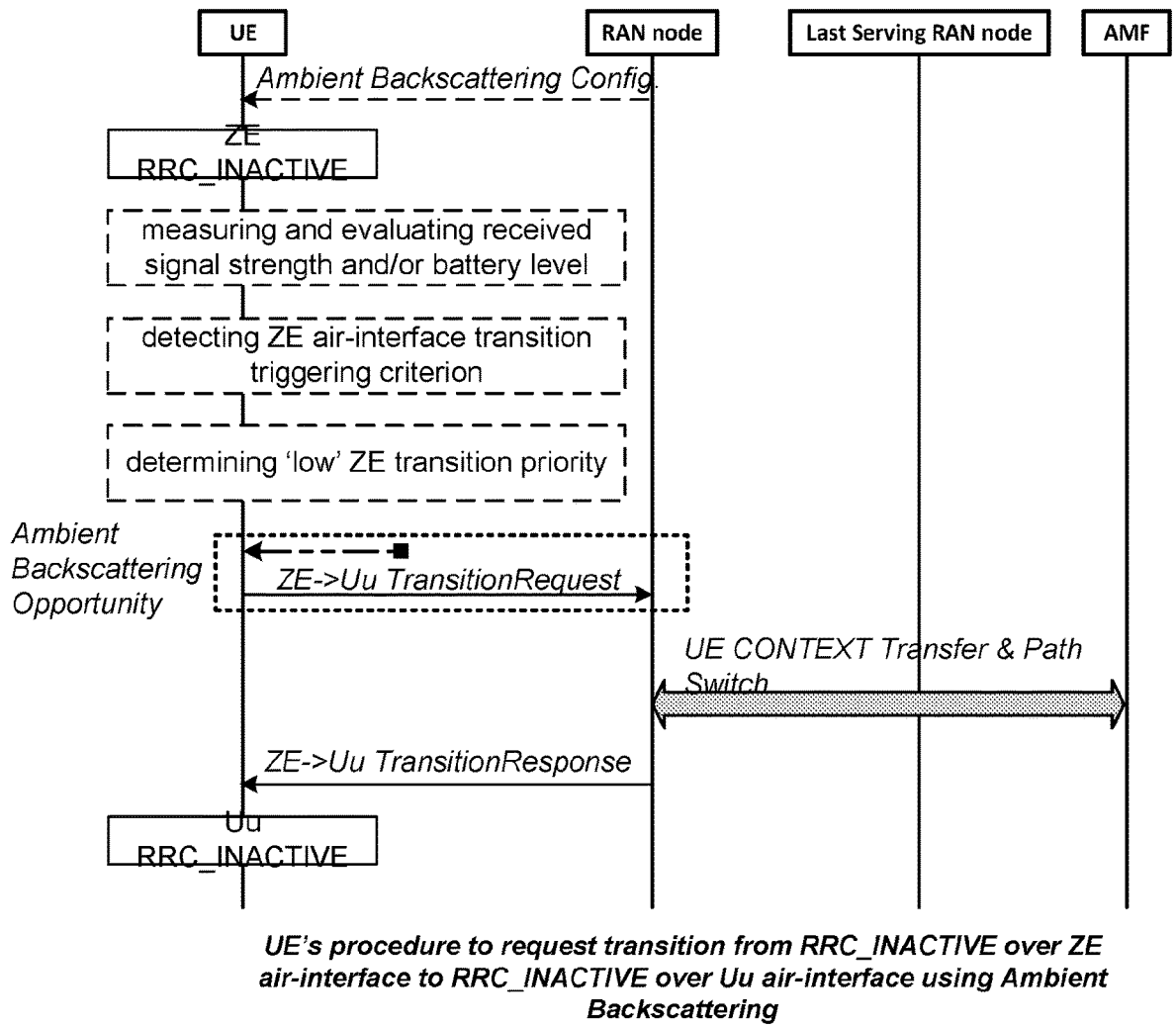
FIG. 25 is a diagram illustrating a WTRU's decision sequence for transitioning to a RRC_INACTIVE state over a ZE air-interface for EH support.

FIG. 25 is a diagram illustrating a WTRU's decision sequence for transitioning to an RRC_INACTIVE state over a ZE air-interface for EH support.

According to embodiments, (e.g., as a first step) a WTRU may report its ZE capability to a network, for example, while connected over a Uu air interface. According to embodiments, (e.g., as a second step) a WTRU may be configured with a ZE feature transition priority, for example, through (e.g., using, according to, based on, etc.) any of an RRC release message including a suspend configuration message (e.g., an RRC release with suspend configuration message), or as one of received system information parameters received over the Uu air interface. According to embodiments, a WTRU may be (e.g., also) assigned any of a ZE-RNTI and a EH-RNTI as part of an RRC release with suspend configuration message, which may be used to address a group of WTRUs, for example, for ZE air-interface configuration and/or dedicated energy harvesting (EH) signaling. According to embodiments, (e.g., as a third step) in a case of a WTRU (e.g., currently) operating in RRC_INACTIVE state over a Uu air interface, such a WTRU may detect a DCI over a PDCCH with a CRC that is scrambled by the WTRU's (e.g., configured) ZE-RNTI and/or EH-RNTI. According to embodiments, a DCI message may include (e.g., information indicating) any of: a field representing a short message only, a field representing scheduling information for a ZE-related Paging message only, and a combination of both fields. According to embodiments, in a case where (e.g., on condition that) DCI contains scheduling information, a WTRU may use (e.g., utilize) the scheduling information to decode a PDSCH and receive additional ZE-related configuration, such as, for example, a change of ZE feature transition priority, dedicated EH signaling configuration, etc.

According to embodiments, (e.g., as In a fourth step, the UE measures and determines the received signal strength over the ZE air interface utilizing a cell/beam specific ZE reference signal and counting number of threshold-triggering events within a specified measurement window $T_{meas}$. According to embodiments, (e.g., as a fifth step) a WTRU may detect a trigger to transition from RRC_INACTIVE state operation over the Uu air interface to RRC_INACTIVE state operation over the ZE air interface, and the WTRU may detect a trigger to monitor EH opportunities over the ZE air interface. According to embodiments, such a WTRU may determine a configured high ZE feature transition priority. According to embodiments, (e.g., as a sixth step) a WTRU may autonomously switch to RRC_INACTIVE state operations over the ZE air-interface and may perform energy harvesting according to configured opportunities.

According to embodiments, for example, as an alternative to the fifth step, there may be a case where a WTRU may detect a trigger to transition from RRC_INACTIVE state operation over the Uu air interface to RRC_INACTIVE state over the ZE air interface, and may detect a trigger to monitor EH opportunities over the ZE air interface. In such a case, a WTRU may determine a configured low ZE feature transition priority. In such a case, according to embodiments, as a sixth step, a WTRU may remain in RRC_INACTIVE state operation over the Uu air interface, and may concurrently use the ZE air-interface to perform energy harvesting according to configured opportunities. According to embodiments, as another alternative to the fifth step, a WTRU may detects only a trigger to monitor EH opportunities over the ZE air interface and may determine a configured low or high ZE feature transition priority. In such a case, as a sixth step, the WTRU may remain in RRC_INACTIVE state operation over the Uu air interface, while (e.g., concurrently, simultaneously, etc.) using the ZE air-interface to perform energy harvesting according to configured opportunities.

According to embodiments, FIG. 25 illustrates a signaling exchange and decision sequences described herein for (e.g., the support of) a WTRU's energy harvesting over the ZE air-interface while operating in an RRC_INACTIVE state.

According to embodiments, a WTRU may report ZE capability information and may receive ZE-related network configuration information, such as any of a ZE Class, a ZE feature transition priority, a (e.g., dynamic) WTRU-class-based ZE-RNTI and/or EH-RNTI, a ZE reference signal configuration, paging sub-band(s), and a (e.g., default) EH signal configuration, over a Uu air interface. According to embodiments, a WTRU operating in Uu RRC_INACTIVE state may detect a DCI transmitted over a PDCCH with a CRC scrambled by a (e.g., WTRU-specific, configured, etc.) ZE-RNTI or EH-RNTI. According to embodiments, in a case where DCI contains a scheduling information field (e.g., a DCI includes information indicating scheduling information), a WTRU may use such field (e.g., information) to decode a PDSCH and to receive ZE-related configuration information, such as any of a change of ZE feature transition priority and/or dedicated EH signaling configuration. According to embodiments, a WTRU may measure and/or determine a ZE received signal strength $RSSI_{ZE}$ according to (e.g., based on) ZE reference signal(s) received within a specified measurement window $T_{meas}$.

According to embodiments, a WTRU may detect a trigger to transition to ZE RRC_INACTIVE, such as, for example, a trigger including any of $RSSI_{ZE}>T_{sig}$ and battery level $B_L<T_{b,min}$, or trigger to only monitor EH opportunities, such as $T_{b,min}<B_L<T_{b,max}$. According to embodiments, in a case where a condition being satisfied for (e.g., a trigger is detected for) any of $RSSI_{ZE}>T_{sig}$ and battery level $B_L<T_{b,min}$ within validity timer, a WTRU may autonomously perform legacy RRC_INACTIVE state operations over ZE air interface and energy harvesting according to default and/or dedicated configured EH opportunities. According to embodiments, in a case where a condition being satisfied for (e.g., a trigger is detected for) $T_{b,min}<B_L<T_{b,max}$, a WTRU may continue legacy RRC_INACTIVE state operations over the Uu air interface while performing energy harvesting according to (e.g., default or dedicated) configured EH opportunities over the ZE air interface. Otherwise, according to embodiments, a WTRU may continue or autonomously fall back to RRC_INACTIVE state operations over the Uu air interface at the end of the validity timer. According to embodiments, a validity timer may be initialized in a case where (e.g., upon) a WTRU being (e.g., first) configured with a high ZE feature transition priority, and the validity timer may be determined explicitly or implicitly, for example, based on configured ZE Class.

According to embodiments, a WTRU may report a ZE capability and may receive a ZE-related network configuration, such as any of a ZE Class, a ZE feature transition priority (e.g., low), a dynamic WTRU-class-based ZE-RNTI and/or EH-RNTI, a ZE reference signal configuration, paging sub-band(s), and default EH signal configuration information, for example, over a Uu air interface. According to embodiments, a WTRU, while operating in Uu RRC_INACTIVE state, may detect a DCI transmitted over a PDCCH with a CRC, for example, that is scrambled by the configured ZE-RNTI and/or EH-RNTI. According to embodiments, a WTRU may determine a change of a ZE feature transition priority to high and may initializing a validity timer based on a received DCI and a configured ZE class. According to embodiments, a WTRU may measure and determine a ZE received signal strength $RSSI_{ZE}$ using a ZE reference signal(s) within a specified measurement window $T_{meas}$. According to embodiments, a WTRU, on condition that a trigger to transition to ZE RRC_INACTIVE (e.g., any of $RSSI_{ZE}>T_{sig}$ and battery level $B_L<T_{b,min}$) is detected within the validity timer by the WTRU, such WTRU may (e.g., autonomously) perform legacy RRC_INACTIVE state operations over ZE air interface and energy harvesting according to default configured EH opportunities. According to embodiments, otherwise, a WTRU may continue or autonomously fall back to RRC_INACTIVE state operations over the Uu air interface at the end of the validity timer.

According to embodiments, a WTRU may report its ZE capability and may receive a ZE-related network configuration, such as any of a ZE Class, a ZE feature transition priority (e.g., low, high, etc.), a dynamic WTRU-class-based ZE-RNTI and/or EH-RNTI, a ZE reference signal configuration, paging sub-band(s), and a default EH signal configuration, for example, over a Uu air interface. According to embodiments, a WTRU may operate in a Uu RRC_INACTIVE state and may detect a DCI transmitted over a PDCCH with a CRC scrambled by the configured ZE-RNTI and/or EH-RNTI. According to embodiments, a WTRU may determine activation of default EH opportunities and may determine a corresponding configuration according to (e.g., based on) any of the received DCI and the configured ZE class. According to embodiments, a WTRU may measure and determine a ZE received signal strength $RSSI_{ZE}$, for example, using ZE reference signal(s) within a specified measurement window $T_{meas}$. According to embodiments, on condition that a trigger to only monitor EH opportunities (e.g., $T_{b,min} < B_L < T_{b,max}$, a WTRU may continue legacy RRC_INACTIVE state operations over Uu air interface and performing energy harvesting according to default configured EH opportunities over the ZE air interface. Otherwise, according to embodiments, a WTRU may continue RRC_INACTIVE state operations over the Uu air interface.

According to embodiments, a WTRU may report a ZE capability and may receive ZE-related NW configuration information (e.g., any of a ZE Class, a ZE feature transition priority (e.g., high), a dynamic WTRU-class-based ZE-RNTI and/or EH-RNTI, a ZE reference signal configuration, paging sub-band(s), and default EH signal configuration, over a Uu air interface. According to embodiments, a WTRU may operate in Uu RRC_INACTIVE state and may detect a DCI transmitted over a PDCCH with a CRC scrambled by any of the configured ZE-RNTI or EH-RNTI. According to embodiments, a WTRU may determine activation of default EH opportunities and corresponding configuration according to (e.g., based on) any of a received DCI and a configured ZE class. According to embodiments, a WTRU may measure and determine a ZE received signal strength $RSSI_{ZE}$ using ZE reference signal(s) within a specified measurement window $T_{meas}$. According to embodiments, a WTRU may detect a trigger to transition to ZE RRC_INACTIVE within a validity timer and may detect any of insufficient energy transfer levels (e.g. $RSSI_{ZE} < T_{sig}$, battery level $B_L < T_{b,min}$) and insufficient expected energy transfer levels $< T_{EH,min}$.

According to embodiments, a WTRU may transition to RRC_CONNECTED state over the Uu air-interface and may request WTRU-specific dedicated EH opportunities and/or may use the main transceiver (and/or backscattering-based UL transmissions opportunities) to request WTRU-class-specific dedicated EH opportunities. According to embodiments, a WTRU may autonomously switch to ZE RRC_INACTIVE state and may perform legacy operations over a ZE air interface and energy harvesting according to default configured EH opportunities. According to embodiments, a WTRU may receive WTRU-specific and/or WTRU class-specific dedicated EH opportunities configuration information, for example, over the ZE air interface, and such a WTRU may harvest energy accordingly. According to embodiments, a validity timer may be initialized in a case where a WTRU is first configured with high ZE feature transition priority and a validity timer may be determined explicitly or implicitly based on a configured ZE Class.

WTRU Transition from Uu RRC_CONNECTED to ZE RRC_INACTIVE

Figure 26:
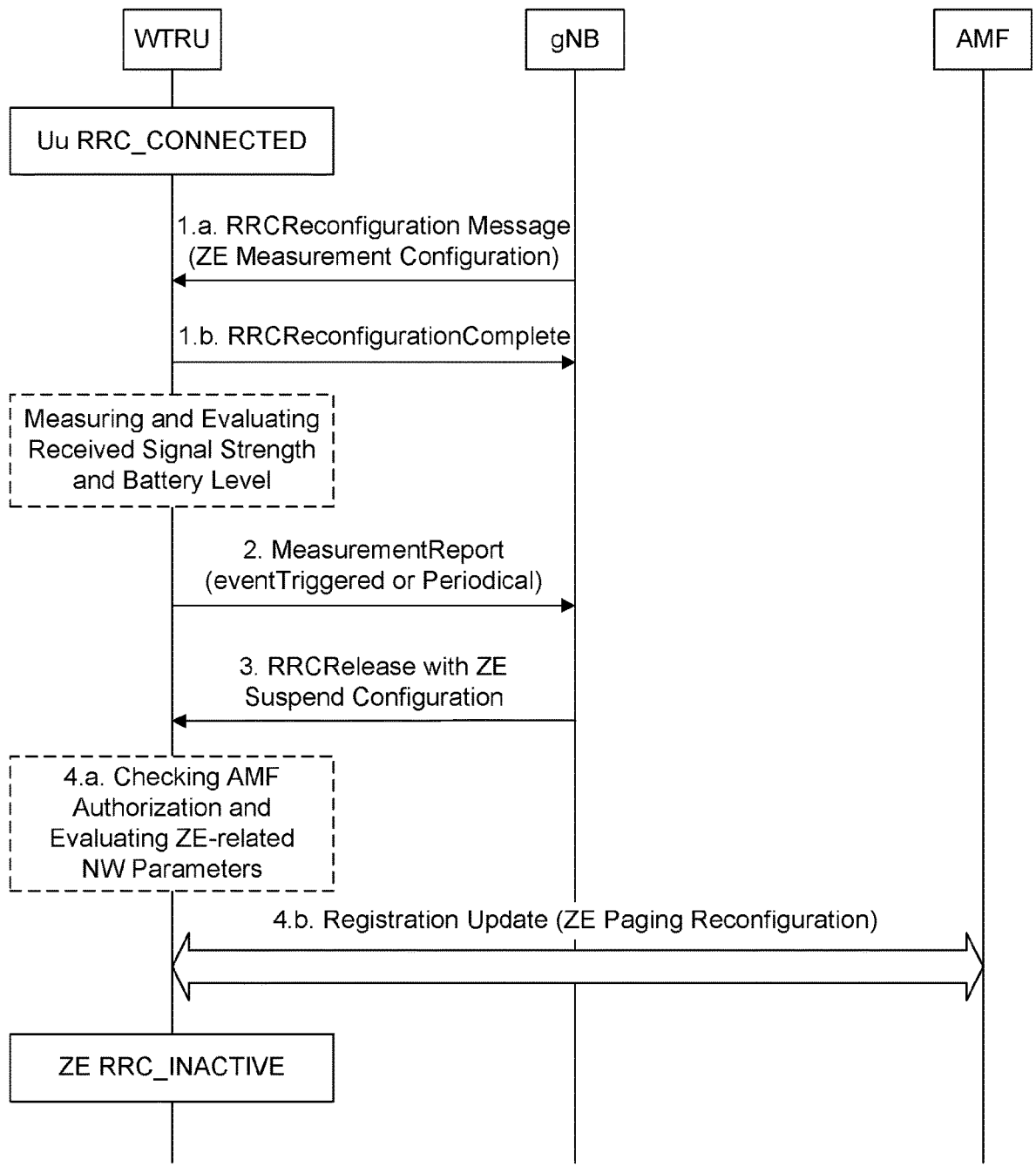
FIG. 26 is a diagram illustrating a procedure for WTRU completing transitioning from RRC_CONNECTED over Uu air-interface to RRC_INACTIVE over ZE air-interface, according to embodiments.

FIG. 26 is a diagram illustrating a procedure for WTRU completing transitioning from RRC_CONNECTED over Uu air-interface to RRC_INACTIVE over ZE air-interface, according to embodiments.

According to embodiments, a WTRU equipped with a (e.g., capable) passive receiver may transition directly from Uu air interface connected state operation to ZE air interface inactive state operation, for example, as shown in FIG. 26. According to embodiments, a WTRU that has already reported its ZE capability to the network may be (e.g., is currently) operating in RRC_CONNECTED state over the Uu air interface. According to embodiments, as a first step, the WTRU may receive a ZE-related reference signal configuration and a measurement reports configuration via (e.g., respectively using) measConfig and reportConfig IEs received as part of any of an RRCResume message (e.g., in a case where the WTRU was in an RRC_INACTIVE state before transitioning to RRC_CONNECTED state) or an RRCReconfiguration message.

According to embodiments, as a second step, the WTRU may measure the received signal strength over the ZE air interface utilizing a cell/beam specific ZE reference signal and may count a number of threshold-triggering events occurring within a specified transmission/measurement window $T_{meas}$. According to embodiments, as a third step, the WTRU, either periodically or according to measurement triggering events (e.g., a ZE received signal strength is above a preconfigured/signaled threshold $T_{sig}$ and a battery level is below another preconfigured/signaled threshold $T_b$), may transmit a ZE measurement report to the serving RAN node.

According to embodiments, as a fourth step, the WTRU may receive an RRCRelease with ZE Suspend Configuration message. According to embodiments, as a fifth step, the WTRU may transition to an RRC_INACTIVE state over the ZE air-interface. According to embodiments, as an alternative fifth step, on condition that the WTRU decides that there is a need to change any of the ZE-related network paging parameters agreed upon during registration, the WTRU may initiate a registration update, for example, for (e.g., the purpose of) ZE Paging reconfiguration, as described earlier, before beginning RRC_INACTIVE state operation over the ZE air-interface.

WTRU Transition from ZE RRC_INACTIVE to Uu RRC_INACTIVE/IDLE

According to embodiments, a WTRU may transition from an RRC_INACTIVE state over the ZE air-interface to an RRC_INACTIVE state over the Uu air-interface according to any of: (1) detection of a criterion that triggers transition to the Uu air-interface (e.g. a ZE received signal strength falling below a certain threshold and/or a battery level being above another threshold); and (2) reception of a network-initiated transition request. According to embodiments, that is, on the other hand, the WTRU may transition from an RRC_INACTIVE state over the ZE air-interface to an RRC_IDLE state over the Uu air-interface, for example, according to detection of a ZE air-interface link failure. According to embodiments, upon detection of ZE air-interface transition triggering criterion, the WTRU may follow any of an autonomous air-interface transition or a WTRU-initiated ZE-to-Uu air-interface transition procedure, for example, as described below.

Figure 27:
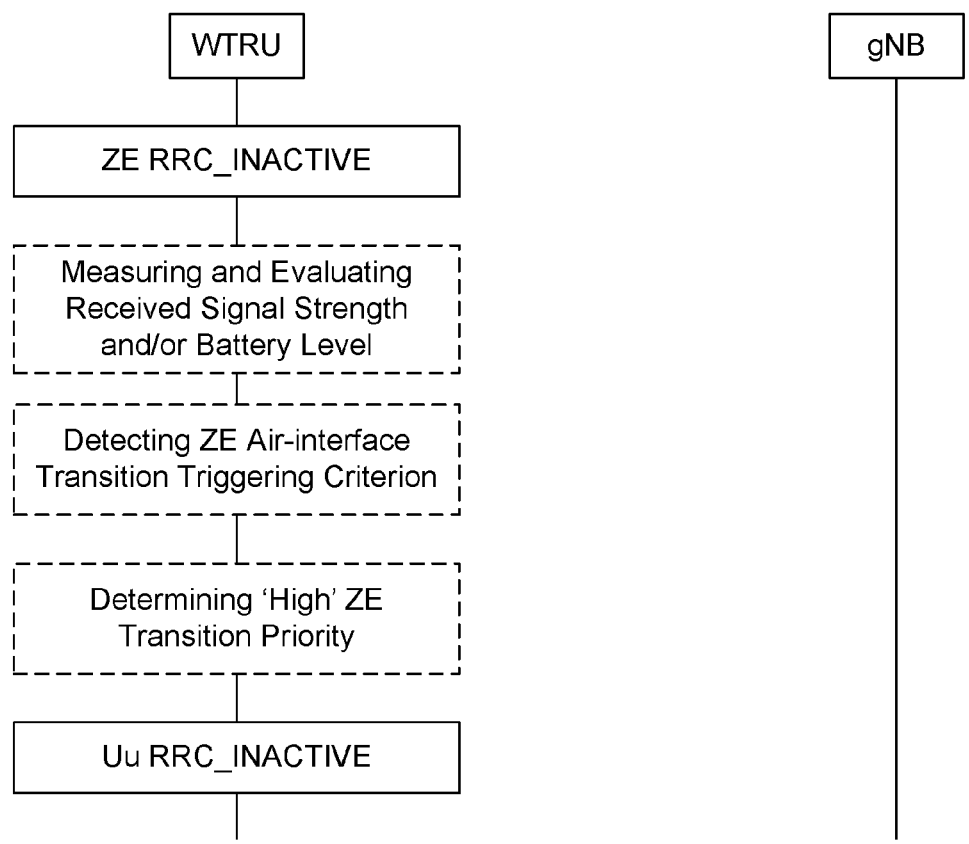
FIG. 27 is a diagram illustrating a procedure for a WTRU autonomously transitioning from RRC_INACTIVE over ZE air-interface to RRC_INACTIVE over Uu air-interface, according to embodiments.

FIG. 27 is a diagram illustrating a procedure for a WTRU autonomously transitioning from RRC_INACTIVE over ZE air-interface to RRC_INACTIVE over Uu air-interface, according to embodiments.

According to embodiments, as a first step, a WTRU operating in RRC_INACTIVE state over the ZE air-interface may keep track of the received signal strength over the ZE air interface by utilizing a cell/beam specific ZE reference signal and/or by counting a number of threshold-triggering events occurring within a specified transmission/measurement window $T_{meas}$. According to embodiments, as a second step, a WTRU may detect a trigger to transition from RRC_INACTIVE state operation over the ZE air interface to RRC_INACTIVE state over the Uu air interface (e.g., based on a trigger associated with a ZE received signal strength being below a preconfigured/signaled threshold $T_{sig,min}$ and/or a battery level being above another preconfigured/signaled threshold $T_{b,charged}$. According to embodiments, as a third step, a WTRU may determine a configured high ZE feature transition priority and the WTRU may autonomously switch to RRC_INACTIVE state operations over the Uu air-interface. According to embodiments, the WTRU autonomous state transition procedure described above may be as depicted in FIG. 27, wherein interaction between the WTRU and the current or the past serving RAN nodes may not be needed (e.g., required) for the transition to happen.

According to embodiments, as a first step, a WTRU operating in RRC_INACTIVE state over the ZE air-interface may keep track of (e.g., measure, monitor, etc.) a received signal strength over the ZE air interface using a cell/beam specific ZE reference signal and may count a number of threshold-triggering events occurring within a specified transmission/measurement window $T_{meas}$. According to embodiments, as a second step, a WTRU may detect a trigger for transitioning from RRC_INACTIVE state operation over the ZE air interface to RRC_INACTIVE state over the Uu air interface. For example, such a trigger may be a ZE received signal strength falling below a preconfigured/signaled threshold $T_{sig,min}$ and/or a battery level rising above another preconfigured/signaled threshold $T_{b,charged}$. According to embodiments, as a third step, the WTRU may determine a configured low ZE feature transition priority and may begins a WTRU-initiated ZE-to-Uu state transition procedure.

Figure 28:
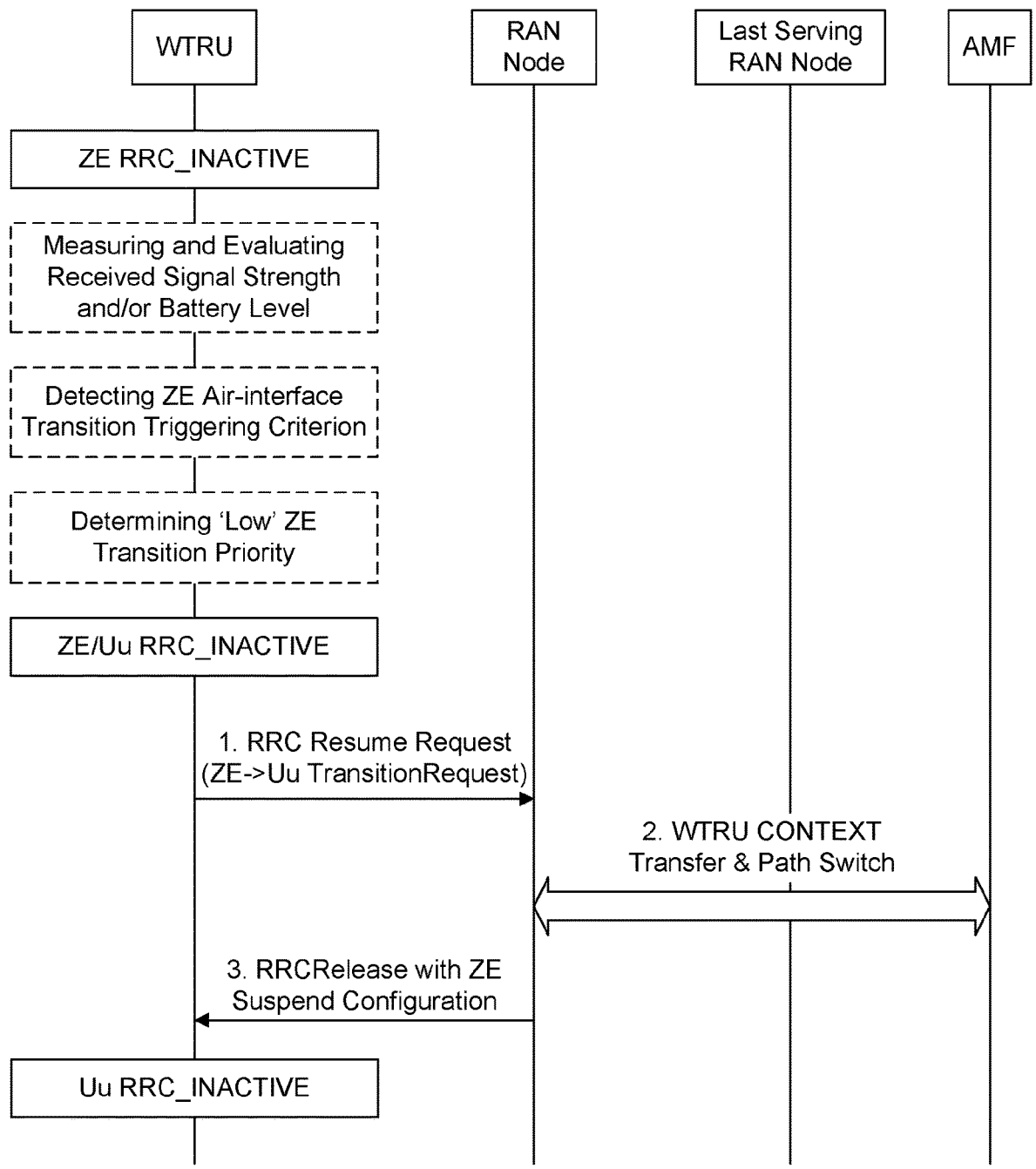
FIG. 28 is a diagram illustrating a procedure for a WTRU requesting a transition from RRC_INACTIVE over a ZE air-interface to RRC_INACTIVE over a Uu air-interface, according to embodiments.

FIG. 28 is a diagram illustrating a procedure for a WTRU requesting a transition from RRC_INACTIVE over a ZE air-interface to RRC_INACTIVE over a Uu air-interface, according to embodiments.

According to embodiments, a WTRU-initiated state transition procedure may include a message and signaling exchange sequence shown in FIG. 28, and such a procedure may begin according to a WTRU (e.g., simultaneously) switching operations to RRC_INACTIVE over both ZE and Uu air-interfaces. According to embodiments, as a first step, a WTRU may use the Uu air-interface, and may initiate an RRC connection resume procedure with the resume cause set to ZE-to-Uu air interface transition request. According to embodiments, as a second step, a RAN may transfer a WTRU CONTEXT from the last serving RAN node to the current serving RAN node, and may initiate a path switch procedure with the serving AMF. According to embodiments, as a third step, the RAN may update any of the paging assistance information and the RRC inactive assistance information associated with the WTRU CONTEXT, and the RAN may send an RRCRelease message with ZE Suspend Configuration to the WTRU.

Figure 29:
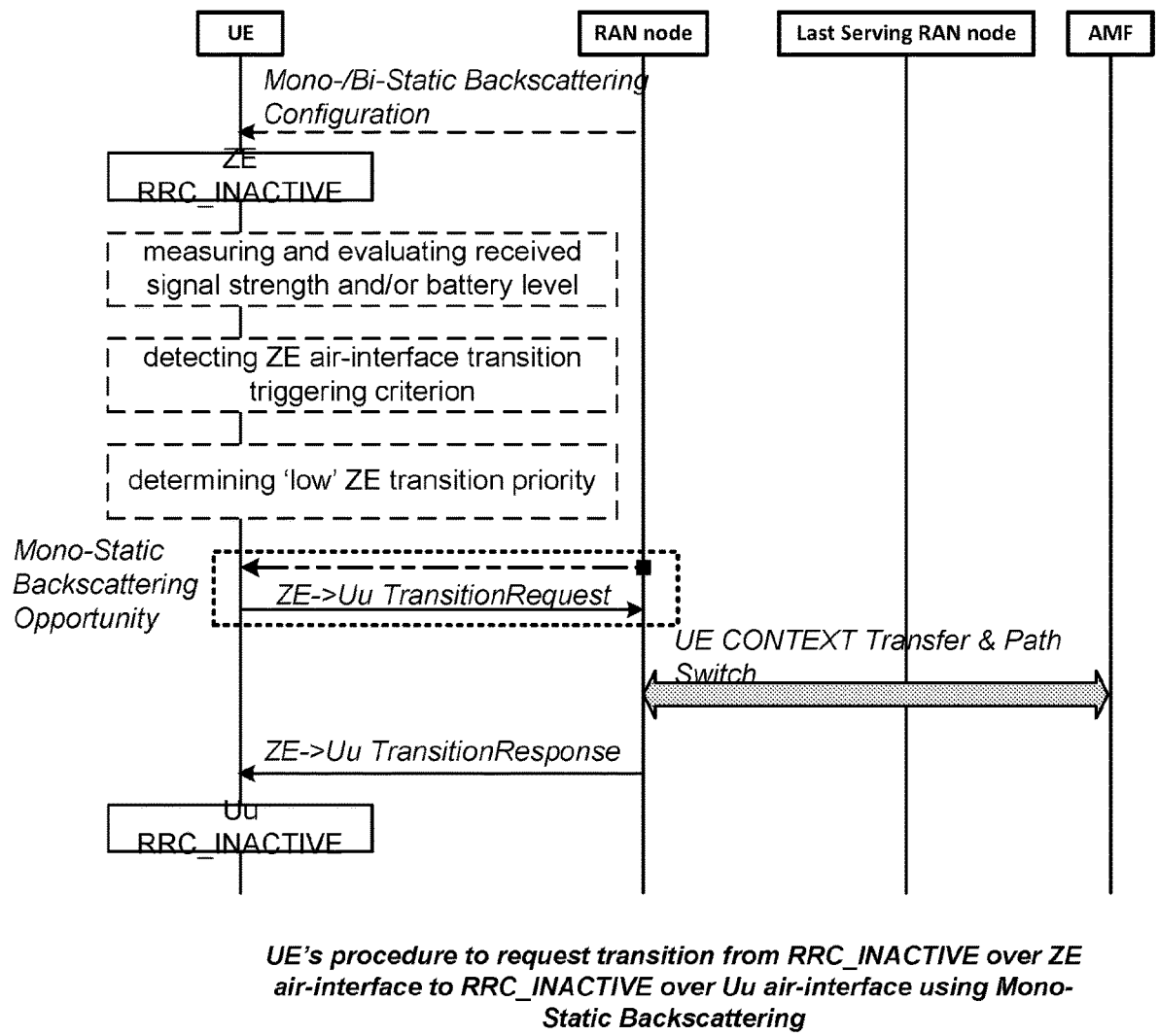
FIG. 29 is a diagram illustrating a WTRU's procedure to request transition from RRC_INACTIVE state operation over a ZE air-interface to RRC_INACTIVE state operation over a Uu air-interface using ambient backscattering opportunities, according to embodiments.

FIG. 29 is a diagram illustrating a WTRU's procedure to request transition from RRC_INACTIVE state operation over a ZE air-interface to RRC_INACTIVE state operation over a Uu air-interface using ambient backscattering opportunities, according to embodiments.

According to embodiments (e.g., as an alternative embodiment to that described above, of FIG. 28), a WTRU-initiated state transition procedure including messaging and signaling exchange sequences are shown in FIG. 29, wherein both a network/RAN and a WTRU may support ambient backscattering. According to embodiments, for example, in a case of FIG. 29, a network (e.g., a RAN) may (e.g., need to, have to, etc.) differentiate between regular transmissions and backscattering based transmissions, for example, in order to be able to cancel interference, for example, according to an agreement (e.g., in the form of an ambient backscattering configuration) between the network and WTRUs. According to embodiments, (e.g., the procedure begins by) a WTRU may receive ambient backscattering configuration information from a network, such configuration information including any of channels considered for ambient backscattering and transmission configuration.

According to embodiments, a WTRU may receive ambient backscattering configuration information as any of a part of System Information and as a part of an RRC release message with suspend configuration. According to embodiments, (e.g., as a first step), a WTRU may use the ZE air interface and the configured ambient backscattering opportunities, in a first step, to transmit a ZE-to-Uu air interface transition request. According to embodiments, (e.g., as a second step), a RAN may transfer (e.g., transmit, send, etc.) a WTRU CONTEXT from a last serving RAN node to a current RAN node and may initiates a Path Switch procedure with a serving AMF. According to embodiments, (e.g., as a third step), a RAN may update any of Paging Assistance Information and RRC Inactive Assistance Information associated with the WTRU CONTEXT, and may send an air interface transition response (e.g., approval) message (e.g., and if required, including any updated Uu Suspend Configuration) to the WTRU.

Figure 30:
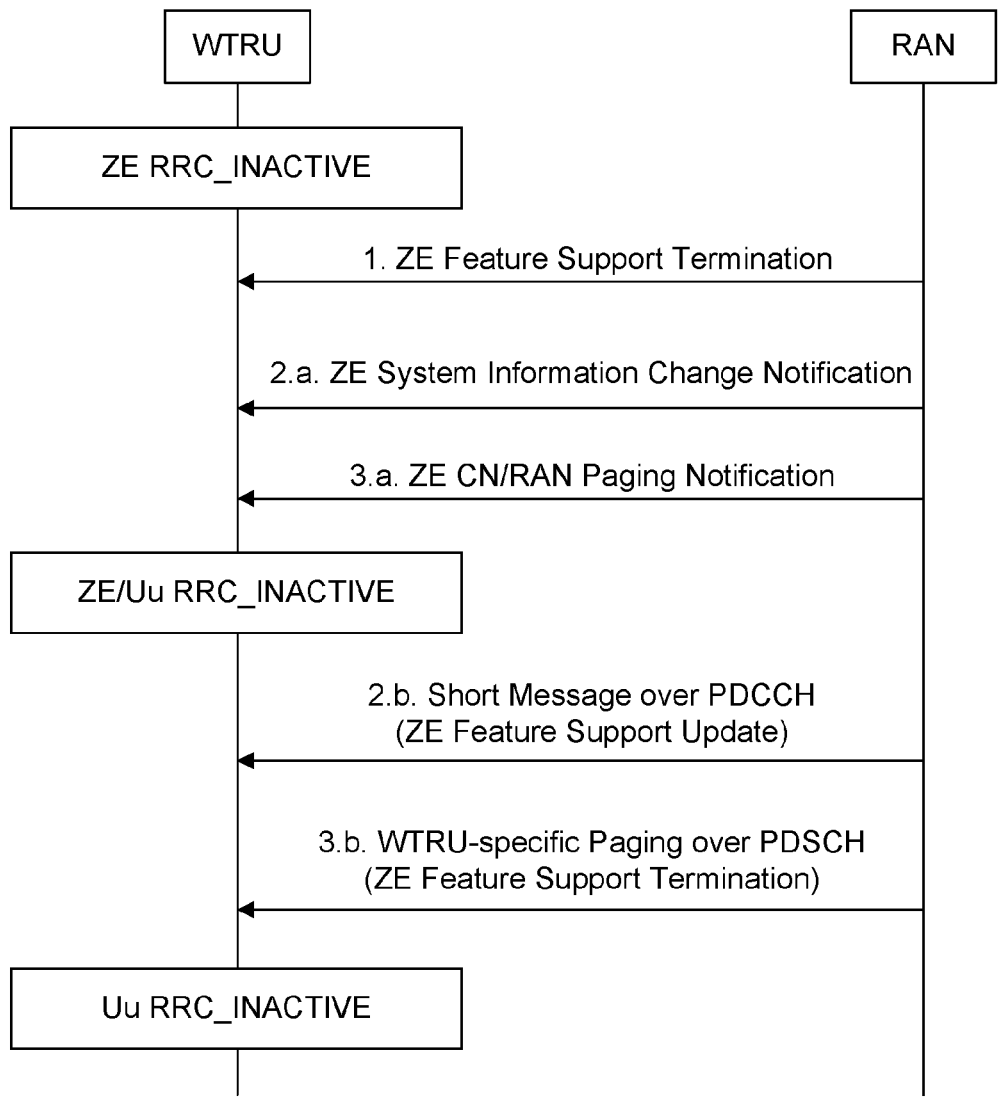
FIG. 30 is a diagram illustrating a network-initiated transition of a ZE-capable WTRU from RRC_INACTIVE over a ZE air-interface to RRC_INACTIVE over a Uu air-interface, according to embodiments.

FIG. 30 is a diagram illustrating a network-initiated transition of a ZE-capable WTRU from RRC_INACTIVE over a ZE air-interface to RRC_INACTIVE over a Uu air-interface, according to embodiments.

According to embodiments, a WTRU's procedure corresponding to the reception of a network-initiated ZE-to-Uu air-interface transition may be any of three (e.g., different) technical realizations shown in FIG. 30. According to embodiments, for example, according to a first technical realization, a WTRU operating in RRC_INACTIVE state over the ZE air-interface may receive any of a ZE common control message or a (e.g., WTRU, group of WTRUs, etc.) dedicated control message that indicates any of a current serving cell or a network termination of support for ZE signaling. Subsequently, according to embodiments, the WTRU may transition directly to RRC_INACTIVE operations over the Uu air-interface.

According to embodiments, for example, according to a second technical realization, the WTRU may, as a first step, receive a ZE System Information Change Notification message. The WTRU may (e.g., then), as a second step, switch to RRC_INACTIVE operation over the Uu air-interface, for example, so that the WTRU may receive an indication of any of a current serving cell or a network termination of support for the ZE signaling feature, for example, using any of a short message transmitted with P-RNTI over DCI or a part of system information parameters. According to embodiments, for example, as an alternative, the WTRU may receive the ZE support termination indication as part of an incremental System Information update over the ZE air-interface. According to embodiments, for example, as a third step, the WTRU may continue RRC_INACTIVE state operations over the Uu air-interface.

According to embodiments, for example, according to a third technical realization, a WTRU may, as a first step, receive any of a WTRU-specific or a WTRU-groupcast ZE-paging notification message. According to embodiments, as a second step, the WTRU may switch to RRC_I-NACTIVE operation over the Uu air-interface, for example, so as to receive a WTRU-specific or WTRU-groupcast indication of current serving cell or network termination of its support for the ZE signaling feature, via, for example, a paging message transmitted over a PDSCH channel. According to embodiments, the paging message may be any of CN or RAN initiated. According to embodiments, as a third step, the WTRU may continue RRC_INACTIVE state operations over the Uu air-interface. According to embodiments, for example, in any (e.g., all) of the three technical realization discussed above, on condition that the WTRU has to update any of the RRC connection configuration, the WTRU may (e.g., have to, try to, etc.) resume/re-establish the RRC connection, obtain the RRC connection reconfiguration, and (e.g., then) enter into the RRC_INACTIVE state operation over the Uu air-interface.

Figure 31:
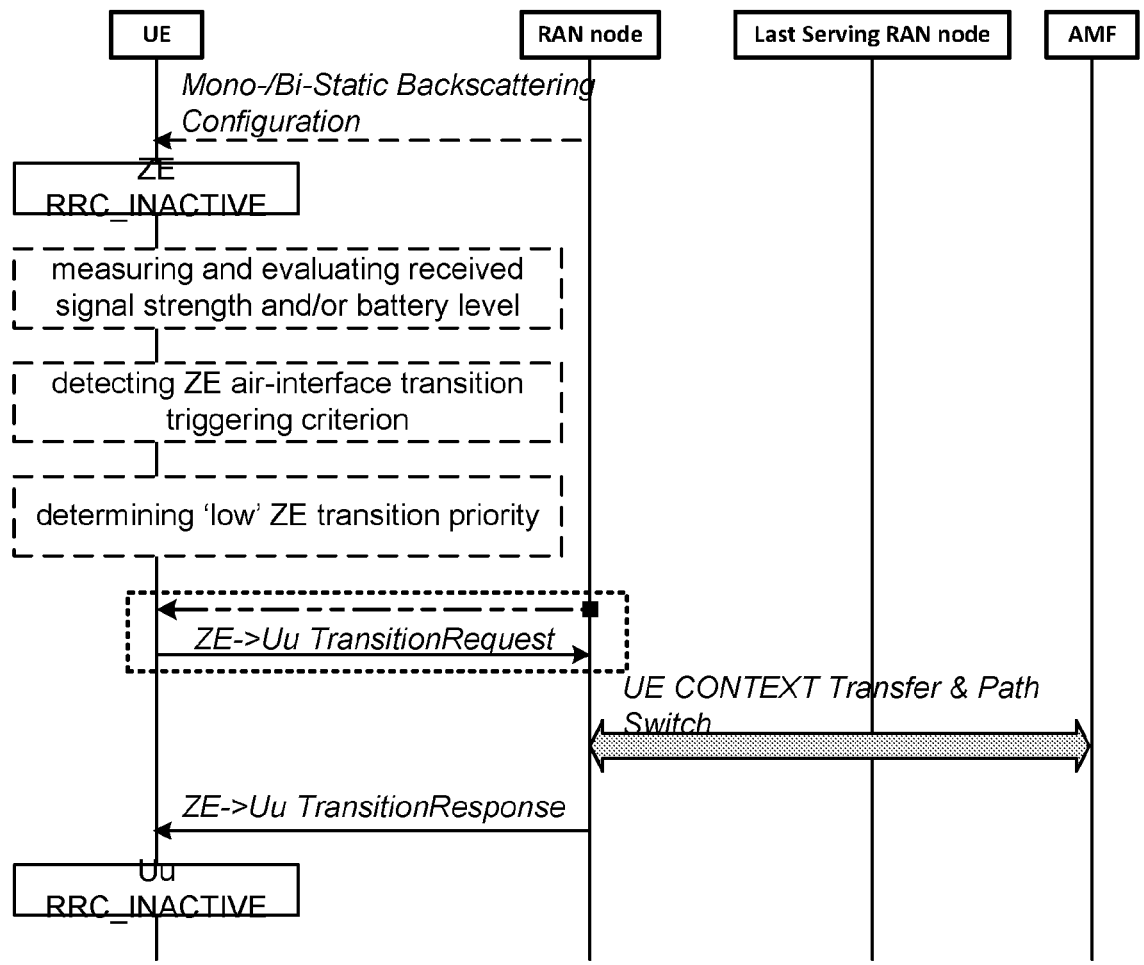
FIG. 31 is a diagram illustrating a WTRU's procedure to request transition from RRC_INACTIVE state operation over a ZE air-interface to RRC_INACTIVE state operation over a Uu air-interface using ambient backscattering opportunities, according to embodiments.

FIG. 31 is a diagram illustrating a WTRU's procedure to request transition from RRC_INACTIVE state operation over a ZE air-interface to RRC_INACTIVE state operation over a Uu air-interface using ambient backscattering opportunities, according to embodiments.

According to embodiments (e.g., as an alternative embodiment to that described above, of FIG. 30), a network-assisted WTRU-initiated state transition procedure including messaging and/or signaling exchange sequences are shown in in FIG. 31, wherein both a network/RAN and a WTRU may perform (e.g., support) mono-/bi-static backscattering-based channel access. According to embodiments, (e.g., a procedure begins by) a WTRU may receive mono-/bi-static backscattering-based channel access configuration information (e.g. transmission opportunities, contention strategy, etc.) from a network, for example, as any of a part of System Information or as a part of an RRC release message with suspend configuration. According to embodiments, (e.g., in a first step) a WTRU may (e.g., then) use a ZE air interface and configured mono-/bi-static backscattering opportunities, for example, to contend for the channel and to transmit a ZE-to-Uu air interface transition request. According to embodiments, (e.g., in a second step) a RAN may transfer a WTRU CONTEXT from a last serving RAN node to a current one and the RAN may initiate a Path Switch procedure with the serving AMF. According to embodiments, (e.g., in a third step) a RAN may update the Paging Assistance Information and/or RRC Inactive Assistance Information associated with the WTRU CONTEXT, and the RAN may send an air interface transition response (e.g., an approval) message including any updated Uu Suspend Configuration (e.g., that may be required) to the WTRU.

Procedures Supporting WTRU Transition Involving ZE RRC CONNECTED

Figure 32:
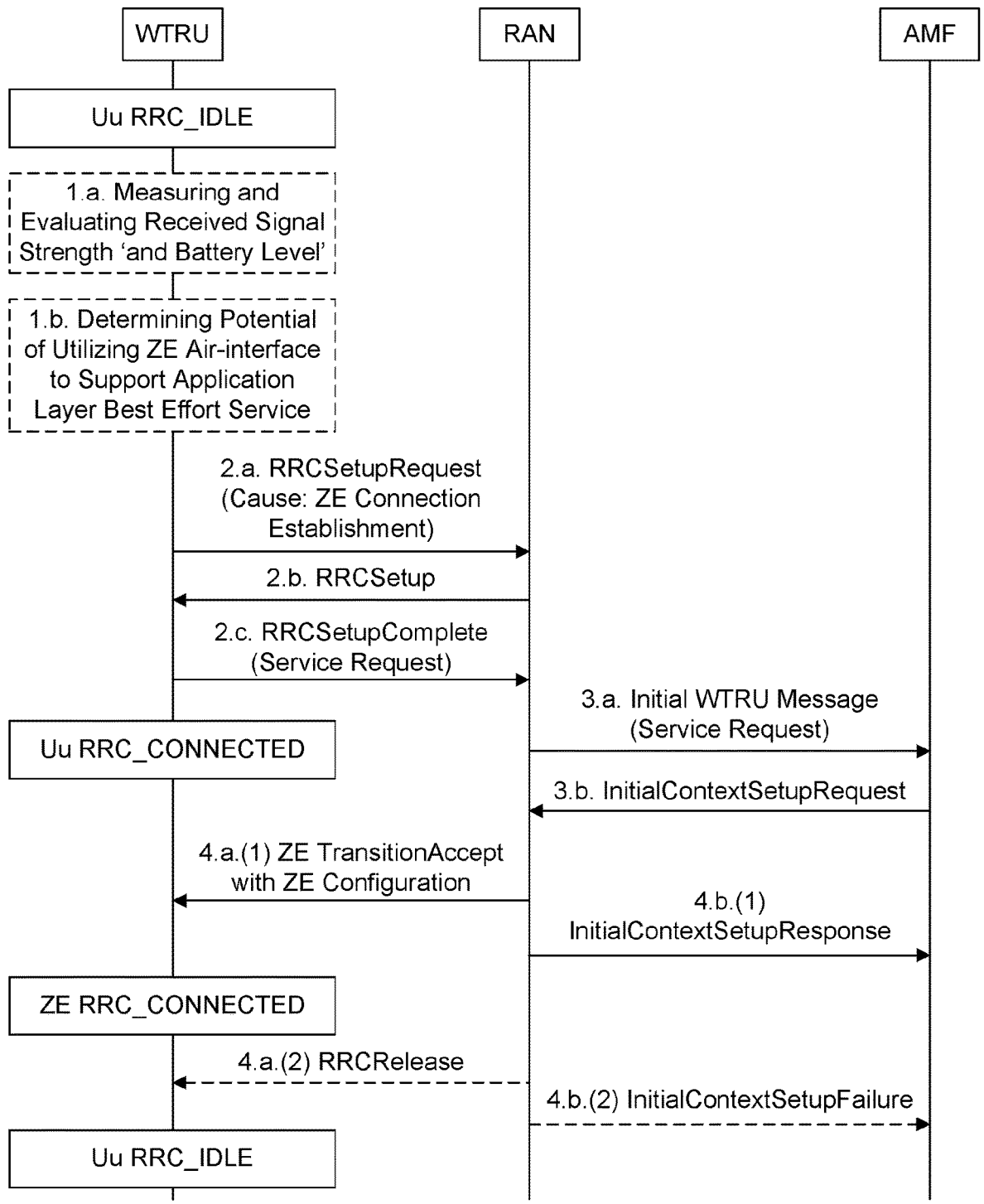
FIG. 32 is a diagram illustrating a procedure for a WTRU to request RRC connection establishment over the ZE air-interface for best effort service support, according to embodiments.
Figure 33:
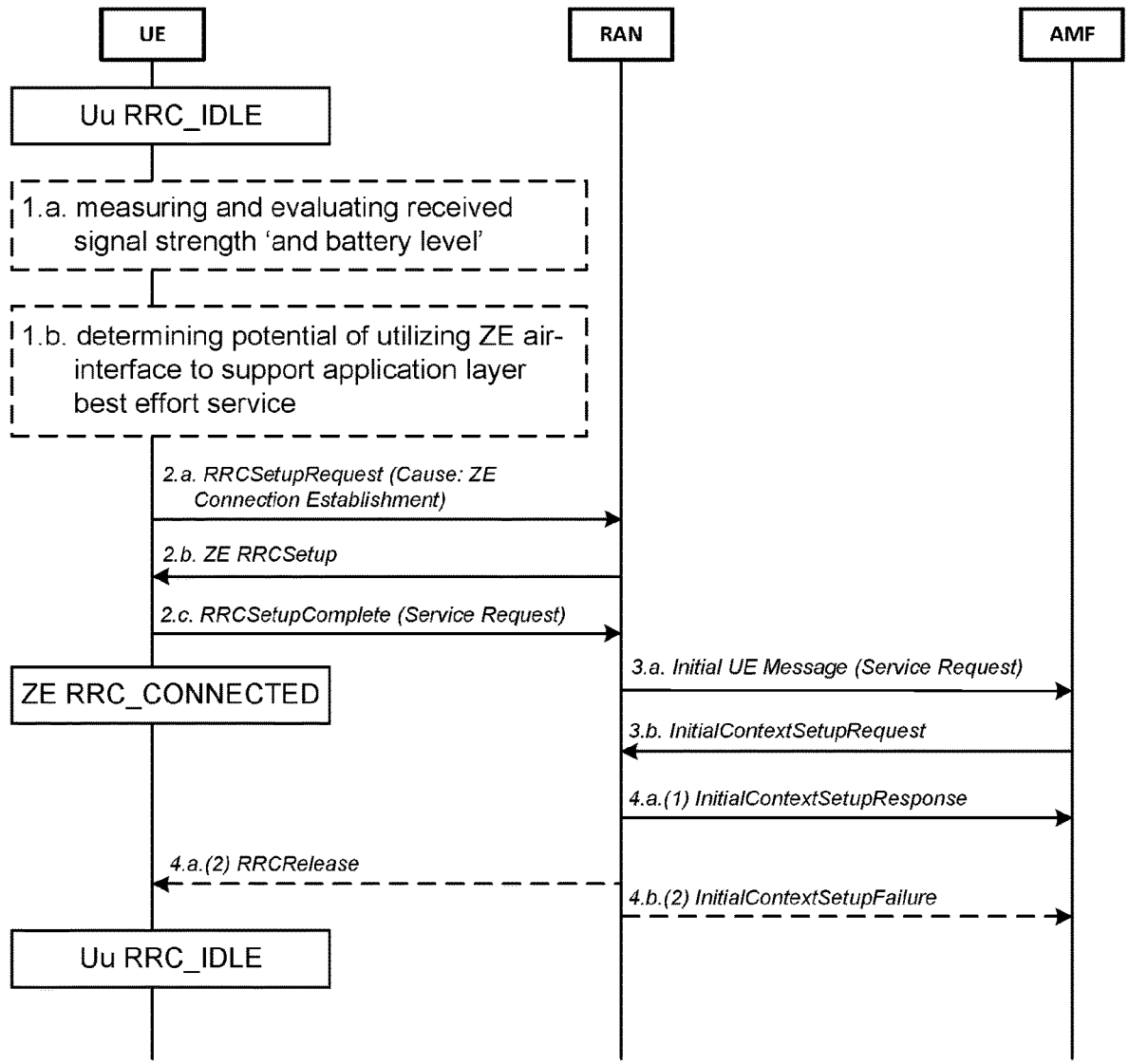
FIG. 33 is a diagram illustrating a WTRU's procedure for requesting RRC connection establishment over a ZE air-interface for best effort service support using a ZE air-interface RRCSetup message, according to embodiments.
Figure 34:
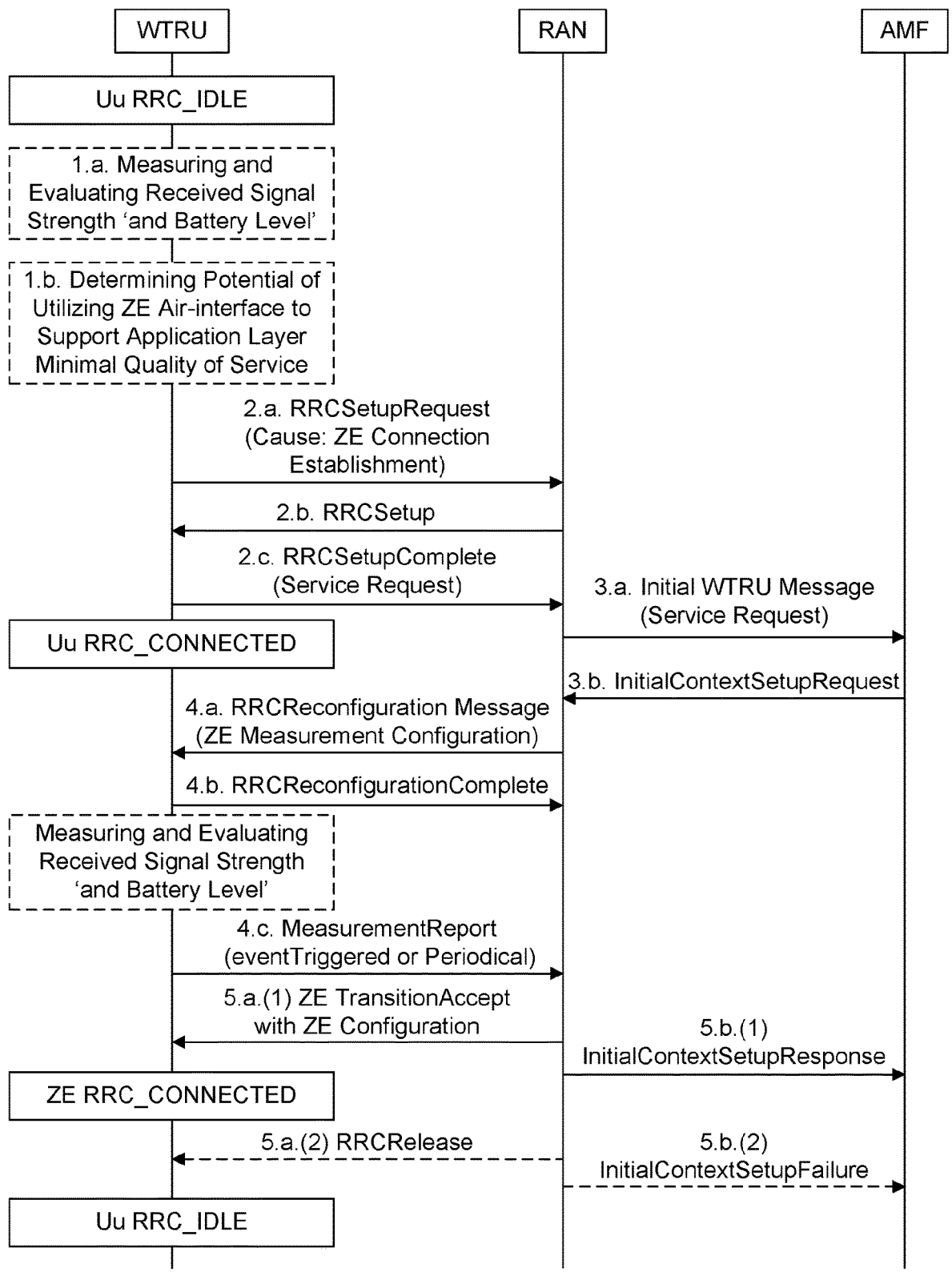
FIG. 34 is a diagram illustrating a procedure for a WTRU to request RRC connection establishment over the ZE air-interface for minimal quality of service support, according to embodiments.

FIG. 32 is a diagram illustrating a procedure for a WTRU to request RRC connection establishment over the ZE air-interface for best effort service support, according to embodiments; FIG. 33 is a diagram illustrating a WTRU's procedure for requesting RRC connection establishment over a ZE air-interface for best effort service support using a ZE air-interface RRCSetup message, according to embodiments; and FIG. 34 is a diagram illustrating a procedure for a WTRU to request RRC connection establishment over the ZE air-interface for minimal quality of service support, according to embodiments.

According to embodiments, a WTRU equipped with a (e.g.,) capable passive receiver may request establishment of an RRC connection over the ZE air-interface, and, for example, the WTRU may support limited capability best effort services. According to embodiments, such limited capability best effort services may not need (e.g., require) UL transmission feedback and/or may need (e.g., require) backscattering based feedback within limited service area scenarios. According to embodiments, occasional transitions between Uu RRC_CONNECTED and ZE RRC_CONNECTED may (e.g., also) be supported, for example, to provide an RRC connection with minimal quality of service requirement over the ZE air-interface. According to embodiments, a procedure for such a WTRU may include (e.g., allows, facilitates, shows, describe, etc.) such WTRU's transition from an RRC_IDLE state operation over the Uu air-interface to RRC_CONNECTED state operation over the ZE air-interface, for example, as shown in FIGS. 32 and 34.

According to embodiments, referring to FIG. 32, such a procedure describes (e.g., shows) a WTRU's transition to a ZE RRC_CONNECTED state that supports only best effort services. In such a case, (e.g., it may be assumed that) a WTRU may have (e.g., already) reported its ZE capability in a prior step, and may be (e.g., currently) operating in an RRC_IDLE state over the Uu air-interface. According to embodiments, a WTRU, as a first step, may determine (e.g., the possibility of) use of the ZE air-interface to provide a best effort service to the application layer. According to embodiments, a WTRU may determine the possibility (e.g., the potential) of using the ZE air-interface for application layer support according to any of: a service requirement provided by the application layer, and a measured received signal strength using a cell/beam specific ZE reference signal and/or a Uu reference signal.

According to embodiments, as a second step, a WTRU may initiate an RRC connection establishment over the Uu air-interface by: (1) transmitting an RRCSetupRequest message with an establishmentCause IE set to "ZE connection establishment", (2) receiving an RRCSetup message, and (3) transmitting an RRCSetupComplete message with the initial WTRU message set to "Service Request". According to embodiments, an initial UE message may include the establishment cause. According to embodiments, as a third step, a RAN node may forward the initial WTRU message to the serving AMF. In such a case, the AMF may (e.g., then) determine its ability to support and/or handle the service, for example, by taking into account the establishment cause. Further, in such a case, the AMF may (e.g., subsequently) either reject the service request or send an InitialContextSetupRequest message to the RAN node.

According to embodiments, as a fourth step, the RAN node may use the WTRU capability, for example, as received in the InitialContextSetupRequest message, to determine the RAN node's ability to support (e.g., serving of) the WTRU's connection over the ZE air interface. Further, according to embodiments, on condition that the RAN node determined that it is able to handle the ZE connection, the RAN node may transmit a (e.g., new) RRC message to the WTRU and may send an InitialContextSetupResponse to the serving AMF to confirm the successful connection setup. According to embodiments, a RRC message used (e.g., dedicated) for the support of the ZE connection establishment, may be, for example, a new RRC used for ZE TransitionAccept with ZE Configuration message. According to embodiments (e.g., as an alternative), on condition that the RAN node determined that is unable to handle the ZE connection, the RAN node may transmit an RRCRelease message to the WTRU to transition it into a Uu RRC_IDLE state and may send an InitialContextSetupFailure message to the serving AMF. According to embodiments, as a fifth step, the WTRU may enter any of a ZE RRC_CONNECTED state (e.g., in a case where the connection establishment was successful) or a Uu RRC_IDLE state (e.g., in a case where the connection establishment was unsuccessful). The WTRU may (e.g., subsequently) try to re-establish the RRC connection over the ZE or Uu air-interface.

FIG. 33 is a diagram illustrating a WTRU's procedure for requesting RRC connection establishment over a ZE air-interface for best effort service support using a ZE air-interface RRCSetup message, according to embodiments.

According to embodiments, for example, referring to a procedure illustrated in FIG. 33, a WTRU may transition to ZE RRC_CONNECTED state that supports only best effort services without transitioning through Uu RRC_CONNECTED state. In such a case, according to embodiments, it may be assumed that the WTRU has (e.g., already) reported its ZE capability (e.g., in a prior step) and is currently operating in an RRC_IDLE state over the Uu air-interface.

According to embodiments, (e.g., as a first step) a WTRU may determine to use (e.g., the possibility of using) a ZE air-interface to provide a best effort service to an application layer (e.g., for an application executed on/by the WTRU). According to embodiments, a WTRU may determine to use (e.g., the potential/possibility/option/availability of using) the ZE air-interface for application layer support according to (e.g., based on) a service requirement provided by an application layer as well as a measured received signal strength using a cell/beam specific ZE or Uu reference signal. According to embodiments, (e.g., as a second step) a WTRU may initiate an RRC connection establishment over the Uu air-interface, for example, by: (1) transmitting an RRCSetupRequest message with an establishmentCause IE set to "ZE connection establishment"; (2) receiving a ZE air-interface RRCSetup message; and (3) transmitting an RRCSetupComplete message with an initial WTRU message set to "Service Request". According to embodiments, an initial WTRU Message may (e.g., also) contain an establishment cause. According to embodiments, a ZE air-interface RRCSetup message may establish and/or configure a signaling radio bearer (SRB1), for example, to enable exchange of RRC messages from the WTRU to a network (e.g., a E-UTRAN/NR/ZE-RAN) and/or from the ZE-RAN to the WTRU.

According to embodiments, (e.g., as a third step) a RAN node may forward the Initial UE Message to a serving AMF. According to embodiments, in such a case, the AMF may (e.g., then) determine its ability to support/handle the service, for example, by taking into account the establishment cause, and the AMF may (e.g., subsequently) do any of reject the service request or send an InitialContextSetupRequest message to the RAN node. According to embodiments, (e.g., as a fourth step) the RAN node may use a WTRU capability, for example, as received in the InitialContextSetupRequest message, to determine the RAN node's ability to support serving the WTRU's connection over a ZE air interface. According to embodiments, for example, in a case where the RAN node determines that is able to handle the ZE connection, the RAN node may send an InitialContextSetupResponse to the serving AMF, for example, to confirm a successful connection setup. According to embodiments (e.g., as an alternative), in a case where the RAN node determines that it is unable (e.g., determine its inability) to handle the ZE connection, the RAN node may transmit an RRCRelease message to the WTRU over the ZE air-interface, for example, to revert the WTRU (e.g., back) into Uu RRC_IDLE state and may send an InitialContextSetupFailure to the serving AMF. According to embodiments, (e.g., as a fifth step) a WTRU may do any of: (1) enter a ZE RRC_CONNECTED state, for example, in a case where the connection establishment was successful; or (2) enter a Uu RRC_IDLE state, for example, in a case where the connection establishment was unsuccessful. According to embodiments, a WTRU may (e.g., subsequently, try to) re-establish the RRC connection over any of a ZE or a Uu air-interface.

According to embodiments, referring to a procedure shown in FIG. 34, such shows a WTRU's transition to ZE RRC_CONNECTED state that supports a minimal QoS requirement using any of periodic or event triggered measurement reports over the Uu air-interface. According to embodiments, periodic measurement reports may (e.g., also) be supported over the ZE air interface, for example, using backscattering techniques, as discussed below. According to embodiments, in such a case, it may be assumed that the WTRU has (e.g., already) reported its ZE capability in a prior step and is currently operating in an RRC_IDLE state over the Uu air-interface. According to embodiments, referring to FIG. 34, as a first step a WTRU may determines the possibility of using the ZE air-interface to provide a certain minimal quality of service determined (e.g., required, notified, selected, etc.) by the application layer. According to embodiments, the potential of using the ZE air-interface for application layer support may be determined according to service requirements provided by the application layer, as well as according to the measured received signal strength using a cell/beam specific ZE or Uu reference signal.

According to embodiments, referring to FIG. 34, as a second step, the WTRU may initiate an RRC connection establishment over the Uu air-interface, for example, by: (1) transmitting an RRCSetupRequest message with an establishmentCause IE set to "ZE connection establishment", (2) receiving an RRCSetup message, and (3) transmitting an RRCSetupComplete message with the initial WTRU message set to "Service Request". The initial WTRU message may include the establishment cause. According to embodiments, the RAN node may use an establishmentCause IE to determine that the WTRU is requesting (e.g., requiring) a ZE connection that supports a certain minimal quality of service. In such a case, two different ZE connection establishment causes (e.g. two binary bits) must be identified in the establishmentCause IE of the RRCSetupRequest message.

According to embodiments, referring to FIG. 34, as a third step, the RAN node may forward the initial WTRU message to the serving AMF. According to embodiments, the AMF may (e.g., then) determine its ability to support/handle the service, for example, by taking into account the establishment cause. In such a case, the AMF may (e.g., subsequently) either reject the service request or send an InitialContextSetupRequest message to the RAN node. According to embodiments, the RAN node may use the information provided in the InitialContextSetupRequest message to determine the type of quality of service needed (e.g., required, requested, etc.) for the ZE connection establishment. In such a case, only a single ZE connection establishment cause (e.g. one binary bit) must be identified in the establishmentCause IE of the RRCSetupRequest message.

According to embodiments, referring to FIG. 34, as a fourth step, the RAN node may use any of: (1) the WTRU capability received in the InitialContextSetupRequest message, and (2) the required connection quality of service, for example, to determine the RAN node's ability to support serving the WTRU's connection over the ZE air interface. According to embodiments, on condition that the RAN node determines that it is able to handle the ZE connection, it transmits ZE-related reference signal and measurement reports configuration, for example, using a measConfig and reportConfig IEs as part of an RRCReconfiguration message, to the WTRU. The WTRU may (e.g., subsequently) transmit an RRCReconfigurationComplete message and the WTRU may follow the received configuration to measure the received signal strength over the ZE air interface using a cell/beam specific ZE reference signal and by counting the number of threshold-triggering events occurring within a specified transmission/measurement window $T_{meas}$. According to embodiments, the WTRU may (e.g., then), either periodically or according to measurement triggering events (e.g. a ZE received signal strength is above a preconfigured/signaled threshold $T_{sig}$ and a battery level is below another preconfigured/signaled threshold $T_b$), transmit a ZE measurement report to the serving RAN node. According to embodiments, in a case where the WTRU is/was operating in RRC_CONNECTED state over the ZE air-interface (e.g., as discussed below) in the procedure, the WTRU may switch to the RRC_CONNECTED state operation over the Uu air-interface during measurement reporting according to the received reporting configuration.

According to embodiments, referring to FIG. 34, as a fifth step, the WTRU may receive a (e.g., new) RRC message dedicated for the support of the ZE connection establishment (e.g. ZE TransitionAccept with ZE Configuration message) from the serving RAN node. According to embodiments, such a (e.g., new) RRC message may be received, for example, in a case where the serving RAN node determined, through the measurement report, that an established RRC connection over the ZE air-interface will be able to support the required minimal quality of service required by the application layer. According to embodiments, the RAN node may (e.g., also) send an InitialContextSetupResponse to the serving AMF, for example, to confirm the successful connection setup. According to embodiments, the WTRU may (e.g., subsequently) enter RRC_CONNECTED state operation over the ZE air-interface.

According to embodiments (e.g., as an alternative to the above fifth step), on condition that the RAN node determines that it is unable to handle the ZE connection or determines the inability of a ZE RRC connection to support a certain minimal quality of service, the RAN node may transmit an RRCRelease message to the WTRU, for example, to transition (e.g., send) the WTRU into Uu RRC_IDLE state and the RAN node may send an InitialContextSetupFailure to the serving AMF. The WTRU may subsequently enter RRC_IDLE state operation over the Uu air-interface, for example, in order to try to re-establish the RRC connection over the ZE or Uu air-interface.

According to embodiments, steps 4 and 5 are repeated periodically or according to a triggering event as set by the serving RAN node to ensure the satisfaction of the minimal required quality of service. For example, based on the ZE-related reference signal and measurement reports configuration set by the serving RAN node and received by the WTRU, steps 4 and 5 may be repeated periodically or according to the triggering event. According to embodiments, in a case of event-triggered measurement reporting configuration, the WTRU may use the Uu air interface by switching to Uu RRC_CONNECTED state to report its measurements. On the other hand, according to embodiments, for periodic measurement reporting configuration and depending on the configuration provided by the network, the WTRU may use any of the Uu or ZE air interfaces for reporting. According to embodiments, using the ZE air interface to provide measurement reporting through backscattering techniques may result in a limited minimal quality of service area, for example, as compared to Uu air interface measurement reporting; however, it may also limit the power consumption associated with UL transmissions and feedback reporting.

Figure 35:
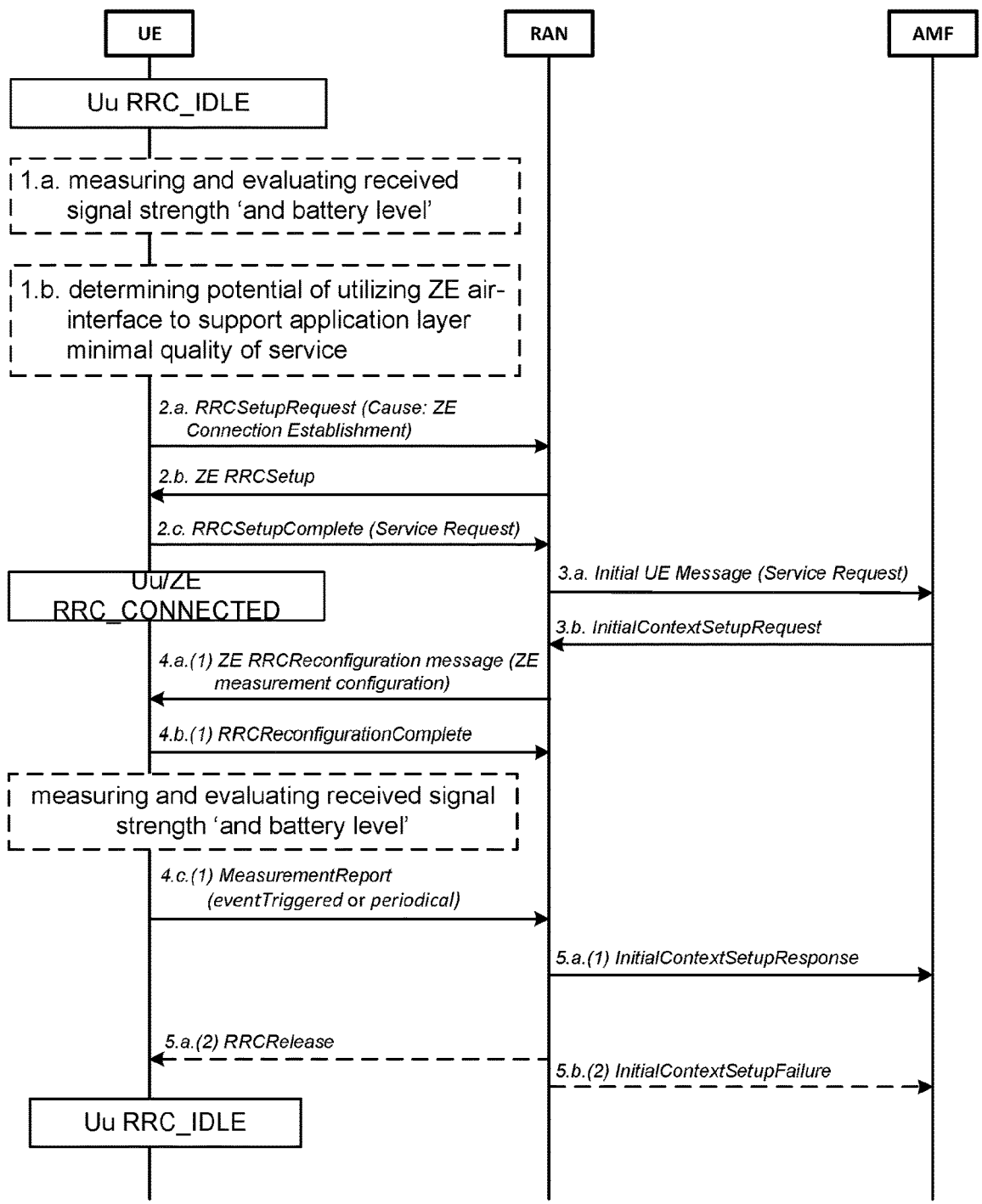
FIG. 35 is a diagram illustrating a WTRU's procedure to request RRC connection establishment over the ZE air-interface for minimal quality of service support using ZE RRCSetup message, according to embodiments.

FIG. 35 is a diagram illustrating a WTRU's procedure to request RRC connection establishment over the ZE air-interface for minimal quality of service support using ZE RRCSetup message, according to embodiments.

According to embodiments, for example, referring to a procedure illustrated in FIG. 35, a WTRU may transition to ZE RRC_CONNECTED state that supports a minimal QoS requirement using periodic and/or event triggered measurement reports over the Uu air-interface, for example, by using a ZE RRCSetup message. According to embodiments, periodic measurement reports may (e.g., also) be supported over the ZE air interface using backscattering techniques, for example, as discussed hereinabove. According to embodiments, it may (e.g., still) be assumed that a WTRU has already reported its ZE capability and is operating in an RRC_IDLE state over the Uu air-interface. According to embodiments, (e.g., as a first step) a WTRU may determine to use (e.g., the possibility of using) a ZE air-interface to provide a certain minimal quality of service determined by the application layer (e.g., of the WTRU). According to embodiments, a WTRU may determine to use (e.g., the potential/possibility of using) the ZE air-interface for application layer support according to any of: (1) service requirements provided by the application layer; and (2) a measured received signal strength using a cell/beam specific ZE or Uu reference signal.

According to embodiments, (e.g., as a second step) a WTRU may initiate an RRC connection establishment over the Uu air-interface, for example, by: (1) transmitting an RRCSetupRequest message with an establishmentCause IE set to "ZE connection establishment"; (2) receiving a ZE air-interface RRCSetup message; and (3) transmitting an RRCSetupComplete message with an initial WTRU message set to "Service Request". According to embodiments, the initial WTRU message may also include the establishment cause. According to embodiments, a RAN node may use the establishmentCause IE to determine that the WTRU is requiring a ZE connection that supports a certain minimal quality of service. According to embodiments, in such a case, two different ZE connection establishment causes (e.g. two binary bits) may (e.g., must) be identified in the establishmentCause IE of the RRCSetupRequest message. According to embodiments, (e.g., as a third step) a RAN node may forward the initial WTRU message to a serving AMF. According to embodiments, the serving AMF may (e.g., then) determine its ability to support and/or handle a service, for example, according to (e.g., taking into account) the establishment cause. According to embodiments, in such a case, the serving AMF may (e.g., subsequently) either reject the service request or send an InitialContextSetupRequest message to the RAN node. According to embodiments, the RAN node may use information included (e.g., provided) in the InitialContextSetupRequest message to determine the type of quality of service needed (e.g., required) for the ZE connection establishment. According to embodiments, in such a case, (e.g., only) a single ZE connection establishment cause (e.g. one binary bit) may be (e.g., must be) identified in the establishmentCause IE of the RRCSetupRequest message.

According to embodiments, (e.g., as a fourth step) a RAN node may use a WTRU capability, for example, received in the InitialContextSetupRequest message, and (e.g., also) the required connection quality of service, for example, to determine its (e.g., the RAN node's) ability to support (e.g. to serve, to provide, etc.) the WTRU's connection over the ZE air interface. According to embodiments, in case where the RAN node determines it is able to handle the ZE connection, it may transmit a ZE-related reference signal and a measurement reports configuration, for example, using a measConfig and reportConfig IEs as part of an RRCReconfiguration message that is transmitted over the ZE air-interface to the WTRU. According to embodiments, the WTRU may (e.g., subsequently) transmit an RRCReconfigurationComplete message, for example, using either or any of the Uu air-interface or the ZE (using backscattering) air-interface, for example, based on the RRCSetup message configuration. According to embodiments, in such a case, the WTRU may operate according to (e.g., following) the received configuration to measure the received signal strength over the ZE air interface using a cell/beam specific ZE reference signal and the WTRU may count a number of threshold-triggering events within a specified transmission/measurement window $T_{meas}$. According to embodiments, the WTRU may (e.g., then) transmit a ZE measurement report to the serving RAN node, for example, either periodically or according to measurement triggering events (e.g. a ZE received signal strength above a preconfigured/signaled threshold $T_{sig}$ and a battery level below another preconfigured/signaled threshold $T_b$).

According to embodiments, (e.g., as a fifth step) In a case where a serving RAN node determines, for example, through the measurement report, that an established RRC connection over the ZE air-interface will be able to support a (e.g., required) minimal quality of service needed (e.g., requested, required, etc.) by the application layer, the serving RAN node may send an InitialContextSetupResponse to the serving AMF, for example, to confirm a successful connection setup. According to embodiments, a WTRU may (e.g., subsequently) continue operating in RRC_CONNECTED state over the ZE air-interface. According to embodiments, (e.g., as an alternative) in a case where the RAN node determines that is it unable (e.g., its inability) to handle the ZE connection, and/or determines its inability of a ZE RRC connection, to support a (e.g., certain, needed, requested, required, etc.) minimal quality of service, the RAN node may transmit an RRCRelease message to the WTRU to send (e.g., transition, change, an operation state of) it into Uu RRC_IDLE state, and the RAN node may send an InitialContextSetupFailure to the serving AMF. According to embodiments, a WTRU may (e.g., subsequently) enter RRC_IDLE state operation over the Uu air-interface, for example, so that it may (e.g., try to) re-establish the RRC connection over the ZE or Uu air-interface.

According to embodiments, a WTRU operating in RRC_CONNECTED state over the Uu air-interface may decide to (e.g., simultaneously, concurrently, etc.) enable ZE RRC_CONNECTED state operation for EH purposes, for example, as discussed hereinbelow. According to embodiments, a WTRU may report a ZE capability and may receive a ZE-related NW configuration, such as any of a ZE Class, a dynamic WTRU-class-based ZE-RNTI and/or EH-RNTI, a ZE reference signal configuration, and a default EH signal configuration, for example, over a Uu air interface. According to embodiments, a WTRU may operate in Uu RRC_CONNECTED state and may detect a DCI transmitted over a PDCCH with a CRC scrambled according to (e.g., using, based on, etc.) any of a (e.g., configured) ZE-RNTI or EH-RNTI. According to embodiments, in a case where DCI contains a scheduling information field, a WTRU may use such to decode a PDSCH and receive a ZE-related configuration, such as any of a WTRU-specific or a class-specific dedicated EH signaling configuration. According to embodiments, a WTRU may measure and/or determine a ZE received signal strength $RSSI_{ZE}$ using ZE reference signal(s) within a specified measurement window $T_{meas}$. According to embodiments, a WTRU may detect a trigger to monitor EH opportunities over the ZE air-interface, e.g. $RSSI_{ZE} > T_{sig}$ and/or battery level $B_L < T_{b,min}$. According to embodiments, a WTRU may continue to perform legacy RRC_CONNECTED state operations over Uu air interface while concurrently enabling operations over the ZE air-interface, for example, to harvest energy according to (e.g., a default, dedicated, certain, etc.) configured EH opportunities.

Figure 36:
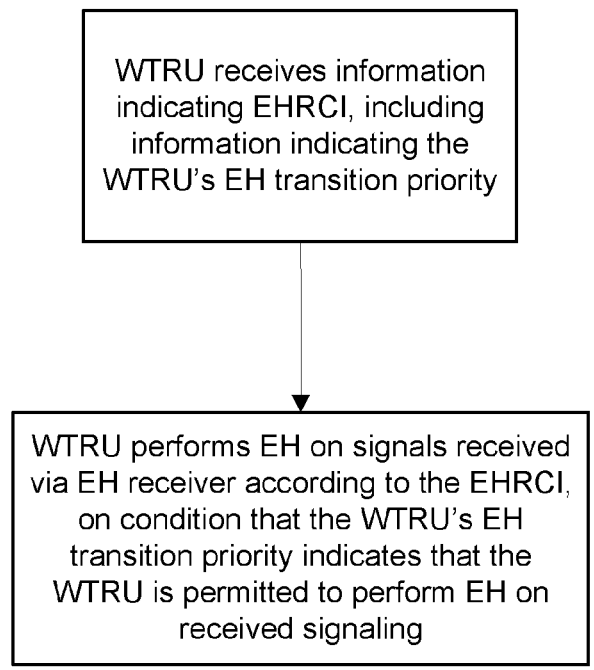
FIG. 36 is a diagram illustrating energy harvesting performed by a WTRU, according to embodiments.

FIG. 36 is a diagram illustrating energy harvesting performed by a WTRU, according to embodiments.

According to embodiments, referring to FIG. 36, a WTRU may perform any of the following operations (e.g., procedures, features, methods, steps, etc.), for example, in order to perform energy harvesting on received signals, for example, for storing power (e.g., in a battery) for use by the WTRU. According to embodiments, as a first operation, a WTRU may receive a signal (e.g., including information) indicating EH receiver configuration information (EHRCI). According to embodiments, EHRCI may include information indicating an EH transition priority of the WTRU. According to embodiments, as a second operation, a WTRU may perform energy harvesting on signals received, for example, using a receiver configured for (e.g., capable of, to perform, dedicated to, etc.) energy harvesting, for example, according to the (e.g., received) EHRCI. According to embodiments, the WTRU may perform such energy harvesting on condition that the EH transition priority of the WTRU indicates that the WTRU is permitted to perform EH on received signaling (e.g., signals received from any of a base station and another WTRU).

Figure 37:
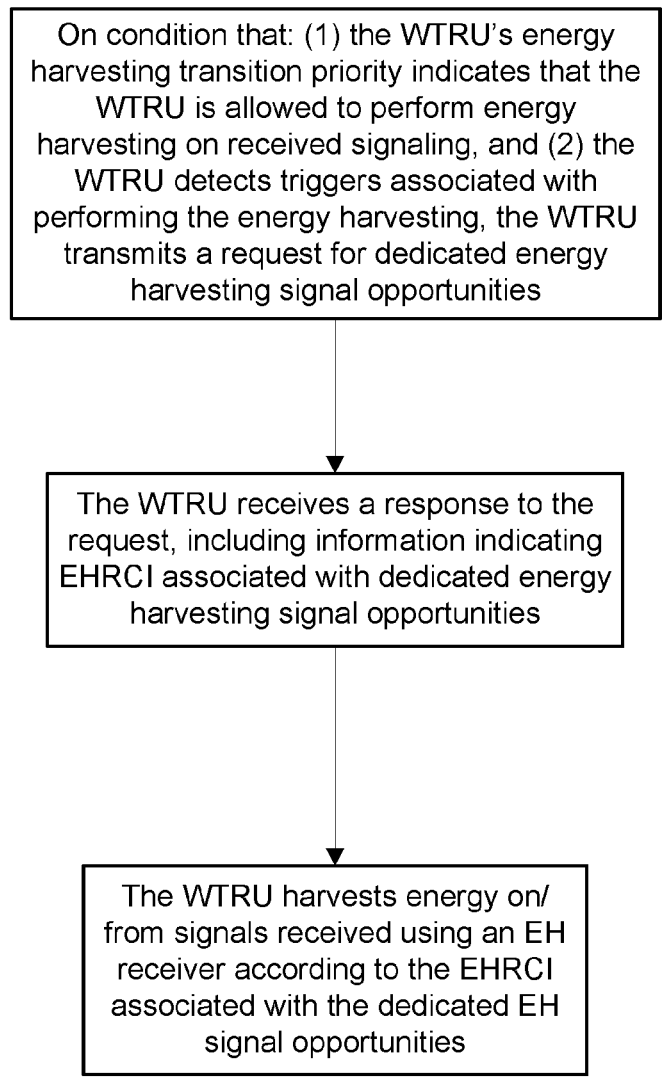
FIG. 37 is a diagram illustrating energy harvesting performed by a WTRU, according to embodiments.

FIG. 37 is a diagram illustrating energy harvesting performed by a WTRU, according to embodiments.

According to embodiments, referring to FIG. 37, a WTRU may perform any of the following operations (e.g., procedures, features, methods, steps, etc.), for example, in order to perform dedicated energy harvesting using signals (e.g., configured for, received for, indicated as, etc.) for energy harvesting for storing power (e.g., in a battery) for use by the WTRU. According to embodiments, a WTRU may have energy harvesting capabilities, and a WTRU transmit (e.g., to a network, to another WTRU, etc.) information indicating the WTRU's energy harvesting capabilities. According to embodiments, a WTRU may be configured with information indicating a priority associated with performing energy harvesting (e.g., energy harvesting (EH) operations).

According to embodiments, as a first operation, a WTRU may transmit a signal indicating a request for dedicated energy harvesting signal opportunities, for example, on condition that the energy harvesting transition priority of the WTRU indicates that the WTRU may perform energy harvesting on received signaling, and on condition that the WTRU detects triggers associated with performing energy harvesting on received signaling. According to embodiments, as a second operation, the WTRU may receive a response to the request for dedicated energy harvesting signal opportunities. According to embodiments, such response may include information indicating (e.g., further, second, additional, dedicated, WTRU-specific, etc.) EHRCI associated with dedicated energy harvesting signal opportunities. According to embodiments, as a third operation, the WTRU may perform energy harvesting on signals received using an EH receiver according to the second EHRCI associated with the dedicated EH signal opportunities.

According to embodiments, for example, referring to any of FIG. 36 and FIG. 37 (e.g., in a case of any of FIG. 36 and FIG. 37), a WTRU may autonomously transition from an (e.g., regular, default, etc.) inactive state to an EH inactive state. According to embodiments, a WTRU may autonomously transition from the regular inactive state to the EH inactive state on condition that a signal strength measurement of an (e.g., energy harvesting) reference signal is above a threshold value. According to embodiments, in such as case, the reference signal may be above a threshold at least once within a duration from an end of a validity timer. According to embodiments, a (e.g., regular) inactive state may be any of a Uu RRC_IDLE state and a Uu RRC_INACTIVE state, and an EH inactive state may be any of a Zero-Energy (ZE) RRC_IDLE state and a ZE RRC_INACTIVE state. According to embodiments, in case where a signal strength measurement of the EH reference signal is not above the threshold within a duration from expiry of a validity timer, a WTRU may perform (e.g., regular) inactive state operations, for example, using a primary receiver at the end of a validity timer. According to embodiments, a validity timer may be determined according to any of a parameter associated with a RAN paging message, a parameter associated with an EH class, and a function of parameters associated with multiple EH classes. According to embodiments, a validity timer may be initialized, for example, on condition that the WTRU is configured with an energy harvesting transition priority set to a high priority.

According to embodiments, an EH transition priority may be changed to or from any of network priority for a network-initiated state transition, high priority for a WTRU-initiated state transition, autonomous priority for a WTRU-initiated autonomous state transition, and low priority for a WTRU-initiated state transition including state synchronization signaling between the WTRU and the network. According to embodiments, EHRCI may include information indicating any of: an EH class, an EH transition priority, a dynamically assigned class-based RNTI, paging sub-band(s), a power-optimized waveform (POW) configuration, and an EH signal configuration, via the primary receiver. According to embodiments, a receiver (e.g., any of a regular receiver, a primary receiver, a secondary receiver, an energy harvesting (EH) receiver, a passive receiver, etc.) may be associated with any of any number of same or different antennas, and/or may be associated with any number of same or different antenna arrays.

Figure 38:
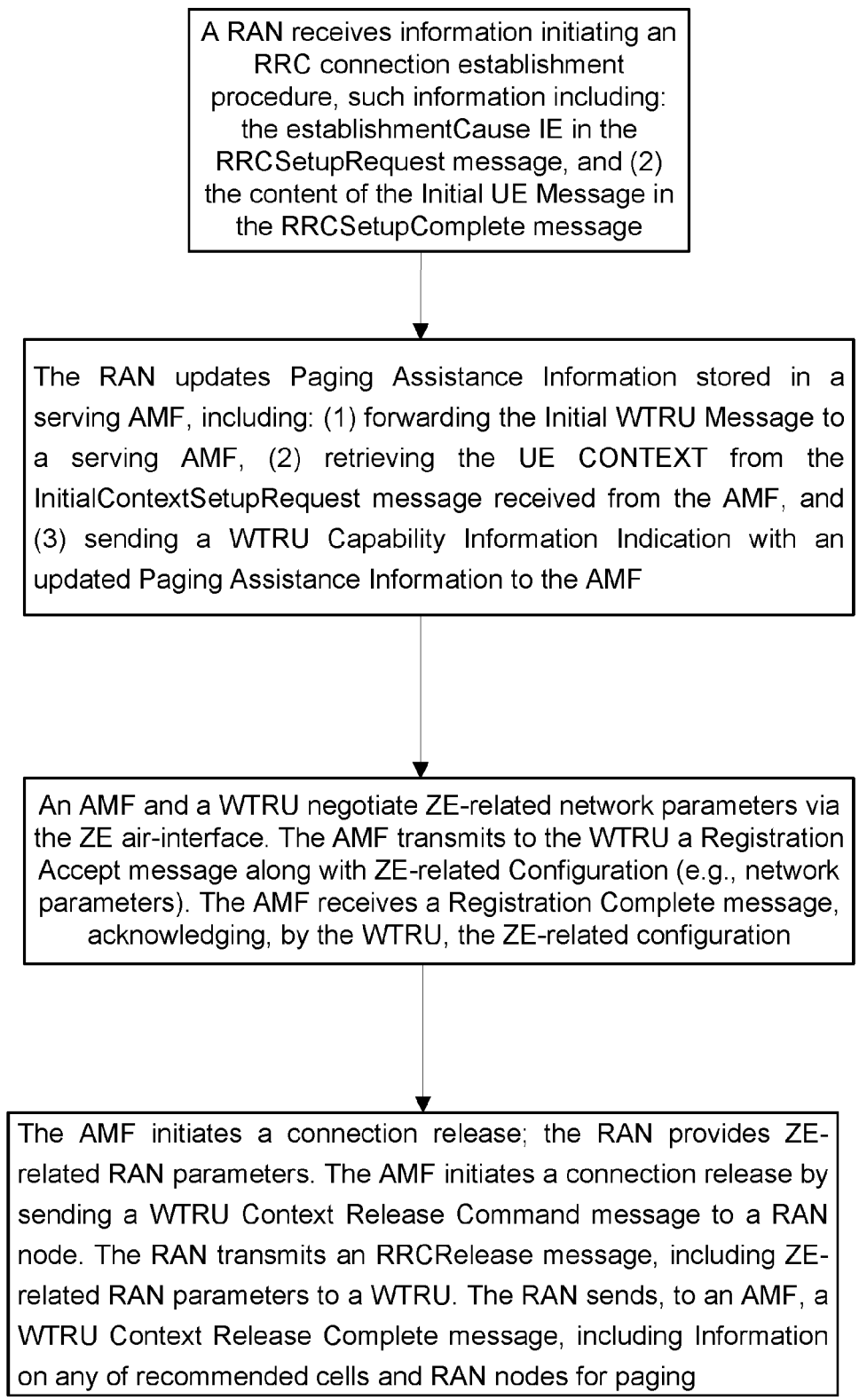
FIG. 38 is a diagram illustrating a WTRU-initiated state transition procedure, including messaging and signaling exchange, according to embodiments.

FIG. 38 is a diagram illustrating a WTRU-initiated state transition procedure, including messaging and signaling exchange, according to embodiments.

According to embodiments, a WTRU-initiated state transition procedure shown in FIG. 38 may be similar to that as discussed above. According to embodiments, as a first operation, a network (e.g., a RAN) may receive (e.g., from a WTRU) information indicating (e.g., initiating) an RRC connection establishment procedure over a Uu air interface. According to embodiments, such information may include (e.g., may be set by a WTRU): (1) the establishmentCause IE in the RRCSetupRequest message, for example, to indicate a request to transition from RRC operation over the Uu to ZE air interface; and (2) the content of the Initial UE Message in the RRCSetupComplete message, for example, to indicate a request to update a WTRU's capability related to ZE air-interface. Such indication may correspond to a Registration Request initial WTRU message with registration type set to Mobility Registration Update.

According to embodiments, as a second operation, a network (e.g., a RAN) may update the Paging Assistance Information, for example, that is stored in a serving AMF. For example, the network may: (e.g., first) forward the Initial WTRU Message to a serving AMF, (e.g., second) retrieve the UE CONTEXT from the InitialContextSetupRequest message received from the AMF, and (e.g., third) send a WTRU Capability Information Indication with an updated Paging Assistance Information to the AMF.

According to embodiments, as a third operation, a network (e.g., an AMF) and a WTRU may agree on ZE-related network parameters, such as support of on-demand paging and/or duty cycled paging, and duty cycle period over the ZE air-interface. According to embodiments, in such third operation, the network (e.g., the AMF) may transmit (e.g., to a WTRU) a Registration Accept message, for example, to indicate network acceptance of a WTRU's transition from RRC_IDLE over Uu to ZE air interface along with the ZE-related network parameters. In such a case, a WTRU may (e.g., then) use the ZE-related network parameters to configure its ZE receiver, and may send a Registration Complete message to the AMF, for example, to acknowledge the ZE-related configuration.

According to embodiments, as a fourth operation, a network (e.g., an AMF) may initiate a connection release, and the network (e.g., the RAN) may provide ZE-related RAN parameters. According to embodiments, in a case of the fourth operation, the network (e.g., the AMF) may initiate a connection release, for example, by sending a WTRU Context Release Command message to a RAN node, and the RAN node may transmit an RRCRelease message (e.g., including ZE-related RAN parameters) to a WTRU. According to embodiments, in such fourth operation, a RAN node may send, to an AMF, a WTRU Context Release Complete message, including Information on any of recommended cells and RAN nodes for paging.

Figure 39:
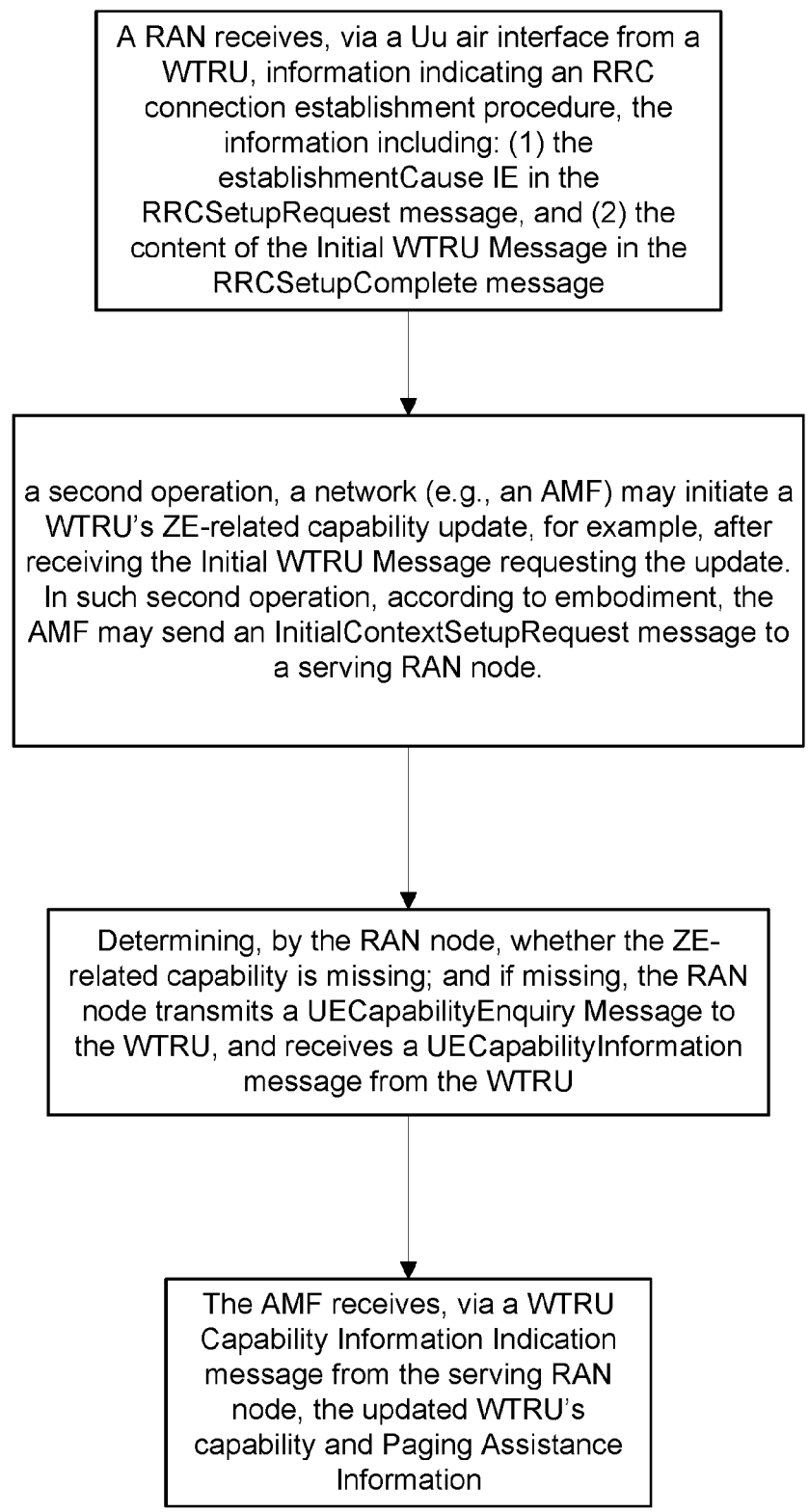
FIG. 39 is a diagram illustrating a WTRU-initiated state transition procedure, including messaging and signaling exchange, according to embodiments.

FIG. 39 is a diagram illustrating a WTRU-initiated state transition procedure, including messaging and signaling exchange, according to embodiments.

According to embodiments, a WTRU-initiated state transition procedure shown in FIG. 39 may be similar to that as discussed above. According to embodiments, as a first operation, a network (e.g., a RAN) may receive (e.g., from a WTRU) information indicating (e.g., initiating) an RRC connection establishment procedure over a Uu air interface. According to embodiments, such information may include (e.g., may be set by a WTRU): (1) the establishmentCause IE in the RRCSetupRequest message, which may indicate a request to transition from RRC operation over the Uu to ZE air interface; and (2) the content of the Initial WTRU Message in the RRCSetupComplete message, which may indicate a request to update a WTRU's capability related to ZE air-interface, which may correspond to a Registration Request initial WTRU message with registration type set to Mobility Registration Update.

According to embodiments, as a second operation, a network (e.g., an AMF) may initiate a WTRU's ZE-related capability update, for example, after receiving the Initial WTRU Message requesting the update. In such second operation, according to embodiment, the AMF may send an InitialContextSetupRequest message to a serving RAN node. According to embodiments, in a case where the RAN node determines that the ZE-related capability is missing, the RAN node may (e.g., subsequently) transmit a UECapabilityEnquiry and receive a UECapabilityInformation message from the WTRU. According to embodiments, in such second operation, the AMF may receive, from the serving RAN node, the updated WTRU's capability, as well as Paging Assistance Information, for example, via a WTRU Capability Information Indication message.

Conclusion

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a UE, WTRU, terminal, base station, RNC, or any host computer.

Moreover, in the embodiments described above, processing platforms, computing systems, controllers, and other devices including the constraint server and the rendezvous point/server containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed".

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the exemplary embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost vs. efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs), Field Programmable Gate Arrays (FPGAs) circuits, any other type of integrated circuit (IC), and/or a state machine.

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

It is also to be understood that the terminology used herein is for the purpose of describing particular embodiments (e.g., only) and is not intended to be limiting. As used herein, when referred to herein, the terms "user equipment" and its abbreviation "UE" may mean (1) a wireless transmit and/or receive unit (WTRU), such as described infra; (2) any of a number of embodiments of a WTRU, such as described infra; (3) a wireless-capable and/or wired-capable (e.g., tetherable) device configured with, inter alia, some or all structures and functionality of a WTRU, such as described infra; (4) a wireless-capable and/or wired-capable device configured with less than all structures and functionality of a WTRU, such as described infra; or (5) the like. Details of an example WTRU, which may be representative of any WTRU recited herein.

In certain representative embodiments, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶6 or means-plus-function claim format, and any claim without the terms "means for" is not so intended.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used in conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A method implemented in a wireless transmit/receive unit (WTRU), the method comprising:
   receiving, from a network, a message comprising an indication of a priority value;
   operating in a first idle state;
   detecting a trigger to transition from the first idle state to a second idle state; and
   transitioning from the first idle state to the second idle state in accordance with the priority value.

2. The method of claim 1, wherein transitioning to the second idle state in accordance with the priority value comprises:
   determining whether the priority value indicates a first priority or a second priority;
   on a condition that the priority value indicates the first priority, transmitting a request to the network to transition from the first idle state to the second idle state; and
   on a condition that the priority indicates the second priority, autonomously transitioning to the second idle state.

3. The method of claim 1, wherein the first idle state is a first configuration for monitoring paging using a first receiver type, and wherein the second idle state is a second configuration for monitoring paging using a second receiver type.

4. The method of claim 3, wherein the first receiver type is a main receiver, and wherein the second receiver type is a low-power receiver.

5. The method of claim 1, wherein the first idle state comprises an RRC_IDLE state over a Uu interface, and wherein the second idle state comprises an RRC_IDLE state over a zero-energy (ZE) interface.

6. The method of claim 1, wherein detecting the trigger comprises determining that a received signal strength is above a first predefined threshold value.

7. The method of claim 1, wherein detecting the trigger comprises determining that a battery level of the WTRU is below a second predefined threshold value.

8. The method of claim 1, further comprising operating in the second idle state.

9. The method of claim 1, wherein the message comprising the indication of the priority value is an RRC message.

10. The method of claim 1, further comprising:
    receiving, from the network, a second message comprising a second indication of an updated priority value; and
    transitioning from the first idle state to the second idle state based on the updated priority value.

11. A wireless transmit/receive unit (WTRU) comprising:
    a processor configured to:
    receive, via a communication circuit, a message comprising an indication of a priority value;
    operate in a first idle state;
    detect a trigger to transition from the first idle state to a second idle state; and
    transition from the first idle state to the second idle state in accordance with the priority value.

12. The WTRU of claim 11, wherein the processor being configured to transition to the second idle state in accordance with the priority value comprises the processor being configured to:
    determine whether the priority value indicates a first priority or a second priority;
    on a condition that the priority value indicates the first priority, transmit, via the communication circuit, a request to the network to transition from the first idle state to the second idle state; and
    on a condition that the priority indicates the second priority, autonomously transition to the second idle state.

13. The WTRU of claim 11, wherein the first idle state is a first configuration for monitoring paging using a first receiver type, and wherein the second idle state is a second configuration for monitoring paging using a second receiver type.

14. The WTRU of claim 13, wherein the first receiver type is a main receiver, and wherein the second receiver type is a low-power receiver.

15. The WTRU of claim 11, wherein the first idle state comprises an RRC_IDLE state over a Uu interface, and wherein the second idle state comprises an RRC_IDLE state over a zero-energy (ZE) interface.

16. The WTRU of claim 11, wherein the processor being configured to detect the trigger comprises the processor being configured to determine that a received signal strength is above a first predefined threshold value.

17. The WTRU of claim 11, wherein the processor being configured to detect the trigger comprises the processor being configured to determine that a battery level of the WTRU is below a second predefined threshold value.

18. The WTRU of claim 11, wherein the processor is further configured to operate in the second idle state.

19. The WTRU of claim 11, wherein the message comprising the indication of the priority value is an RRC message.

20. The WTRU of claim 11, wherein the processor is further configured to:
- receive, via the communication circuit, a second message comprising a second indication of an updated priority value; and
- transition from the first idle state to the second idle state based on the updated priority value.

* * * * *